United States Patent
Puri et al.

(10) Patent No.: US 9,762,911 B2
(45) Date of Patent: Sep. 12, 2017

(54) CONTENT ADAPTIVE PREDICTION AND ENTROPY CODING OF MOTION VECTORS FOR NEXT GENERATION VIDEO

(71) Applicant: Intel Corporation, Santa Clara, CA (US)

(72) Inventors: Atul Puri, Redmond, WA (US); Daniel Socek, Miami, FL (US); Chang Kee Choi, Bellevue, WA (US)

(73) Assignee: Intel Corporation, Santa Clara, CA (US)

( * ) Notice: Subject to any disclaimer, the term of this patent is extended or adjusted under 35 U.S.C. 154(b) by 490 days.

(21) Appl. No.: 14/334,257

(22) Filed: Jul. 17, 2014

(65) Prior Publication Data

US 2014/0362922 A1    Dec. 11, 2014

Related U.S. Application Data

(63) Continuation-in-part of application No. PCT/US2013/077698, filed on Dec. 24, 2013.
(Continued)

(51) Int. Cl.
*H04N 19/119* (2014.01)
*H04N 19/593* (2014.01)
(Continued)

(52) U.S. Cl.
CPC ......... *H04N 19/119* (2014.11); *H04N 19/105* (2014.11); *H04N 19/117* (2014.11); *H04N 19/12* (2014.11); *H04N 19/122* (2014.11); *H04N 19/124* (2014.11); *H04N 19/126* (2014.11); *H04N 19/13* (2014.11); *H04N 19/136* (2014.11); *H04N 19/139* (2014.11); *H04N 19/14* (2014.11); *H04N 19/159* (2014.11); *H04N 19/167* (2014.11); *H04N 19/17* (2014.11); *H04N 19/172* (2014.11); *H04N 19/176* (2014.11); *H04N 19/182* (2014.11); *H04N 19/184* (2014.11);
(Continued)

(58) Field of Classification Search
CPC .... H04N 19/119; H04N 19/593; H04N 19/14; H04N 19/172
See application file for complete search history.

(56) References Cited

U.S. PATENT DOCUMENTS 5,675,386 A    10/1997    Lee et al.
2006/0133479 A1    6/2006    Chen et al.
(Continued)

FOREIGN PATENT DOCUMENTS

EP    2271102 A1    1/2011
JP    2011-223068 A    11/2011
(Continued)

OTHER PUBLICATIONS

International Search Report and Written Opinion received for PCT Patent Application No. PCT/US2013/067182, mailed on Jan. 29, 2014, 10 pages.
(Continued)

*Primary Examiner* — Nam Pham
(74) *Attorney, Agent, or Firm* — Green, Howard & Mughal LLP

(57) ABSTRACT

Techniques related to content adaptive prediction and entropy coding of motion vectors are described.

6 Claims, 33 Drawing Sheets

Related U.S. Application Data

(60) Provisional application No. 61/758,314, filed on Jan. 30, 2013.

(51) Int. Cl.

| | | |
|---|---|---|
| *H04N 19/14* | (2014.01) | |
| *H04N 19/105* | (2014.01) | |
| *H04N 19/124* | (2014.01) | |
| *H04N 19/182* | (2014.01) | |
| *H04N 19/513* | (2014.01) | |
| *H04N 19/167* | (2014.01) | |
| *H04N 19/169* | (2014.01) | |
| *H04N 19/17* | (2014.01) | |
| *H04N 19/186* | (2014.01) | |
| *H04N 19/122* | (2014.01) | |
| *H04N 19/176* | (2014.01) | |
| *H04N 19/61* | (2014.01) | |
| *H04N 19/91* | (2014.01) | |
| *H04N 19/63* | (2014.01) | |
| *H04N 19/96* | (2014.01) | |
| *H04N 19/12* | (2014.01) | |
| *H04N 19/13* | (2014.01) | |
| *H04N 19/136* | (2014.01) | |
| *H04N 19/139* | (2014.01) | |
| *H04N 19/159* | (2014.01) | |
| *H04N 19/184* | (2014.01) | |
| *H04N 19/192* | (2014.01) | |
| *H04N 19/573* | (2014.01) | |
| *H04N 19/59* | (2014.01) | |
| *H04N 19/117* | (2014.01) | |
| *H04N 19/82* | (2014.01) | |
| *H04N 19/517* | (2014.01) | |
| *H04N 19/523* | (2014.01) | |
| *H04N 19/53* | (2014.01) | |
| *H04N 19/577* | (2014.01) | |
| *H04N 19/196* | (2014.01) | |
| *H04N 19/126* | (2014.01) | |
| *H04N 19/31* | (2014.01) | |
| *H04N 19/40* | (2014.01) | |
| *H04N 19/172* | (2014.01) | |
| *H04N 19/44* | (2014.01) | |

(52) U.S. Cl.
CPC ....... *H04N 19/186* (2014.11); *H04N 19/1887* (2014.11); *H04N 19/192* (2014.11); *H04N 19/196* (2014.11); *H04N 19/31* (2014.11); *H04N 19/40* (2014.11); *H04N 19/513* (2014.11); *H04N 19/517* (2014.11); *H04N 19/523* (2014.11); *H04N 19/53* (2014.11); *H04N 19/573* (2014.11); *H04N 19/577* (2014.11); *H04N 19/59* (2014.11); *H04N 19/593* (2014.11); *H04N 19/61* (2014.11); *H04N 19/63* (2014.11); *H04N 19/82* (2014.11); *H04N 19/91* (2014.11); *H04N 19/96* (2014.11); *H04N 19/44* (2014.11)

(56) References Cited

U.S. PATENT DOCUMENTS

| | | |
|---|---|---|
| 2006/0251330 A1 | 11/2006 | Toth et al. |
| 2007/0291849 A1 | 12/2007 | Lainema |
| 2008/0013633 A1 | 1/2008 | Ye et al. |
| 2008/0112489 A1 | 5/2008 | Malladi et al. |
| 2009/0046937 A1 | 2/2009 | Fenney et al. |
| 2009/0219991 A1 | 9/2009 | Po et al. |
| 2009/0279615 A1 | 11/2009 | Au et al. |
| 2010/0002775 A1 | 1/2010 | Huang et al. |
| 2010/0269009 A1 | 10/2010 | Okamura et al. |
| 2011/0051811 A1 | 3/2011 | Wang et al. |
| 2011/0103485 A1* | 5/2011 | Sato ............... H04N 19/105 375/240.16 |
| 2011/0109721 A1 | 5/2011 | Hong et al. |
| 2011/0206131 A1 | 8/2011 | Vafin et al. |
| 2012/0128070 A1 | 5/2012 | Kim et al. |
| 2012/0134412 A1 | 5/2012 | Shibahara et al. |
| 2012/0155532 A1 | 6/2012 | Puri et al. |
| 2012/0155533 A1 | 6/2012 | Puri et al. |
| 2012/0207213 A1 | 8/2012 | Amon |
| 2012/0207222 A1 | 8/2012 | Lou et al. |
| 2013/0003837 A1 | 1/2013 | Yu et al. |

FOREIGN PATENT DOCUMENTS

| | | |
|---|---|---|
| JP | 2012-080213 A | 4/2012 |
| KR | 10-2011-0112171 A | 10/2011 |
| KR | 10-2011-0112180 A | 10/2011 |
| KR | 10-2011-0129493 A | 12/2011 |
| KR | 10-2012-0086232 A | 8/2012 |
| KR | 10-2013-0010124 A | 1/2013 |
| KR | 10-2013-0045425 A | 5/2013 |
| WO | 2006/109974 A1 | 10/2006 |
| WO | 2012/045037 A2 | 4/2012 |
| WO | 2014/078068 A1 | 5/2014 |
| WO | 2014/120367 A1 | 8/2014 |
| WO | 2014/120368 A1 | 8/2014 |
| WO | 2014/120373 A1 | 8/2014 |
| WO | 2014/120575 A1 | 8/2014 |
| WO | 2014/120656 A1 | 8/2014 |

OTHER PUBLICATIONS

International Search Report and Written Opinion received for PCT Patent Application No. PCT /US2013/077698, mailed on Apr. 11, 2014, 12 Pages.

Chujoh et al., "Specification and experimental results of Quad-tree-based Adaptive Loop Filter", ITU-Telecommunications Standardization Sector, VCEG-AK22, Japan, Apr. 2009.

International Search Report and Written Opinion received for PCT Patent Application No. PCT/US2013/077692, mailed on Apr. 11, 2014, 15 pages.

International Search Report and Written Opinion received for PCT Patent Application No. PCT/US2013/077967, mailed on Apr. 10, 2014, 16 pages.

Chujoh et al., "Block Based Adaptive Loop Filter", ITU-Telecommunications Standardization Sector, VCEG-AI18, Germany, Jul. 2008.

International Search Report and Written Opinion received for PCT Patent Application No. PCT/US2014/013027, mailed on May 20, 2014, 12 pages.

International Search Report and Written Opinion received for PCT Patent Application No. PCT/US2014/013333, mailed on May 20, 2014, 11 pages.

* cited by examiner

800

Obtain First and Second Video Data of Different Types for Entropy Encoding
802

Determine an Entropy Encoding Technique for the First Video Data
804

Entropy Encode the First Video Data using the First Entropy Encoding Technique and Entropy Encode the Second Video Data to Generate First and Second Compressed Video Data
806

Assemble the First and Second Compressed Video Data to Generate an Output Bitstream
808

FIG. 8

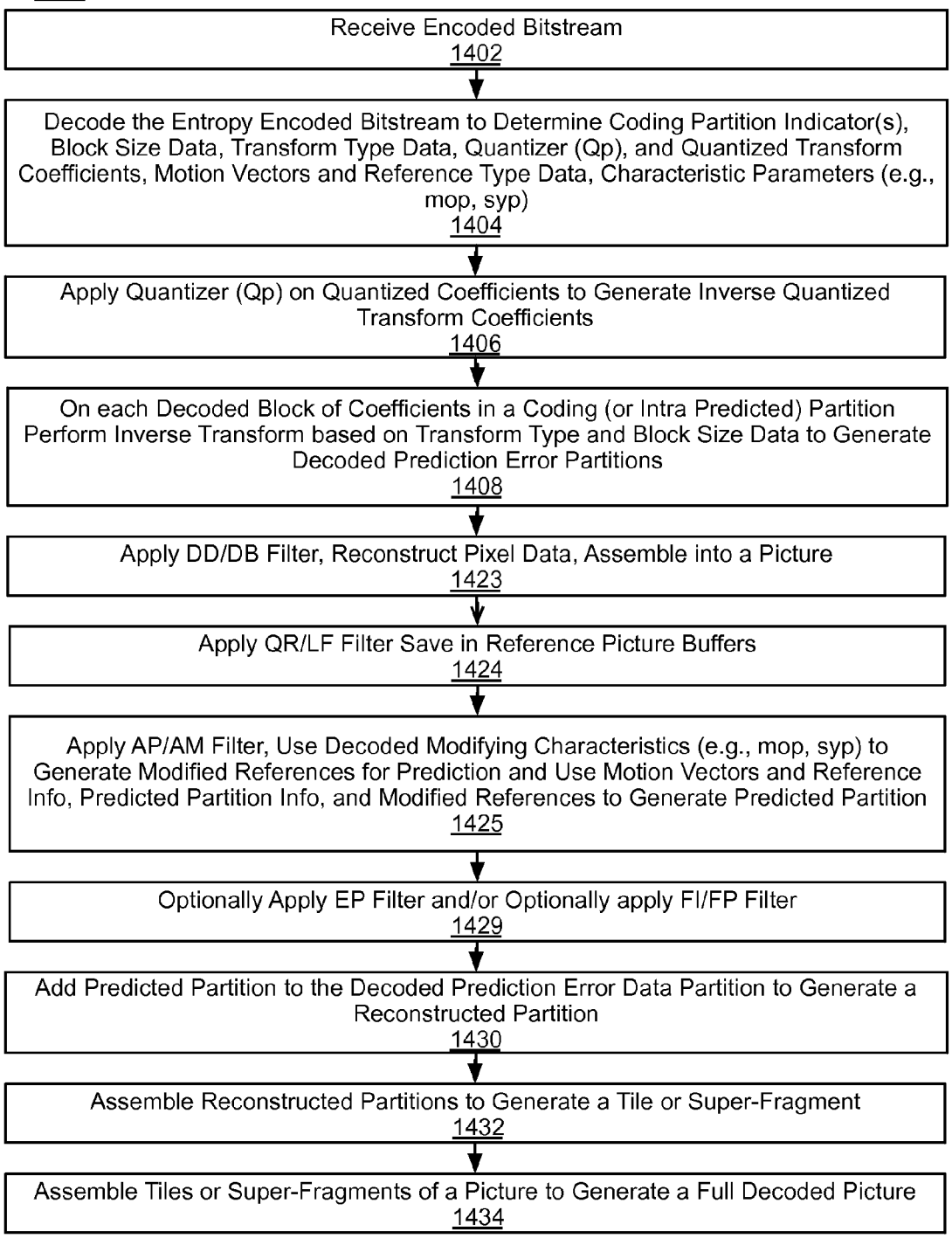

2400

Determine a Selected Motion Vector Prediction Technique for a
Block of Video Data
2402

Generate a Prediction Motion Vector for the Block of Video Data
Based on the Selected Motion Vector Prediction Technique
2404

Difference the Prediction Motion Vector with an Original Motion
Vector of the Block of Video Data
2406

Entropy Encode the Motion Vector Differential to Generate Coded
Motion Vector Data
2408

```
┌─────────────────────────────────────────────┐
│ Determine a Substantially Spiral Pattern to │
│     Provide a Sequence of Neighboring       │
│                  Blocks                     │
│                   2502                      │
└─────────────────────────────────────────────┘
                      │
                      ▼
┌─────────────────────────────────────────────┐
│  Scan Original Motion Vectors of the        │
│  Neighboring Blocks According to the        │
│                 Sequence                    │
│                   2504                      │
└─────────────────────────────────────────────┘
                      │
                      ▼
              Non-Zero Motion
       Yes    Vector Determined?    No
              ◇      2506      ◇
        ┌─────┘                   └─────┐
        ▼                               ▼
┌───────────────────────┐   ┌───────────────────────┐
│ Generate Motion Vector│   │ Generate Motion Vector│
│ as First Non-Zero     │   │    as a Zero Vector   │
│    Motion Vector      │   │         2510          │
│        2508           │   │                       │
└───────────────────────┘   └───────────────────────┘
```

FIG. 25

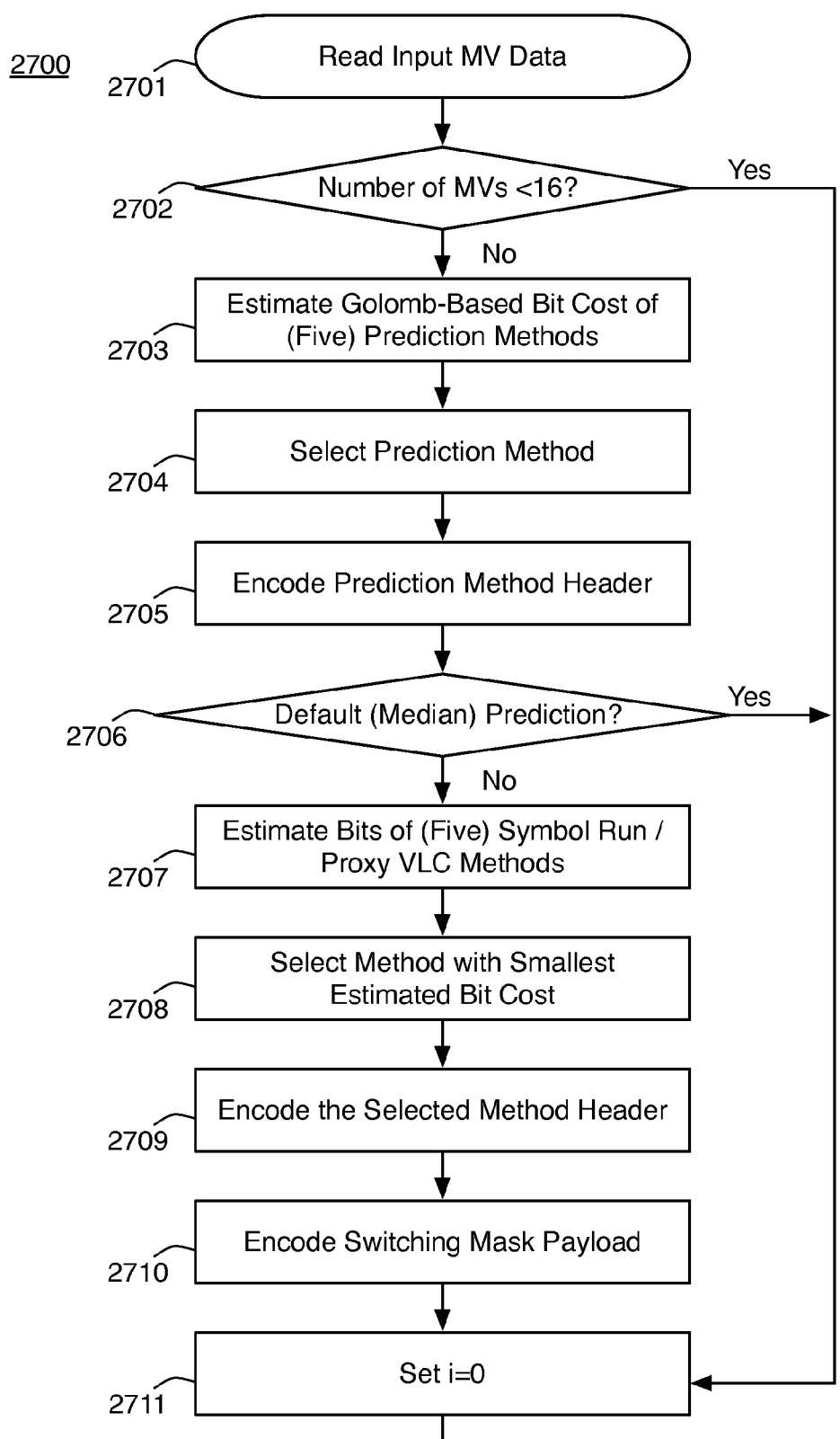
FIG. 27(A)

3001

| Sub-Class 0 |
| Sub-Class 1 |
| Sub-Class 2 |
| Sub-Class 3 |

| Sub-Class 0 | Sub-Class 1 | Sub-Class 2 | Sub-Class 3 |

FIG. 30(B)

CONTENT ADAPTIVE PREDICTION AND ENTROPY CODING OF MOTION VECTORS FOR NEXT GENERATION VIDEO

RELATED APPLICATIONS

The present application is a continuation-in-part of international application no. PCT/US13/77698, filed 24 Dec. 2013, which in turn claims the benefit of U.S. Provisional Application No. 61/758,314 filed 30 Jan. 2013; the contents of which are expressly incorporated herein in their entirety.

BACKGROUND

A video encoder compresses video information so that more information can be sent over a given bandwidth. The compressed signal may then be transmitted to a receiver having a decoder that decodes or decompresses the signal prior to display.

High Efficient Video Coding (HEVC) is the latest video compression standard, which is being developed by the Joint Collaborative Team on Video Coding (JCT-VC) formed by ISO/IEC Moving Picture Experts Group (MPEG) and ITU-T Video Coding Experts Group (VCEG). HEVC is being developed in response to the previous H.264/AVC (Advanced Video Coding) standard not providing enough compression for evolving higher resolution video applications. Similar to previous video coding standards, HEVC includes basic functional modules such as intra/inter prediction, transform, quantization, in-loop filtering, and entropy coding.

The ongoing HEVC standard may attempt to improve on limitations of the H.264/AVC standard such as limited choices for allowed prediction partitions and coding partitions, limited allowed multiple references and prediction generation, limited transform block sizes and actual transforms, limited mechanisms for reducing coding artifacts, and inefficient entropy encoding techniques. However, the ongoing HEVC standard may use iterative approaches to solving such problems.

For instance, with ever increasing resolution of video to be compressed and expectation of high video quality, the corresponding bitrate/bandwidth required for coding using existing video coding standards such as H.264 or even evolving standards such as H.265/HEVC, is relatively high. The aforementioned standards use expanded forms of traditional approaches to implicitly address the insufficient compression/quality problem, but often the results are limited.

The present description, developed within the context of a Next Generation Video (NGV) codec project, addresses the general problem of designing an advanced video codec that maximizes the achievable compression efficiency while remaining sufficiently practical for implementation on devices. For instance, with ever increasing resolution of video and expectation of high video quality due to availability of good displays, the corresponding bitrate/bandwidth required using existing video coding standards such as earlier MPEG standards and even the more recent H.264/AVC standard, is relatively high. H.264/AVC was not perceived to be providing high enough compression for evolving higher resolution video applications.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3($b$) is an illustrative diagram of an example next generation video decoder and subsystems;

FIG. 8 is a flow diagram illustrating an example process;

FIG. 13 illustrates an example bitstream;

FIG. 14 is a flow diagram illustrating an example decoding process;

FIG. 24 is a flow diagram illustrating an example process;

FIG. 25 is a flow diagram illustrating an example process;

FIGS. 27(A)-(D) provide a flow diagram illustrating an example process;

FIGS. 30(A) and 30(B) are illustrative diagrams of example differential motion vector subclasses, all arranged in accordance with at least some implementations of the present disclosure.

DETAILED DESCRIPTION

Figure 1:
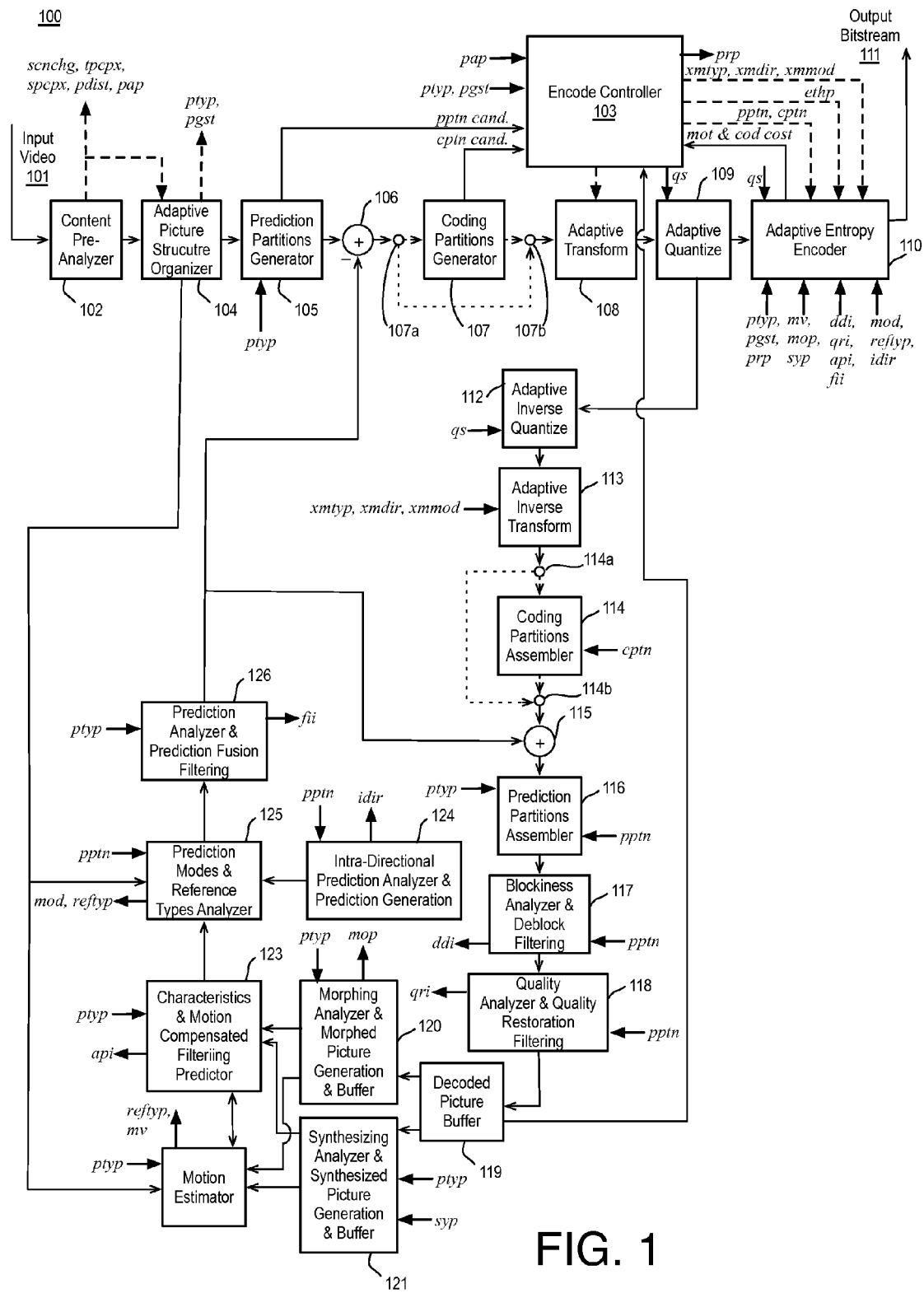
FIG. 1 is an illustrative diagram of an example next generation video encoder.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to content adaptive entropy coding for video systems.

Next generation video (NGV) systems, apparatus, articles, and methods are described below. NGV video coding may incorporate significant content based adaptivity in the video coding process to achieve higher compression. As discussed above, the H.264/AVC standard may have a variety of limitations and ongoing attempts to improve on the standard, such as, for example, the HEVC standard may use iterative approaches to address such limitations. Herein, an NGV system including an encoder and a decoder will be described.

For example, the H.264 standard may support two modes of entropy coding. In the first mode, Adaptive VLC (Variable Length Coding), transform coefficients may be coded using Context Adaptive VLC (CAVLC) and all other syntax elements (e.g., overhead data, modes, motion vectors, and so on) may be coded using Exponential Golomb coding. The CAVLC coded data and the Exponential Golomb coded data may be multiplexed to generate an encoded bitstream. In the second mode, all data may be encoded using Context Adaptive Binary Arithmetic Coding (CABAC). The corresponding decoder may also operate in two modes, disassembling and decoding the multiplexed bit stream in the first mode and decoding the CABAC encoded bitstream in the second mode. Such techniques may have limitations. For example, CABAC coding may be efficient but may be complex such that throughput in higher resolution contexts may be limited. Further, by grouping data types together for coding, efficiency and complexity of the entropy coding may not be optimized.

In some video codec implementations, entropy coding and decoding of various data such as overhead data, modes, motion vectors, and/or transform coefficients may be a significant contributor to the coding efficiency and complexity of the system. In some examples, the techniques discussed herein may balance coding efficiency and system complexity.

In some examples, first video data and second video data may be received for entropy encoding at an entropy encoder module. The first video data and the second video data may be different data types (e.g., header data, morphing parameters, synthesizing parameters, or global maps data or motion vectors or intra-prediction partition data or so on, as is discussed further herein). A first entropy encoding technique may be determined for the first video data based on a parameter associated with the first video data such as, for example, a number of compressed bits of the first video data, a predetermined indicator or flag associated with the first video data, a predetermined threshold, or a heuristically determined threshold or the like. In some examples, the first entropy encoding technique may be chosen from one of an adaptive symbol-run variable length coding technique or an adaptive proxy variable length coding technique. The first video data may be entropy encoded using the first entropy encoding technique and the second video data may be entropy encoded using the first entropy encoding technique. In some examples, the second entropy encoding technique may be determined for the second video data based on a parameter as discussed with respect to the first video data. In some examples, the second entropy encoding technique may be determined from options including an adaptive symbol-run variable length coding technique, an adaptive proxy variable length coding technique, an adaptive vector variable length coding, an adaptive 1-dimensional variable length coding technique, an adaptive 2-dimensional variable length coding technique, or other techniques as discussed herein. In some examples, the second entropy encoding technique may be predetermined for the data type of the second video data. Entropy encoding the first video data and the second video data may generate first compressed video data and second compressed video data. The first and second compressed video data may be assembled to generate an output bitstream.

The output bitstream may be transmitted from the encoder to a decoder, which may disassemble the bitstream to determine the first and second compressed video data. The compressed video data may be entropy decoded to generate entropy decoded video data, which may be further decoded to generate a video frame. The video frame may be transmitted to a display device for presentment to a user.

In some examples, additional video data types may be received for entropy encoding at the entropy encoder module. For example, third, fourth, fifth, sixth, seventh, or more video data may be entropy encoded to generate associated compressed video data, which may be assembled in the output bitstream, transmitted, and subsequently entropy decoded via a decoder. The various data types and encoding/decoding technique options and implementations are discussed further herein.

As used herein, the term "coder" may refer to an encoder and/or a decoder. Similarly, as used herein, the term "coding" may refer to performing video encoding via an encoder and/or performing video decoding via a decoder. For example a video encoder and video decoder may both be examples of coders capable of coding video data. In addition, as used herein, the term "codec" may refer to any process, program or set of operations, such as, for example, any combination of software, firmware, and/or hardware, that may implement an encoder and/or a decoder. Further, as used herein, the phrase "video data" may refer to any type of data associated with video coding such as, for example, video frames, image data, encoded bitstream data, or the like.

FIG. 1 is an illustrative diagram of an example next generation video encoder 100, arranged in accordance with at least some implementations of the present disclosure. As shown, encoder 100 may receive input video 101. Input video 101 may include any suitable input video for encoding such as, for example, input frames of a video sequence. As shown, input video 101 may be received via a content pre-analyzer module 102. Content pre-analyzer module 102 may be configured to perform analysis of the content of video frames of input video 101 to determine various types of parameters for improving video coding efficiency and speed performance. For example, content pre-analyzer module 102 may determine horizontal and vertical gradient information (e.g., Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation, or the like. The parameters generated by content pre-analyzer module 102 may be used by encoder 100 (e.g., via encode controller 103) and/or quantized and communicated to a decoder. As shown, video frames and/or other data may be transmitted from content pre-analyzer module 102 to adaptive picture organizer module 104, which may determine the picture type (e.g., I-, P-, or F/B-picture) of each video frame and reorder the video frames as needed. In some examples, adaptive picture organizer module 104 may include a frame portion generator configured to generate frame portions. In some examples, content pre-analyzer module 102 and adaptive picture organizer module 104 may together be considered a pre-analyzer subsystem of encoder 100.

As shown, video frames and/or other data may be transmitted from adaptive picture organizer module 104 to prediction partitions generator module 105. In some examples, prediction partitions generator module 105 may divide a frame or picture into tiles or super-fragments or the like. In some examples, an additional module (e.g., between modules 104 and 105) may be provided for dividing a frame or picture into tiles or super-fragments. Prediction partitions generator module 105 may divide each tile or super-fragment into potential prediction partitionings or partitions. In some examples, the potential prediction partitionings may be determined using a partitioning technique such as, for example, a k-d tree partitioning technique, a bi-tree partitioning technique, or the like, which may be determined based on the picture type (e.g., I-, P-, or F/B-picture) of individual video frames, a characteristic of the frame portion being partitioned, or the like. In some examples, the determined potential prediction partitionings may be partitions for prediction (e.g., inter- or intra-prediction) and may be described as prediction partitions or prediction blocks or the like.

In some examples, a selected prediction partitioning (e.g., prediction partitions) may be determined from the potential prediction partitionings. For example, the selected prediction partitioning may be based on determining, for each potential prediction partitioning, predictions using characteristics and motion based multi-reference predictions or intra-predictions, and determining prediction parameters. For each potential prediction partitioning, a potential prediction error may be determined by differencing original pixels with prediction pixels and the selected prediction partitioning may be the potential prediction partitioning with the minimum prediction error. In other examples, the selected prediction partitioning may be determined based on a rate distortion optimization including a weighted scoring based on number of bits for coding the partitioning and a prediction error associated with the prediction partitioning.

As shown, the original pixels of the selected prediction partitioning (e.g., prediction partitions of a current frame) may be differenced with predicted partitions (e.g., a prediction of the prediction partition of the current frame based on a reference frame or frames and other predictive data such as inter- or intra-prediction data) at differencer 106. The determination of the predicted partitions will be described further below and may include a decode loop as shown in FIG. 1. Any residuals or residual data (e.g., partition prediction error data) from the differencing may be transmitted to coding partitions generator module 107. In some examples, such as for intra-prediction of prediction partitions in any picture type (I-, F/B- or P-pictures), coding partitions generator module 107 may be bypassed via switches 107a and 107b. In such examples, only a single level of partitioning may be performed. Such partitioning may be described as prediction partitioning (as discussed) or coding partitioning or both. In various examples, such partitioning may be performed via prediction partitions generator module 105 (as discussed) or, as is discussed further herein, such partitioning may be performed via a k-d tree intra-prediction/coding partitioner module or a bi-tree intra-prediction/coding partitioner module implemented via coding partitions generator module 107.

In some examples, the partition prediction error data, if any, may not be significant enough to warrant encoding. In other examples, where it may be desirable to encode the partition prediction error data and the partition prediction error data is associated with inter-prediction or the like, coding partitions generator module 107 may determine coding partitions of the prediction partitions. In some examples, coding partitions generator module 107 may not be needed as the partition may be encoded without coding partitioning (e.g., as shown via the bypass path available via switches 107a and 107b). With or without coding partitioning, the partition prediction error data (which may subsequently be described as coding partitions in either event) may be transmitted to adaptive transform module 108 in the event the residuals or residual data require encoding. In some examples, prediction partitions generator module 105 and coding partitions generator module 107 may together be considered a partitioner subsystem of encoder 100. In various examples, coding partitions generator module 107 may operate on partition prediction error data, original pixel data, residual data, or wavelet data.

Coding partitions generator module 107 may generate potential coding partitionings (e.g., coding partitions) of, for example, partition prediction error data using bi-tree and/or k-d tree partitioning techniques or the like. In some examples, the potential coding partitions may be transformed using adaptive or fixed transforms with various block sizes via adaptive transform module 108 and a selected coding partitioning and selected transforms (e.g., adaptive or fixed) may be determined based on a rate distortion optimization or other basis. In some examples, the selected coding partitioning and/or the selected transform(s) may be determined based on a predetermined selection method based on coding partitions size or the like.

For example, adaptive transform module 108 may include a first portion or component for performing a parametric transform to allow locally optimal transform coding of small to medium size blocks and a second portion or component for performing globally stable, low overhead transform coding using a fixed transform, such as a discrete cosine transform (DCT) or a picture based transform from a variety of transforms, including parametric transforms, or any other configuration as is discussed further herein. In some examples, for locally optimal transform coding a Parametric Haar Transform (PHT) may be performed, as is discussed further herein. In some examples, transforms may be performed on 2D blocks of rectangular sizes between about 4×4 pixels and 64×64 pixels, with actual sizes depending on a number of factors such as whether the transformed data is luma or chroma, or inter or intra, or if the determined transform used is PHT or DCT or the like.

As shown, the resultant transform coefficients may be transmitted to adaptive quantize module 109. Adaptive quantize module 109 may quantize the resultant transform coefficients. Further, any data associated with a parametric transform, as needed, may be transmitted to either adaptive quantize module 109 (if quantization is desired) or adaptive entropy encoder module 110. Also as shown in FIG. 1, the quantized coefficients may be scanned and transmitted to adaptive entropy encoder module 110. Adaptive entropy encoder module 110 may entropy encode the quantized coefficients and include them in output bitstream 111. In some examples, adaptive transform module 108 and adaptive quantize module 109 may together be considered a transform encoder subsystem of encoder 100.

As also shown in FIG. 1, encoder 100 includes a local decode loop. The local decode loop may begin at adaptive inverse quantize module 112. Adaptive inverse quantize module 112 may be configured to perform the opposite operation(s) of adaptive quantize module 109 such that an inverse scan may be performed and quantized coefficients may be de-scaled to determine transform coefficients. Such an adaptive quantize operation may be lossy, for example. As shown, the transform coefficients may be transmitted to an adaptive inverse transform module 113. Adaptive inverse transform module 113 may perform the inverse transform as that performed by adaptive transform module 108, for example, to generate residuals or residual values or partition prediction error data (or original data or wavelet data, as discussed) associated with coding partitions. In some examples, adaptive inverse quantize module 112 and adaptive inverse transform module 113 may together be considered a transform decoder subsystem of encoder 100.

As shown, the partition prediction error data (or the like) may be transmitted to optional coding partitions assembler 114. Coding partitions assembler 114 may assemble coding partitions into decoded prediction partitions as needed (as shown, in some examples, coding partitions assembler 114 may be skipped via switches 114a and 114b such that decoded prediction partitions may have been generated at adaptive inverse transform module 113) to generate prediction partitions of prediction error data or decoded residual prediction partitions or the like.

As shown, the decoded residual prediction partitions may be added to predicted partitions (e.g., prediction pixel data) at adder 115 to generate reconstructed prediction partitions. The reconstructed prediction partitions may be transmitted to prediction partitions assembler 116. Prediction partitions assembler 116 may assemble the reconstructed prediction partitions to generate reconstructed tiles or super-fragments. In some examples, coding partitions assembler module 114 and prediction partitions assembler module 116 may together be considered an un-partitioner subsystem of encoder 100.

The reconstructed tiles or super-fragments may be transmitted to blockiness analyzer and deblock filtering module 117. Blockiness analyzer and deblock filtering module 117 may deblock and dither the reconstructed tiles or super-fragments (or prediction partitions of tiles or super-fragments). The generated deblock and dither filter parameters may be used for the current filter operation and/or coded in output bitstream 111 for use by a decoder, for example. The output of blockiness analyzer and deblock filtering module 117 may be transmitted to a quality analyzer and quality restoration filtering module 118. Quality analyzer and quality restoration filtering module 118 may determine QR filtering parameters (e.g., for a QR decomposition) and use the determined parameters for filtering. The QR filtering parameters may also be coded in output bitstream 111 for use by a decoder. As shown, the output of quality analyzer and quality restoration filtering module 118 may be transmitted to decoded picture buffer 119. In some examples, the output of quality analyzer and quality restoration filtering module 118 may be a final reconstructed frame that may be used for prediction for coding other frames (e.g., the final reconstructed frame may be a reference frame or the like). In some examples, blockiness analyzer and deblock filtering module 117 and quality analyzer and quality restoration filtering module 118 may together be considered a filtering subsystem of encoder 100.

In encoder 100, prediction operations may include inter- and/or intra-prediction. As shown in FIG. 1(a), inter-prediction may be performed by one or more modules including morphing analyzer and morphed picture generation module 120, synthesizing analyzer and generation module 121, and characteristics and motion filtering predictor module 123. Morphing analyzer and morphed picture generation module 120 may analyze a current picture to determine parameters for changes in gain, changes in dominant motion, changes in registration, and changes in blur with respect to a reference frame or frames with which it may be to be coded. The determined morphing parameters may be quantized/de-quantized and used (e.g., by morphing analyzer and morphed picture generation module 120) to generate morphed reference frames that that may be used by motion estimator module 122 for computing motion vectors for efficient motion (and characteristics) compensated prediction of a current frame. Synthesizing analyzer and generation module 121 may generate super resolution (SR) pictures and projected interpolation (PI) pictures or the like for motion for determining motion vectors for efficient motion compensated prediction in these frames.

Motion estimator module 122 may generate motion vector data based on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion compensated filtering predictor module 123 may apply motion compensation as part of the local decode loop as discussed.

Intra-prediction may be performed by intra-directional prediction analyzer and prediction generation module 124. Intra-directional prediction analyzer and prediction generation module 124 may be configured to perform spatial directional prediction and may use decoded neighboring partitions. In some examples, both the determination of direction and generation of prediction may be performed by intra-directional prediction analyzer and prediction generation module 124. In some examples, intra-directional prediction analyzer and prediction generation module 124 may be considered an intra-prediction module.

As shown in FIG. 1, prediction modes and reference types analyzer module 125 may allow for selection of prediction modes from among, "skip", "auto", "inter", "split", "multi", and "intra", for each prediction partition of a tile (or super-fragment), all of which may apply to P- and F/B-pictures. In addition to prediction modes, it also allows for selection of reference types that can be different depending on "inter" or "multi" mode, as well as for P- and F/B-pictures. The prediction signal at the output of prediction modes and reference types analyzer module 125 may be filtered by prediction analyzer and prediction fusion filtering module 126. Prediction analyzer and prediction fusion filtering module 126 may determine parameters (e.g., filtering coefficients, frequency, overhead) to use for filtering and may perform the filtering. In some examples, filtering the prediction signal may fuse different types of signals representing different modes (e.g., intra, inter, multi, split, skip, and auto). In some examples, intra-prediction signals may be different than all other types of inter-prediction signal(s) such that proper filtering may greatly enhance coding efficiency. In some examples, the filtering parameters may be encoded in output bitstream 111 for use by a decoder. The filtered prediction signal may provide the second input (e.g., prediction partition(s)) to differencer 106, as discussed above, that may determine the prediction difference signal (e.g., partition prediction error) for coding discussed earlier. Further, the same filtered prediction signal may provide the second input to adder 115, also as discussed above. As discussed, output bitstream 111 may provide an efficiently encoded bitstream for use by a decoder for the presentment of video.

FIG. 1 illustrates example control signals associated with operation of video encoder 100, where the following abbreviations may represent the associated information:
    scnchg Scene change information
    spcpx Spatial complexity information
    tpcpx Temporal complexity information
    pdist Temporal prediction distance information
    pap Pre Analysis parameters (placeholder for all other pre analysis parameters except scnchg, spcpx, tpcpx, pdist)
    ptyp Picture types information
    pgst Picture group structure information
    pptn cand. Prediction partitioning candidates
    cptn cand. Coding Partitioning Candidates
    prp Preprocessing
    xmtyp Transform type information
    xmdir Transform direction information
    xmmod Transform mode
    ethp One eighth (1/8th) pel motion prediction
    pptn Prediction Partitioning
    cptn Coding Partitioning
    mot&cod cost Motion and Coding Cost
    qs quantizer information set (includes Quantizer parameter (Qp), Quantizer matrix (QM) choice)
    mv Motion vectors
    mop Morphing Parameters
    syp Synthesizing Parameters
    ddi Deblock and dither information
    qri Quality Restoration filtering index/information
    api Adaptive Precision filtering index/information
    fii Fusion Filtering index/information
    mod Mode information
    reftyp Reference type information
    idir Intra Prediction Direction The various signals and data items that may need to be sent to the decoder, ie, pgst, ptyp, prp, pptn, cptn, modes, reftype, ethp, xmtyp, xmdir, xmmod, idir, mv, qs, mop, syp, ddi, qri, api, fii, quant coefficients and others may then be entropy encoded by adaptive entropy encoder 110 that may include different entropy coders collectively referred to as an entropy encoder subsystem. While these control signals are illustrated as being associated with specific example functional modules of encoder 100 in FIG. 1, other implementations may include a different distribution of control signals among the functional modules of encoder 300. The present disclosure is not limited in this regard and, in various examples, implementation of the control signals herein may include the undertaking of only a subset of the specific example control signals shown, additional control signals, and/or in a different arrangement than illustrated.

Figure 2:
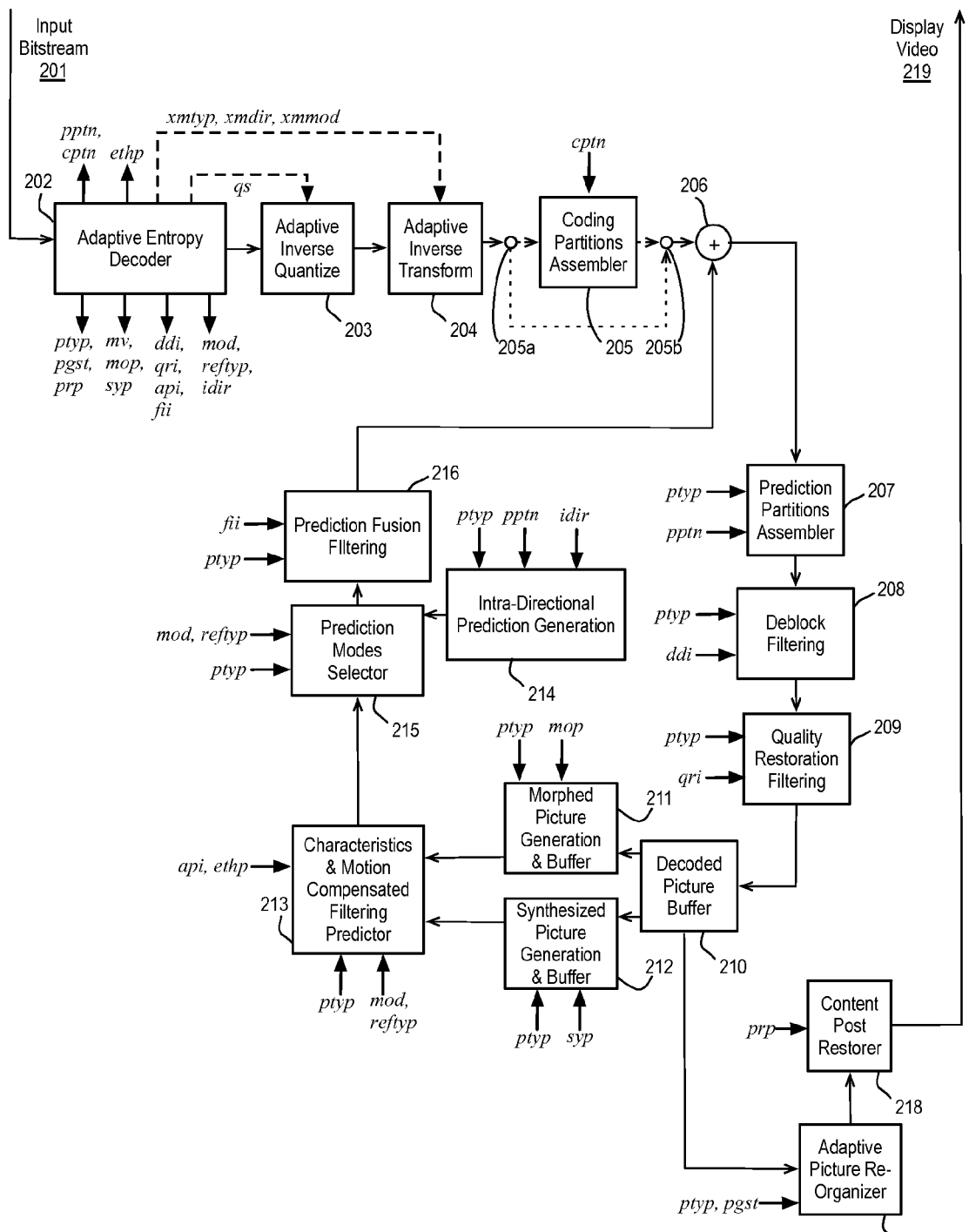
FIG. 2 is an illustrative diagram of an example next generation video decoder.

FIG. 2 is an illustrative diagram of an example next generation video decoder 200, arranged in accordance with at least some implementations of the present disclosure. As shown, decoder 200 may receive an input bitstream 201. In some examples, input bitstream 201 may be encoded via encoder 100 and/or via the encoding techniques discussed herein. As shown, input bitstream 201 may be received by an adaptive entropy decoder module 202. Adaptive entropy decoder module 202 may decode the various types of encoded data (e.g., overhead, motion vectors, transform coefficients, etc.). In some examples, adaptive entropy decoder 202 may use a variable length decoding technique. In some examples, adaptive entropy decoder 202 may perform the inverse operation(s) of adaptive entropy encoder module 110 discussed above.

The decoded data may be transmitted to adaptive inverse quantize module 203. Adaptive inverse quantize module 203 may be configured to inverse scan and de-scale quantized coefficients to determine transform coefficients. Such an adaptive quantize operation may be lossy, for example. In some examples, adaptive inverse quantize module 203 may be configured to perform the opposite operation of adaptive quantize module 109 (e.g., substantially the same operations as adaptive inverse quantize module 112). As shown, the transform coefficients (and, in some examples, transform data for use in a parametric transform) may be transmitted to an adaptive inverse transform module 204. Adaptive inverse transform module 204 may perform an inverse transform on the transform coefficients to generate residuals or residual values or partition prediction error data (or original data or wavelet data) associated with coding partitions. In some examples, adaptive inverse transform module 204 may be configured to perform the opposite operation of adaptive transform module 108 (e.g., substantially the same operations as adaptive inverse transform module 113). In some examples, adaptive inverse transform module 204 may perform an inverse transform based on other previously decoded data, such as, for example, decoded neighboring partitions. In some examples, adaptive inverse quantize module 203 and adaptive inverse transform module 204 may together be considered a transform decoder subsystem of decoder 200.

As shown, the residuals or residual values or partition prediction error data may be transmitted to coding partitions assembler 205. Coding partitions assembler 205 may assemble coding partitions into decoded prediction partitions as needed (as shown, in some examples, coding partitions assembler 205 may be skipped via switches 205a and 205b such that decoded prediction partitions may have been generated at adaptive inverse transform module 204). The decoded prediction partitions of prediction error data (e.g., prediction partition residuals) may be added to predicted partitions (e.g., prediction pixel data) at adder 206 to generate reconstructed prediction partitions. The reconstructed prediction partitions may be transmitted to prediction partitions assembler 207. Prediction partitions assembler 207 may assemble the reconstructed prediction partitions to generate reconstructed tiles or super-fragments. In some examples, coding partitions assembler module 205 and prediction partitions assembler module 207 may together be considered an un-partitioner subsystem of decoder 200.

The reconstructed tiles or super-fragments may be transmitted to deblock filtering module 208. Deblock filtering module 208 may deblock and dither the reconstructed tiles or super-fragments (or prediction partitions of tiles or super-fragments). The generated deblock and dither filter parameters may be determined from input bitstream 201, for example. The output of deblock filtering module 208 may be transmitted to a quality restoration filtering module 209. Quality restoration filtering module 209 may apply quality filtering based on QR parameters, which may be determined from input bitstream 201, for example. As shown in FIG. 2, the output of quality restoration filtering module 209 may be transmitted to decoded picture buffer 210. In some examples, the output of quality restoration filtering module 209 may be a final reconstructed frame that may be used for prediction for coding other frames (e.g., the final reconstructed frame may be a reference frame or the like). In some examples, deblock filtering module 208 and quality restoration filtering module 209 may together be considered a filtering subsystem of decoder 200.

As discussed, compensation due to prediction operations may include inter- and/or intra-prediction compensation. As shown, inter-prediction compensation may be performed by one or more modules including morphing generation module 211, synthesizing generation module 212, and characteristics and motion compensated filtering predictor module 213. Morphing generation module 211 may use de-quantized morphing parameters (e.g., determined from input bitstream 201) to generate morphed reference frames. Synthesizing generation module 212 may generate super resolution (SR) pictures and projected interpolation (PI) pictures or the like based on parameters determined from input bitstream 201. If inter-prediction is applied, characteristics and motion compensated filtering predictor module 213 may apply motion compensation based on the received frames and motion vector data or the like in input bitstream 201.

Intra-prediction compensation may be performed by intra-directional prediction generation module 214. Intra-directional prediction generation module 214 may be configured to perform spatial directional prediction and may use decoded neighboring partitions according to intra-prediction data in input bitstream 201.

As shown in FIG. 2, prediction modes selector module 215 may determine a prediction mode selection from among, "skip", "auto", "inter", "multi", and "intra", for each prediction partition of a tile, all of which may apply to P- and F/B-pictures, based on mode selection data in input bitstream 201. In addition to prediction modes, it also allows for selection of reference types that can be different depending on "inter" or "multi" mode, as well as for P- and F/B-pictures. The prediction signal at the output of prediction modes selector module 215 may be filtered by prediction fusion filtering module 216. Prediction fusion filtering module 216 may perform filtering based on parameters (e.g., filtering coefficients, frequency, overhead) determined via input bitstream 201. In some examples, filtering the prediction signal may fuse different types of signals representing different modes (e.g., intra, inter, multi, skip, and auto). In some examples, intra-prediction signals may be different than all other types of inter-prediction signal(s) such that proper filtering may greatly enhance coding efficiency. The filtered prediction signal may provide the second input (e.g., prediction partition(s)) to differencer 206, as discussed above.

As discussed, the output of quality restoration filtering module 209 may be a final reconstructed frame. Final reconstructed frames may be transmitted to an adaptive picture re-organizer 217, which may re-order or re-organize frames as needed based on ordering parameters in input bitstream 201. Re-ordered frames may be transmitted to content post-restorer module 218. Content post-restorer module 218 may be an optional module configured to perform further improvement of perceptual quality of the decoded video. The improvement processing may be performed in response to quality improvement parameters in input bitstream 201 or it may be performed as standalone operation. In some examples, content post-restorer module 218 may apply parameters to improve quality such as, for example, an estimation of film grain noise or residual blockiness reduction (e.g., even after the deblocking operations discussed with respect to deblock filtering module 208). As shown, decoder 200 may provide display video 219, which may be configured for display via a display device (not shown).

FIG. 2 illustrates example control signals associated with operation of video decoder 200, where the indicated abbreviations may represent similar information as discussed with respect to FIG. 1 above. While these control signals are illustrated as being associated with specific example functional modules of decoder 200 in FIG. 4, other implementations may include a different distribution of control signals among the functional modules of encoder 100. The present disclosure is not limited in this regard and, in various examples, implementation of the control signals herein may include the undertaking of only a subset of the specific example control signals shown, additional control signals, and/or in a different arrangement than illustrated.

While FIGS. 1 through 2 illustrate particular encoding and decoding modules, various other coding modules or components not depicted may also be utilized in accordance with the present disclosure. Further, the present disclosure is not limited to the particular components illustrated in FIGS. 1 and 2 and/or to the manner in which the various components are arranged. Various components of the systems described herein may be implemented in software, firmware, and/or hardware and/or any combination thereof. For example, various components of encoder 100 and/or decoder 200 may be provided, at least in part, by hardware of a computing System-on-a-Chip (SoC) such as may be found in a computing system such as, for example, a mobile phone.

Further, it may be recognized that encoder 100 may be associated with and/or provided by a content provider system including, for example, a video content server system, and that output bitstream 111 may be transmitted or conveyed to decoders such as, for example, decoder 200 by various communications components and/or systems such as transceivers, antennae, network systems, and the like not depicted in FIGS. 1 and 2. It may also be recognized that decoder 200 may be associated with a client system such as a computing device (e.g., a desktop computer, laptop computer, tablet computer, convertible laptop, mobile phone, or the like) that is remote to encoder 100 and that receives input bitstream 201 via various communications components and/or systems such as transceivers, antennae, network systems, and the like not depicted in FIGS. 1 and 2. Therefore, in various implementations, encoder 100 and decoder subsystem 200 may be implemented either together or independent of one another.

Figure 3A:
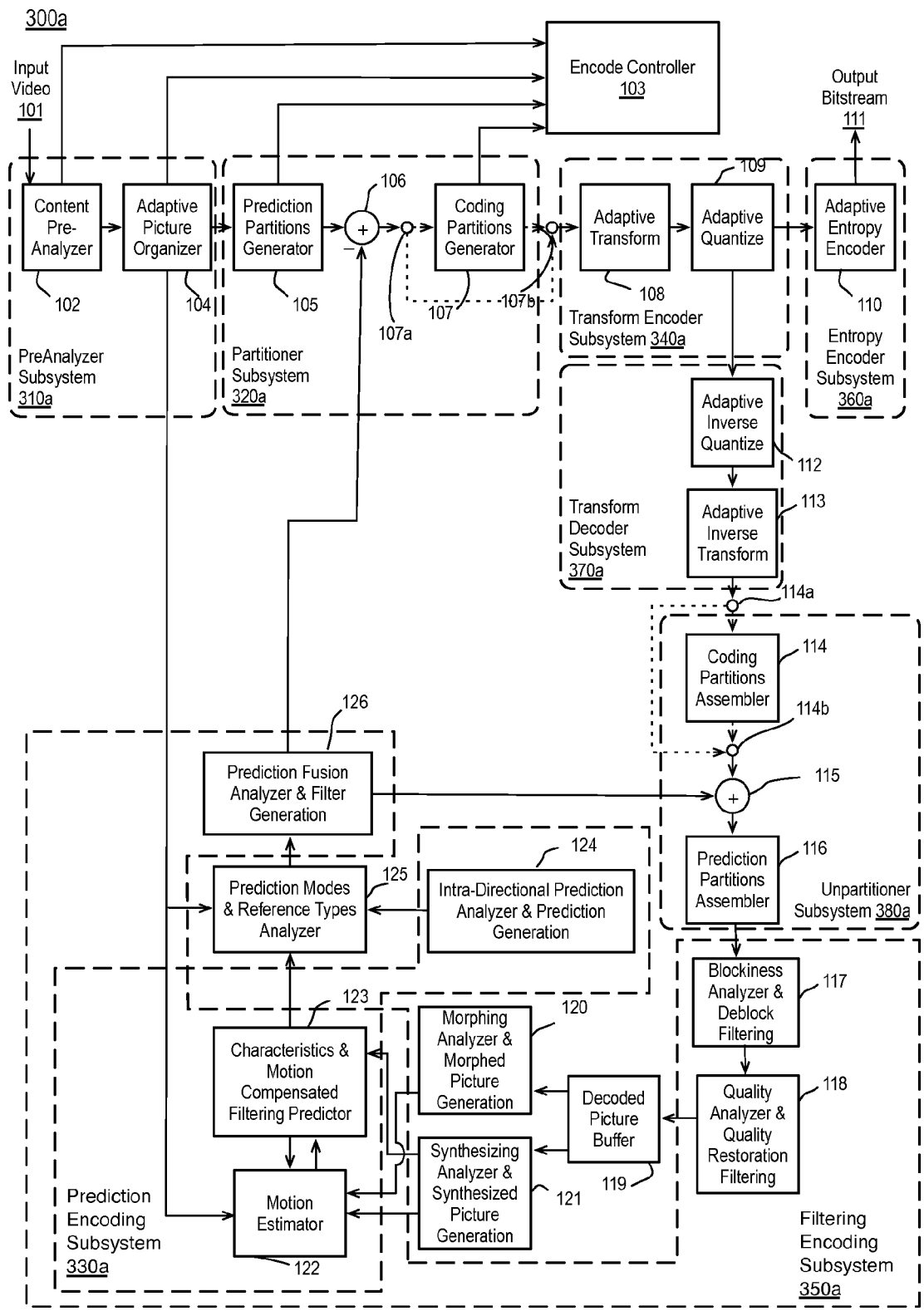
FIG. 3($a$) is an illustrative diagram of an example next generation video encoder and subsystems.

FIG. 3(a) is an illustrative diagram of an example next generation video encoder 300a, arranged in accordance with at least some implementations of the present disclosure. FIG. 3(a) presents a similar encoder to that shown in FIGS. 1(a) and 1(b), and similar elements will not be repeated for the sake of brevity. As shown in FIG. 3(a), encoder 300a may include preanalyzer subsystem 310a, partitioner subsystem 320a, prediction encoding subsystem 330a, transform encoder subsystem 340a, filtering encoding subsystem 350a, entropy encoder system 360a, transform decoder subsystem 370a, and/or unpartioner subsystem 380a. Preanalyzer subsystem 310a may include content pre-analyzer module 102 and/or adaptive picture organizer module 104. Partitioner subsystem 320a may include prediction partitions generator module 105, and/or coding partitions generator 107. Prediction encoding subsystem 330a may include motion estimator module 122, characteristics and motion compensated filtering predictor module 123, and/or intra-directional prediction analyzer and prediction generation module 124. Transform encoder subsystem 340a may include adaptive transform module 108 and/or adaptive quantize module 109. Filtering encoding subsystem 350a may include blockiness analyzer and deblock filtering module 117, quality analyzer and quality restoration filtering module 118, motion estimator module 122, characteristics and motion compensated filtering predictor module 123, and/or prediction analyzer and prediction fusion filtering module 126. Entropy coding subsystem 360a may include adaptive entropy encoder module 110. Transform decoder subsystem 370a may include adaptive inverse quantize module 112 and/or adaptive inverse transform module 113. Unpartioner subsystem 380a may include coding partitions assembler 114 and/or prediction partitions assembler 116.

Partitioner subsystem 320a of encoder 300a may include two partitioning subsystems: prediction partitions generator module 105 that may perform analysis and partitioning for prediction, and coding partitions generator module 107 that may perform analysis and partitioning for coding. Another partitioning method may include adaptive picture organizer 104 which may segment pictures into regions or slices may also be optionally considered as being part of this partitioner.

Prediction encoder subsystem 330a of encoder 300a may include motion estimator 122 and characteristics and motion compensated filtering predictor 123 that may perform analysis and prediction of "inter" signal, and intra-directional prediction analyzer and prediction generation module 124 that may perform analysis and prediction of "intra" signal. Motion estimator 122 and characteristics and motion compensated filtering predictor 123 may allow for increasing predictability by first compensating for other sources of differences (such as gain, global motion, registration), followed by actual motion compensation. They may also allow for use of data modeling to create synthesized frames (super resolution, and projection) that may allow better predictions, followed by use of actual motion compensation in such frames.

Transform encoder subsystem 340a of encoder 300a may perform analysis to select the type and size of transform and may include two major types of components. The first type of component may allow for using parametric transform to allow locally optimal transform coding of small to medium size blocks; such coding however may require some overhead. The second type of component may allow globally stable, low overhead coding using a generic/fixed transform such as the DCT, or a picture based transform from a choice of small number of transforms including parametric transforms. For locally adaptive transform coding, PHT (Parametric Haar Transform) may be used. Transforms may be performed on 2D blocks of rectangular sizes between 4×4 and 64×64, with actual sizes that may depend on a number of factors such as if the transformed data is luma or chroma, inter or intra, and if the transform used is PHT or DCT. The resulting transform coefficients may be quantized, scanned and entropy coded.

Entropy encoder subsystem 360a of encoder 300a may include a number of efficient but low complexity components each with the goal of efficiently coding a specific type of data (various types of overhead, motion vectors, or transform coefficients). Components of this subsystem may belong to a generic class of low complexity variable length coding techniques, however, for efficient coding, each component may be custom optimized for highest efficiency. For instance, a custom solution may be designed for coding of "Coded/Not Coded" data, another for "Modes and Ref Types" data, yet another for "Motion Vector" data, and yet another one for "Prediction and Coding Partitions" data. Finally, because a very large portion of data to be entropy coded is "transform coefficient" data, multiple approaches for efficient handling of specific block sizes, as well as an algorithm that may adapt between multiple tables may be used.

Filtering encoder subsystem 350a of encoder 300a may perform analysis of parameters as well as multiple filtering of the reconstructed pictures based on these parameters, and may include several subsystems. For example, a first subsystem, blockiness analyzer and deblock filtering module 117 may deblock and dither to reduce or mask any potential block coding artifacts. A second example subsystem, quality analyzer and quality restoration filtering module 118, may perform general quality restoration to reduce the artifacts due to quantization operation in any video coding. A third example subsystem, which may include motion estimator 122 and characteristics and motion compensated filtering predictor module 123, may improve results from motion compensation by using a filter that adapts to the motion characteristics (motion speed/degree of blurriness) of the content. A fourth example subsystem, prediction fusion analyzer and filter generation module 126, may allow adaptive filtering of the prediction signal (which may reduce spurious artifacts in prediction, often from intra prediction) thereby reducing the prediction error which needs to be coded.

Encode controller module 103 of encoder 300a may be responsible for overall video quality under the constraints of given resources and desired encoding speed. For instance, in full RDO (Rate Distortion Optimization) based coding without using any shortcuts, the encoding speed for software encoding may be simply a consequence of computing resources (speed of processor, number of processors, hyper-threading, DDR3 memory etc.) availability. In such case, encode controller module 103 may be input every single combination of prediction partitions and coding partitions and by actual encoding, and the bitrate may be calculated along with reconstructed error for each case and, based on lagrangian optimization equations, the best set of prediction and coding partitions may be sent for each tile of each frame being coded. The full RDO based mode may result in best compression efficiency and may also be the slowest encoding mode. By using content analysis parameters from content preanalyzer module 102 and using them to make RDO simplification (not test all possible cases) or only pass a certain percentage of the blocks through full RDO, quality versus speed tradeoffs may be made allowing speedier encoding. Up to now we have described a variable bitrate (VBR) based encoder operation. Encode controller module 103 may also include a rate controller that can be invoked in case of constant bitrate (CBR) controlled coding.

Lastly, preanalyzer subsystem 310a of encoder 300a may perform analysis of content to compute various types of parameters useful for improving video coding efficiency and speed performance. For instance, it may compute horizontal and vertical gradient information (Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation etc. The parameters generated by preanalyzer subsystem 310a may either be consumed by the encoder or be quantized and communicated to decoder 200.

While subsystems 310a through 380a are illustrated as being associated with specific example functional modules of encoder 300a in FIG. 3(a), other implementations of encoder 300a herein may include a different distribution of the functional modules of encoder 300a among subsystems 310a through 380a. The present disclosure is not limited in this regard and, in various examples, implementation of the example subsystems 310a through 380a herein may include the undertaking of only a subset of the specific example functional modules of encoder 300a shown, additional functional modules, and/or in a different arrangement than illustrated.

Figure 3B:
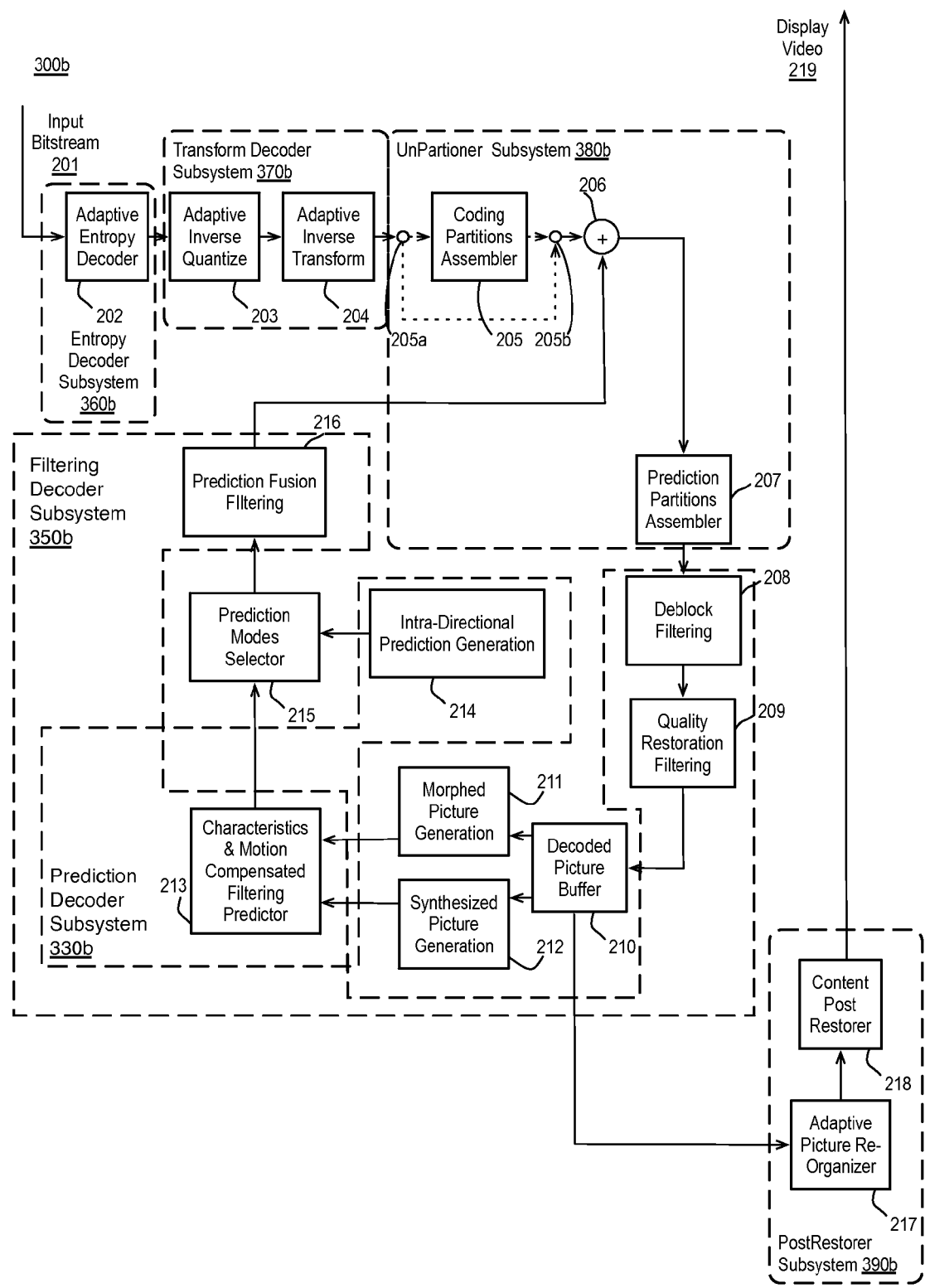

FIG. 3(b) is an illustrative diagram of an example next generation video decoder 300b, arranged in accordance with at least some implementations of the present disclosure. FIG. 3(b) presents a similar decoder to that shown in FIG. 2, and similar elements will not be repeated for the sake of brevity. As shown in FIG. 3(b), decoder 300b may include prediction decoder subsystem 330b, filtering decoder subsystem 350b, entropy decoder subsystem 360b, transform decoder subsystem 370b, unpartitioner_2 subsystem 380b, unpartitioner_1 subsystem 351b, filtering decoder subsystem 350b, and/or postrestorer subsystem 390b. Prediction decoder subsystem 330b may include characteristics and motion compensated filtering predictor module 213 and/or intra-directional prediction generation module 214. Filtering decoder subsystem 350b may include deblock filtering module 208, quality restoration filtering module 209, characteristics and motion compensated filtering predictor module 213, and/or prediction fusion filtering module 216. Entropy decoder subsystem 360b may include adaptive entropy decoder module 202. Transform decoder subsystem 370b may include adaptive inverse quantize module 203 and/or adaptive inverse transform module 204. Unpartitioner_2 subsystem 380b may include coding partitions assembler 205. Unpartitioner_1 subsystem 351b may include prediction partitions assembler 207. Postrestorer subsystem 790 may include content post restorer module 218 and/or adaptive picture re-organizer 217.

Entropy decoding subsystem 360b of decoder 300b may perform the inverse operation of the entropy encoder subsystem 360a of encoder 300a, i.e., it may decode various data (types of overhead, motion vectors, transform coefficients) encoded by entropy encoder subsystem 360a using a class of techniques loosely referred to as variable length decoding. Specifically, various types of data to be decoded may include "Coded/Not Coded" data, "Modes and Ref Types" data, "Motion Vector" data, "Prediction and Coding Partitions" data, and "Transform Coefficient" data.

Transform decoder subsystem 370b of decoder 300b may perform inverse operation to that of transform encoder subsystem 340a of encoder 300a. Transform decoder subsystem 370b may include two types of components. The first type of example component may support use of the parametric inverse PHT transform of small to medium block sizes, while the other type of example component may support inverse DCT transform for all block sizes. The PHT transform used for a block may depend on analysis of decoded data of the neighboring blocks. Output bitstream 111 and/or input bitstream 201 may carry information about partition/block sizes for PHT transform as well as in which direction of the 2D block to be inverse transformed the PHT may be used (the other direction uses DCT). For blocks coded purely by DCT, the partition/block sizes information may be also retrieved from output bitstream 111 and/or input bitstream 201 and used to apply inverse DCT of appropriate size.

Unpartitioner subsystem 380b of decoder 300b may perform inverse operation to that of partitioner subsystem 320a of encoder 300a and may include two unpartitioning subsystems, coding partitions assembler module 205 that may perform unpartitioning of coded data and prediction partitions assembler module 207 that may perform unpartitioning for prediction. Further if optional adaptive picture organizer module 104 is used at encoder 300a for region segmentation or slices, adaptive picture re-organizer module 217 may be needed at the decoder.

Prediction decoder subsystem 330b of decoder 300b may include characteristics and motion compensated filtering predictor module 213 that may perform prediction of "inter" signal and intra-directional prediction generation module 214 that may perform prediction of "intra" signal. Characteristics and motion compensated filtering predictor module 213 may allow for increasing predictability by first compensating for other sources of differences (such as gain, global motion, registration) or creation of synthesized frames (super resolution, and projection), followed by actual motion compensation.

Filtering decoder subsystem 350b of decoder 300b may perform multiple filtering of the reconstructed pictures based on parameters sent by encoder 300a and may include several subsystems. The first example subsystem, deblock filtering module 208, may deblock and dither to reduce or mask any potential block coding artifacts. The second example subsystem, quality restoration filtering module 209, may perform general quality restoration to reduce the artifacts due to quantization operation in any video coding. The third example subsystem, characteristics and motion compensated filtering predictor module 213, may improve results from motion compensation by using a filter that may adapt to the motion characteristics (motion speed/degree of blurriness) of the content. The fourth example subsystem, prediction fusion filtering module 216, may allow adaptive filtering of the prediction signal (which may reduce spurious artifacts in prediction, often from intra prediction) thereby reducing the prediction error which may need to be coded.

Postrestorer subsystem 390b of decoder 300b is an optional block that may perform further improvement of perceptual quality of decoded video. This processing can be done either in response to quality improvement parameters sent by encoder 100, or it can be standalone decision made at the postrestorer subsystem 390b. In terms of specific parameters computed at encoder 100 that can be used to improve quality at postrestorer subsystem 390b may be estimation of film grain noise and residual blockiness at encoder 100 (even after deblocking). As regards the film grain noise, if parameters can be computed and sent via output bitstream 111 and/or input bitstream 201 to decoder 200, then these parameters may be used to synthesize the film grain noise. Likewise, for any residual blocking artifacts at encoder 100, if they can be measured and parameters sent via output bitstream 111 and/or bitstream 201, postrestorer subsystem 390b may decode these parameters and may use them to optionally perform additional deblocking prior to display. In addition, encoder 100 also may have access to scene change, spatial complexity, temporal complexity, motion range, and prediction distance information that may help in quality restoration in postrestorer subsystem 390b.

While subsystems 330b through 390b are illustrated as being associated with specific example functional modules of decoder 300b in FIG. 3(b), other implementations of decoder 300b herein may include a different distribution of the functional modules of decoder 300b among subsystems 330b through 390b. The present disclosure is not limited in this regard and, in various examples, implementation of the example subsystems 330b through 390b herein may include the undertaking of only a subset of the specific example functional modules of decoder 300b shown, additional functional modules, and/or in a different arrangement than illustrated.

Figure 4:
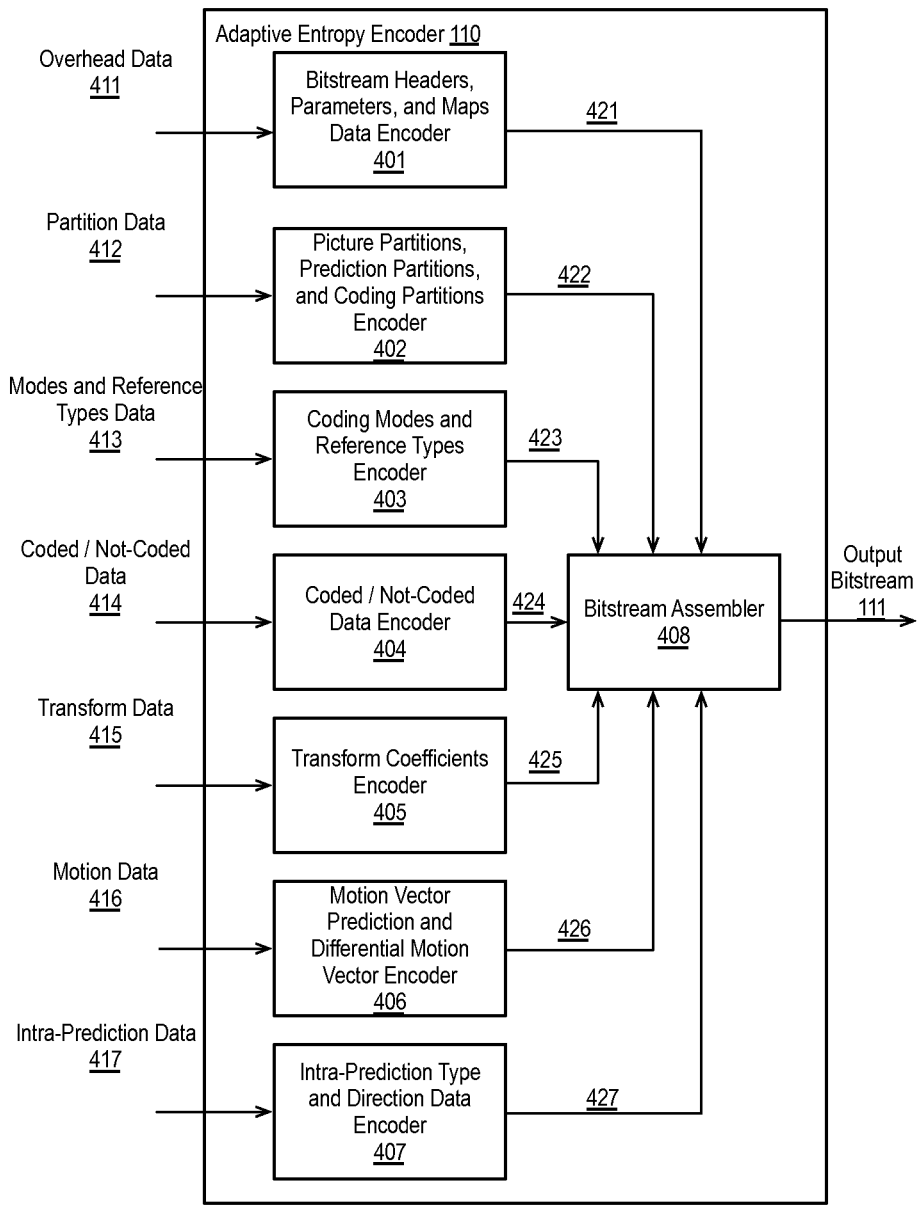
FIG. 4 is an illustrative diagram of an example entropy encoder module.

FIG. 4 is an illustrative diagram of an example entropy encoder module 110, arranged in accordance with at least some implementations of the present disclosure. As shown, entropy encoder module 110 may include bitstream headers, parameters and maps data encoder module 401, picture partitions, prediction partitions, and coding partitions encoder module 402, coding modes and reference types encoder module 403, coded/not-coded data encoder module 404, transform coefficients encoder module 405, motion vector prediction and differential motion vector encoder module 406, intra-prediction type and direction data encoder module 407, and/or bitstream assembler module 408. In the discussion herein, each of modules 401-407 may be shortened to encoder module 401, encoder module 404, or the like for the sake of brevity.

As shown, encoder modules 401-407 may receive video data 411-417, respectively, via adaptive entropy encoder 110. In some examples, received video data 411-417 may be received from various modules of encoder 100 as discussed herein. As shown, encoder modules 401-407 may compress the received video data 411-417 to generated compressed video data 421-427. Compressed video data 421-427 may be provided to bitstream assembler 408, which may assemble compressed video data 421-427 to generate output bitstream 111.

In some examples, encoder modules 401-407 may each include one or more specialized component(s) for efficiently encoding the type of data associated with received video data 411-417. In some examples, one or more of encoder modules 401-407 may preprocess the received video data 411-417 and/or select an entropy coding technique based on a parameter, parameters, or characteristics of the received video data 411-417 or other system information.

For example, encoder module 401 may receive overhead data 411, which may include bitstream header data (e.g., sequence and/or picture level bitstream headers), morphing parameters, synthesizing parameters, or global maps data (e.g., quantizer maps of pictures indicating quantizers to be used on a partition basis). As is discussed further below with respect to FIG. 6, in some examples, encoder module 401 may implement an adaptive symbol-run variable length coding technique, an adaptive proxy variable length coding technique, or a variable length coding table or tables compression of video data 411. In some examples, encoder module 411 may determine which technique provides the greatest compression efficiency (e.g., the fewest bits for compressed video data 421) such that the parameter(s) associated with video data 411 may be the number of bits needed for each coding technique or the like. Encoder module 411 may entropy encode video data 411 to generate compressed video data 421 (e.g., compressed overhead data), which may be transmitted to bitstream assembler 408 as shown.

As discussed, in some examples, the parameter associated with the video data (e.g., any of video data 411-417) may be a fewest number of attainable bits, most efficient encoding technique, or the like. In other examples, the parameter associated with the video data may be a predefined or predetermine parameter such that encoding technique is predetermined. In some examples, the parameter associated with the video data may be based on a characteristic of the video data such that the determined encoding technique may be adaptive to the received video data as is discussed further herein.

As shown, in some examples, encoder module 402 may receive partition data 412, which may include picture slices or regions data, intra-prediction partition data, and/or inter-prediction partition and coding partition data. As is discussed further below with respect to FIG. 6, in some examples, encoder module 412 may implement an adaptive symbol-run variable length coding technique or an adaptive proxy variable length coding technique for the compression of the intra-prediction partition data and/or inter-prediction partition data portions of video data 412 based on a parameter associated with the intra-prediction partition data and/or inter-prediction partition data (e.g., a fewest number of attainable bits, most efficient encoding technique, a predetermined parameter, characteristics of video data 412, or the like), and encoder module 412 may implement adaptive codebook variable length coding for the slices or regions data portions of video data 412 to generate compressed video data 422 (e.g., compressed partition data), which may be transmitted to bitstream assembler 408 as shown. In some examples, the intra-prediction partition data and/or inter-prediction partition data may include data indicating the partitioning of tiles into partitions, partitions into sub-partitions, or the like. In some examples, the partitions and/or sub-partitions may include prediction partitions and/or sub-partitions. In some examples, partitions and/or sub-partitions may include coding partitions and/or sub-partitions.

Further as shown, in some examples, encoder module 403 may receive modes and reference types data 413, which may include modes (e.g., intra, split, skip, auto, inter, or multi) data and/or references data for each prediction partition. For example, the mode split information may indicate whether a partition is further divided or not. If a partition is further divided, the mode data may further include direction information indicating whether the split is a horizontal split (e.g., hor) or a vertical split (e.g., vert). As is discussed further below with respect to FIG. 6, in some examples, encoder module 403 may implement an adaptive symbol-run variable length coding technique or an adaptive proxy variable length coding technique for separate coding of split/non-split partition information data, separate coding of split/non-split split information data, or prediction reference information data based on a parameter associated with the data (e.g., a fewest number of attainable bits, most efficient encoding technique, a predetermined parameter, characteristics of the pertinent portions of video data 413, or the like), and encoder module 403 may implement adaptive variable length coding for joint coding of modes and split information to generate compressed video data 423 (e.g., compressed modes and reference types data), which may be transmitted to bitstream assembler 408 as shown.

Further, in some examples, encoder module 404 may receive coded/not-coded data 414, which may include coded/not-coded data as discussed herein. For example, a partition (or sub-partition) may be coded if it has any nonzero transform coefficients and a partition (or sub-partition) may be not-coded if it has all zero transform coefficients. In some examples, coded/not-coded data may not be needed for partitions having an intra or skip mode. In some examples, coded/not-coded data may be needed for partitions having an auto, inter, or multi mode. As is discussed further below with respect to FIG. 6, in some examples, encoder module 404 may implement an adaptive symbol-run variable length coding technique or an adaptive proxy variable length coding technique for coded/not-coded data based on a parameter associated with the coded/not-coded data (e.g., a fewest number of attainable bits, most efficient encoding technique, a predetermined parameter, characteristics of video data 414, or the like) to generate compressed video data 424 (e.g., compressed coded/not-coded data), which may be transmitted to bitstream assembler 408 as shown.

In some examples, encoder module 405 may receive transform data 415, which may include transform coefficient data. For example, for blocks or partitions or sub-partitions that are coded (e.g., have one or more nonzero transform coefficients), transform coefficient data may be received for entropy encoding. As is discussed further with respect to FIG. 6, encoder module 405 may implement adaptive vector variable length coding for blocks or partitions or sub-partitions having a block or partition or sub-partition size of 2 in one dimension (e.g., 2×K partitions or K×2 sized partitions). Further, encoder module 405 may implement adaptive 1-dimensional variable length coding for blocks or partitions or sub-partitions of size 4×4 and adaptive 2-dimensional variable length coding for all other block or partition or sub-partition sizes (e.g., 4×8, 8×4, 8×8, 16×16, 32×32, 64×64, and so on). The generated compressed video data 425 (e.g., compressed transform data) may be transmitted to bitstream assembler 408 as shown.

For example, the transform coefficient data may result from a forward transform of rectangular (or square or the like) partitions of pixel data or rectangular (or square or the like) of pixel difference values implemented via adaptive transform module 108 followed by a quantization of the resulting coefficients via adaptive quantize module 109. In some examples, the transform coefficient data may be scanned to convert it to a 1-dimensional frequency ordered partition via encoder module 405. Such conversion may be highly adaptive any partition size (e.g., 24 or more or 32 or more partition sizes), different data types (e.g., discrete cosine transform coefficients or hybrid parametric Haar transform coefficients or the like of either intra or inter partitions), and/or different quantizer set characteristics (e.g., various combinations of quantizer parameters and/or matrices). Further, a block or partition or sub-partition may belong to different picture types: I-picture (e.g., intra compensation only), P-picture (e.g., predictive) or F-picture (e.g., functional) and/or may represent different types of signal or data (e.g., luma or chroma or the like), which may be quantized with different quantizer setting.

Further, in some examples, encoder module 406 may receive motion data 416, which may include motion vector data. As is discussed further with respect to FIG. 6, motion vector prediction may be performed based on video data 416 to generate one or more predicted motion vectors. A predicted motion vector may be differenced with an original motion data of video data 416 to generate a difference motion vector. In some examples, encoder module 416 may implement an adaptive classified variable length coding for the difference motion vector(s) to generate compressed video data 426 (e.g., compressed motion data), which may be transmitted to bitstream assembler 408 as shown.

Further, in some examples, encoder module 407 may receive intra-prediction data 417, which may include intra-prediction type or intra-prediction direction data. For example, as discussed, intra coding may use prediction, which may use neighboring past decoded partition(s) within the same frame to generate spatial prediction. In such examples, there may be predictors for indicating a past decoded partition or partitions. For example, the predictors may include dc, slope, directional, BTPC, feature matching, or the like. Further, in some examples, the directional predictor may be adaptive for different partition sizes. For example, specifying a directional predictor may include providing an technique for determining angular prediction pixel partition(s) for coding using causal neighboring decoded partitions and/or specifying a technique for entropy coding spatial prediction directions. In some examples, such techniques may be performed via encoder module 407. As is discussed further below with respect to FIG. 6, in some examples, encoder module 407 may implement an adaptive variable length coding technique or an arithmetic coding technique for intra-prediction type or intra-prediction direction data based on a parameter associated with the intra-prediction type or intra-prediction direction data (e.g., a fewest number of attainable bits, most efficient encoding technique, a predetermined parameter, characteristics of video data 417, or the like) to generate compressed video data 427 (e.g., compressed intra-prediction data), which may be transmitted to bitstream assembler 408 as shown.

As shown in FIG. 4, adaptive entropy encoder 110 may include bitstream assembler 408. In some examples, some or all of encoder modules 401-407 may provide entropy coded compressed video data 421-427 at different instances in time. Further, in some examples, one or some of compressed video data 421-427 may be picture based, region or slice based, tile based, prediction partition based, coding partition based, or any combination thereof. In some examples, bitstream assembler may multiplex (the potentially different) compressed video data 421-427 to create a valid bitstream such as, for example, output bitstream 111. For example, the valid bitstream may be a valid next generation video (NGV) coded bitstream, which may following a NGV bitstream syntax specification. In some examples, output bitstream 111 may be a video only bitstream. In some examples, output bitstream 111 may be multiplexed (e.g., Transport or a Media File Format) with uncoded or coded audio to create a multiplexed audio-visual stream. In any event, the bitstream may be used local decode, storage, or transmission to a decoder as discussed herein.

Figure 5:
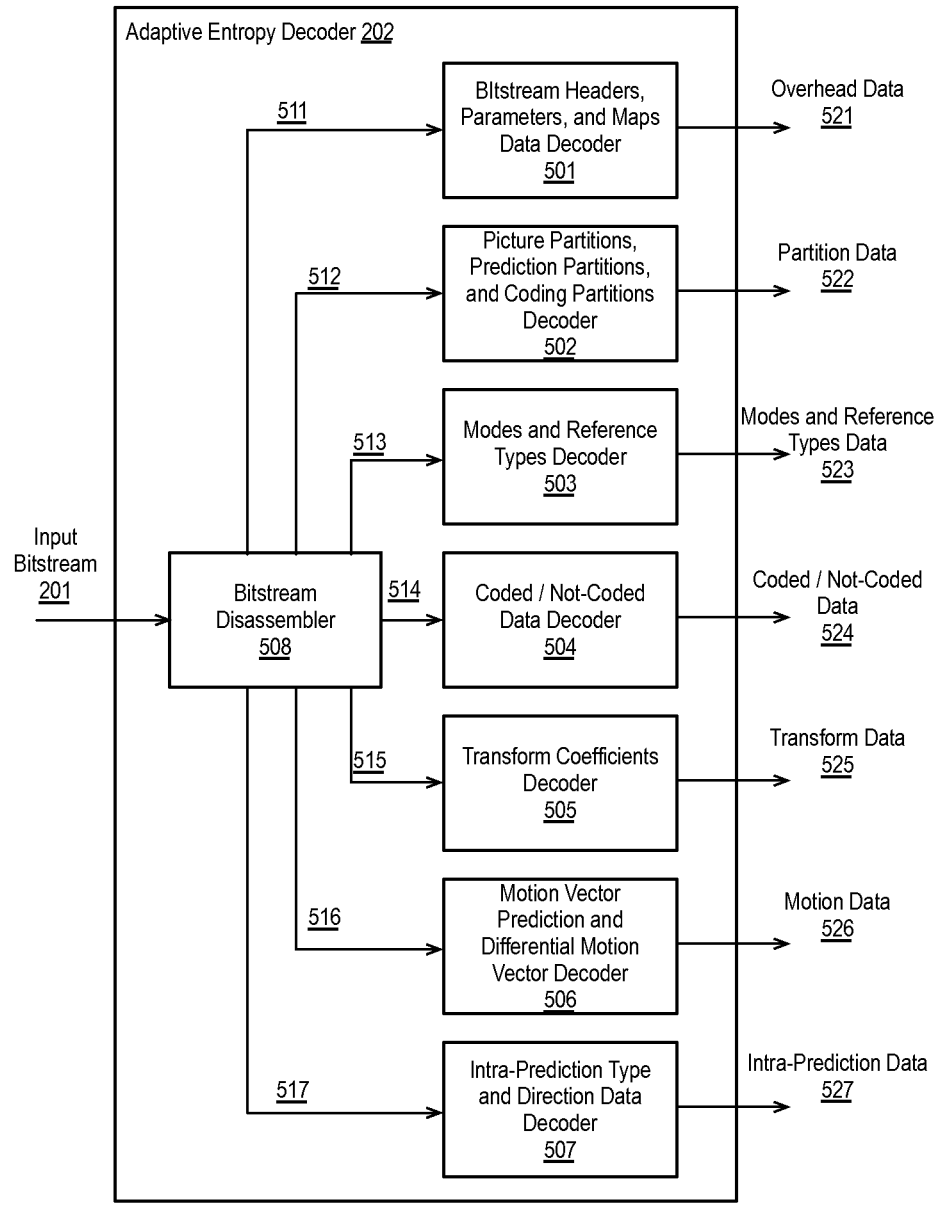
FIG. 5 is an illustrative diagram of an example entropy decoder module.

FIG. 5 is an illustrative diagram of an example entropy decoder module 202, arranged in accordance with at least some implementations of the present disclosure. As shown, entropy decoder module 202 may include bitstream headers, parameters and maps data decoder module 501, picture partitions, prediction partitions, and coding partitions decoder module 502, coding modes and reference types decoder module 503, coded/not-coded data decoder module 504, transform coefficients decoder module 505, motion vector and differential motion vector decoder module 506, intra-prediction and direction data decoder module 507, and/or bitstream disassembler module 508. In the discussion herein, each of modules 501-507 may be shortened to decoder module 501, decoder module 505, or the like for the sake of brevity.

As shown, bitstream disassembler module 508 may receive input bitstream 201. In some examples, input bitstream 201 may be a valid bitstream such as, for example, a valid next generation video (NGV) coded bitstream, which may follow a NGV bitstream syntax specification. In some examples, input bitstream 201 may be a video only bitstream. In some examples, input bitstream 201 may be a multiplexed audio-visual stream as discussed herein. Bitstream disassembler module 508 may disassemble input bitstream 201 to determine compressed video data 511-517 as shown. For example, bitstream disassembler module 508 may use a predefined syntax or specification to divide input bitstream 201 into component compressed video data 511-517 by data type for decompression via decoder modules 501-507. In some examples, bitstream disassembler module 508 may perform an inverse operation with respect to bitstream assembler module 508.

As shown in FIG. 5, decoder modules 501-507 may receive compressed video data 511-517, respectively, and generate video data 521-527. Video data 521-527 may be transmitted to various components of decoder 200 for further decoding as discussed herein. Decoder 200 may thereby generate video frame(s) for presentment to a user via a display device (not shown). In some examples, decoder modules 501-507 may each perform an inverse operation with respect to encoder modules 401-407. In some examples, decoder modules 501-507 may each include one or more specialized component(s) for efficiently entropy decoding the type of data associated with compressed video data 511-517.

For example, decoder module 501 may receive compressed overhead data 511, which may include compressed bitstream header data (e.g., sequence and/or picture level bitstream headers), morphing parameters, synthesizing parameters, or global maps data (e.g., quantizer maps of pictures indicating quantizers to be used on a partition basis). In some examples, decoder module 511 may implement an adaptive symbol-run variable length coding technique, an adaptive proxy variable length coding technique, or a variable length coding table or tables for decompression of compressed overhead data 511 to generate overhead data 521. In some examples, decoder module 501 may determine which coding technique to implement based on a parameter or indicator provided via bitstream 201.

As shown, in some examples, decoder module 502 may receive compressed partition data 512, which may include compressed picture slices or regions data, intra-prediction partition data, and/or inter-prediction partition data. In some examples, decoder module 512 may implement an adaptive symbol-run variable length coding technique or an adaptive proxy variable length coding technique for the decompression of the intra-prediction partition data and/or inter-prediction partition data portions of compressed partition data 512, and decoder module 512 may implement an adaptive codebook variable length coding for the decompression of the slices or regions data portions of compressed partition data 512 to generate partition data 522. In some examples, the intra-prediction partition data and/or inter-prediction partition data may include data indicating the partitioning of tiles into partitions, partitions into sub-partitions, or the like. In some examples, the partitions and/or sub-partitions may include prediction partitions and/or sub-partitions. In some examples, partitions and/or sub-partitions may include coding partitions and/or sub-partitions. In some examples, decoder module 502 may determine which coding technique to implement for the decompression of the intra-prediction partition data and/or inter-prediction partition data portions of compressed video data 512 based on a parameter or indicator provided via bitstream 201.

Further, in some examples, decoder module 503 may receive compressed modes and reference types data 513, which may include compressed modes (e.g., intra, split, skip, auto, inter, or multi) data and/or references data for each prediction partition. For example, the mode split information may indicate whether a partition is further divided or not. If a partition is further divided, the mode data may further include direction information indicating whether the split is a horizontal split (e.g., hor) or a vertical split (e.g., vert). In some examples, decoder module 503 may implement an adaptive symbol-run variable length coding technique or an adaptive proxy variable length coding technique for decompression of separate coding of split/non-split partition information data, separate coding of split/non-split split information data, or prediction reference information data, and decoder module 503 may implement an adaptive variable length coding for decompression of joint coding of modes and split information to generate modes and reference types data 523. In some examples, decoder module 503 may determine which coding technique to implement for decompression of separate coding of split/non-split partition information data, separate coding of split/non-split split information data, or prediction reference information data based on a parameter or indicator provided via bitstream 201.

Further, in some examples, decoder module 504 may receive compressed coded/not-coded data 514, which may include coded/not-coded data as discussed herein. For example, a partition (or sub-partition) may be coded if it has any nonzero transform coefficients and a partition (or sub-partition) may be not-coded if it has all zero transform coefficients. In some examples, coded/not-coded data may not be needed for partitions having an intra or skip mode. In some examples, coded/not-coded data may be needed for partitions having an auto, inter, or multi mode. In some examples, decoder module 504 may implement an adaptive symbol-run variable length coding technique or an adaptive proxy variable length coding technique for decompression of coded/not-coded data to generate coded/not-coded data 524. In some examples, decoder module 504 may determine which coding technique to implement for decompression based on a parameter or indicator provided via bitstream 201.

As shown, in some examples, decoder module 505 may receive compressed transform data 515, which may include transform coefficient data. For example, for blocks or partitions or sub-partitions that are coded (e.g., have one or more nonzero transform coefficients) compressed transform data 515 may include transform coefficient data. In some examples, decoder module 505 may implement an adaptive vector variable length coding for decompression of blocks or partitions or sub-partitions having a block or partition or sub-partition size of 2 in one dimension (e.g., 2×K partitions or K×2 sized partitions. Further, decoder module 505 may implement an adaptive 1-dimensional variable length coding for decompression of blocks or partitions or sub-partitions of size 4×4 and adaptive 2-dimensional variable length coding for decompression of all other block or partition or sub-partition sizes (e.g., 4×8, 8×4, 8×8, 16×16, 32×32, 64×64, and so on). The generated transform data 525 may be transmitted to other module(s) of decoder 200 as shown.

Further, in some examples, decoder module 506 may receive compressed motion data 516, which may include motion vector data. As is discussed further below with respect to FIG. 6, in some examples, compressed motion data 516 may be decompressed using an adaptive classified variable length coding technique to generate predicted difference motion vectors. The predicted difference motion vectors may be added to motion vector prediction to generate reconstructed motion vectors. The motion vector prediction may be generated based on previously decoded motion vectors of neighboring blocks or partitions using the inverse of the technique implemented via encoder module 506, for example, and/or motion vectors. The reconstructed motion vectors may be transmitted to other module(s) of decoder 200 via motion data 526 as shown.

Further, in some examples, decoder module 507 may receive compressed intra-prediction data 517, which may include intra-prediction type or intra-prediction direction data. For example, as discussed, intra coding may use prediction, which may use neighboring past decoded partition(s) within the same frame to generate spatial prediction. In such examples, there may be predictors for indicating a past decoded partition or partitions. For example, the predictors may include dc, slope, directional, BTPC, feature matching, or the like. Further, in some examples, the directional predictor may be adaptive for different partition sizes. For example, specifying a directional predictor may include providing an technique for determining angular prediction pixel partition(s) for coding using causal neighboring decoded partitions and/or specifying a technique for entropy coding spatial prediction directions. In some examples, decoder module 517 may implement an adaptive variable length coding technique or an arithmetic coding technique for decompression of intra-prediction type or intra-prediction direction data to generate intra-prediction data 527. In some examples, decoder module 507 may determine which coding technique to implement for decompression based on a parameter or indicator provided via bitstream 201.

As discussed above, a variety of entropy coding techniques may be implemented on various data types for lossless compression of video data to generate compressed video data at an entropy encoder and for decompression of the compressed video data to generate duplicate video data at an entropy decoder.

In some examples, an adaptive symbol-run variable length coding technique may be implemented. For example, encoder and decoder modules 401, 501, 402, 502, 403, 503, and/or 404, 504 may implement an adaptive symbol-run variable length coding technique on some or all of the video data or compressed video data received.

In some examples, an adaptive symbol-run variable length coding technique may include coding of relative difference in addresses between non-skipped blocks within a frame in video coding that allows one to determine the number of consecutive skipped blocks. For example, in the context of coded/not-coded data as encoded and decoded via encoder and decoder modules 504, 504, instead of sending one bit (e.g., bit-map) for each block to signal coded/not-coded (e.g., skipped) blocks, encoder module 504, for example, may encode a run of skipped blocks. In such implementations, the longer the run of skipped blocks, the more efficiently the data may be compressed.

Further, several types of adaptivity may be added to adaptive symbol-run variable length coding technique as described herein: adaptivity that may allow for use of multiple tables, adaptivity that may allow for use of either performing this type of coding on original bit map data, inverted bitmap, differential bitmap, or gradient predictive bitmap, or the like. For example, the adaptive symbol-run variable length coding technique may include converting the first video data from bit map data to at least one of an inverted bitmap, a differential bit map, or a gradient predictive bit map before applying adaptive symbol-run variable length coding. For example, adaptive symbol-run variable length coding technique may be used to entropy encode substantially any type of event (e.g., symbol/run combination). Further, symbol/run events may be used to code multi-level (e.g., 0, 1, 2, 3, etc.) or binary (e.g., 0,1) events. In examples where multi-level events are encoded, adaptive symbol-run variable length coding technique may be applied a number of consecutive times, breaking a multi-level map into a number of binary sub-maps, with each previous sub-map, excluded from next level's sub-map, or the like.

In some examples, an adaptive proxy variable length coding technique may be implemented. For example, encoder and decoder modules 401, 501, 402, 502, 403, 503, and/or 404, 504 may implement an adaptive proxy variable length coding technique on some or all of the video data or compressed video data received.

In some examples, an adaptive proxy variable length coding technique may include substitution of original fixed length 1D blocks (e.g., groups) of bits with variable length codes (e.g., patterns of sequence of bits) such that after the replacement the resulting bitstream may be smaller in size. In some examples, at the decoder, the process may be repeated (or inversed) resulting in original intended bitstream. In some examples, the original blocks of bits replaced may be of fixed small sizes (e.g., groups of 2 bits, groups of 3 bits, or groups of 4 bits, or the like). In some examples, the replacement codes may be of small size and variable length in nature. In some examples, the adaptive proxy variable length coding discussed herein may be characterized as Short VLCs (e.g., variable length codes). Further, the adaptive proxy variable length coding technique described herein may be adaptive to content by providing multiple replacement options. In some examples, 1-dimensional blocks/groups of 2 bits may be replaced with 1-3 bit long codes. In some examples, 1-dimensional blocks/groups (or collections of blocks/groups) of 3 bits with codes may be replaced with 1-5 bit long codes. In some examples, the adaptive proxy variable length coding technique may exploit statistical redundancy within a bitstream. In some examples, the adaptive proxy variable length coding technique may provide a compression gain of about 1-1.3. In some examples, adaptive proxy variable length coding technique may offer the advantage of being amenable to application to short sequence of bits.

In some examples, an adaptive block-of-symbols variable length coding technique may be implemented. For example, encoder and decoder modules 405, 505 may implement an adaptive block-of-symbols variable length coding technique on some or all of the video data or compressed video data received.

In some examples, an adaptive block-of-symbols variable length coding technique may include two sub-coding techniques, as will be discussed further with respect to FIG. 7. For example, the adaptive block-of-symbols variable length coding technique may include an adaptive vector variable length coding technique and an adaptive 1D/2D (1-dimensional/2-dimensional) variable length coding technique. In some examples, the adaptive block-of-symbols variable length coding technique may be used to encode blocks of closely related symbols such as blocks of transform coefficients as discussed herein.

In some examples, the adaptive vector variable length coding technique of the adaptive block-of-symbols variable length coding technique may encode relatively small 2D blocks or partitions of symbols by use of a joint single codeword such that coding a block of symbols may result in a VLC (variable length coding) codebook. In some examples, the larger the size of the block or partition, the larger the size of the codebook. In some examples, the adaptive vector variable length coding technique may be applied to block or partition sizes having a size 2 in one dimension (e.g., 2×K or K×2 blocks or partitions). By applying the adaptive vector variable length coding technique to blocks or partitions of such sizes, the size of the VLC codebook may be advantageously limited.

In some examples, the adaptive 1D variable length coding technique of the adaptive block-of-symbols variable length coding technique may be used for coding 4×4 transform coefficient block or partition sizes. is essentially same as the CAVLC coder. This coder is primarily used for coding 4×4. In some examples, the adaptive 1D variable length coding technique may be implemented via a content adaptive variable length coding technique with a number of different VLC Tables used based on the context of the coefficient(s) being coded. For example, based on the context of the coefficient(s) being coded encoder and/or decoder modules 505, 505 may switch VLC Tables.

In some examples, the adaptive 2D variable length coding technique of the adaptive block-of-symbols variable length coding technique may utilize two dimensional properties of a block of symbols to switch based on context between a number of different VCL Tables. In some examples, the adaptive 2D variable length coding technique may be characterized as a CA2DVLC (Content Adaptive 2D Variable Length) coder. In some examples, In some examples, the adaptive 2D variable length coding technique may be used to encode all remaining transform coefficient block or petition sizes besides 2×K, K×2 blocks and 4×4 blocks (e.g., 4×8, 8×4, 8×8, 16×16, 32×32, 64×64, and so on).

Figure 6:
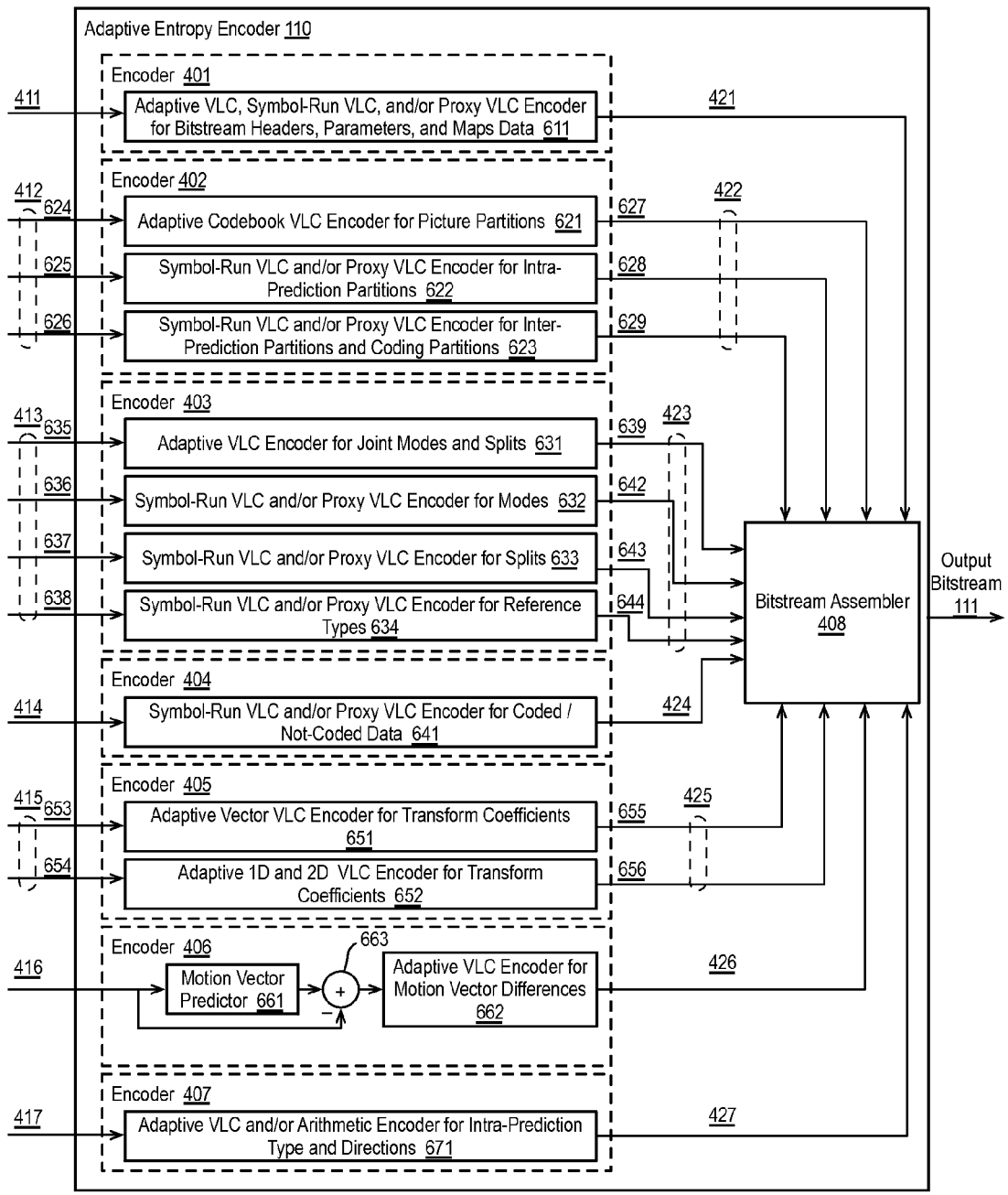
FIG. 6 is an illustrative diagram of an example entropy encoder module.

FIG. 6 is an illustrative diagram of an example entropy encoder module 110, arranged in accordance with at least some implementations of the present disclosure. As shown and as discussed above with respect to FIG. 4, entropy encoder module 110 may include bitstream headers, parameters and maps data encoder module 401, picture partitions, prediction partitions, and coding partitions encoder module 402, coding modes and reference types encoder module 403, coded/not-coded data encoder module 404, transform coefficients encoder module 405, motion vector and differential motion vector encoder module 406, intra-prediction and direction data encoder module 407, and/or bitstream assembler module 408.

As shown, encoder module 401 may include adaptive VLC, symbol-run VLC, and/or proxy VLC encoder for bitstream headers, parameters, and maps data module 611 and may receive video data 411. Video data 411 may have a data type such that video data 411 may include bitstream header data (e.g., sequence and/or picture level bitstream headers), morphing parameters, synthesizing parameters, and/or global maps data (e.g., quantizer maps of pictures indicating quantizers to be used on a partition basis). In some examples, an entropy encoding technique may be determined for video data 411 based on a parameter, parameters or characteristics of video data 411 or other system parameters. In some examples, the entropy encoding technique for video data 411 may be one of an adaptive symbol-run variable length coding technique or an adaptive proxy variable length coding technique, as described above, or a variable length coding table or tables compression technique. The determined entropy encoding technique may be applied to video data 411 to generate compressed video data 421. A variable length coding table or tables compression technique may include a content adaptive variable length coding technique with one or more tables available for coding based on video data 411, for example. In some examples, encoder module 404 may determine which technique provides the greatest compression efficiency (e.g., the fewest bits for compressed video data 421) such that the parameter(s) associated with video data 411 may be the number of bits needed for each coding technique or the like. In some examples, the parameter associated with video data 411 may be based on a characteristic of the video data such that the determined encoding technique may be adaptive to the received video data.

As shown in FIG. 6, encoder module 402 may include adaptive codebook VLC encoder for picture partitions module 621, symbol-run VLC and/or proxy VLC encoder for intra-prediction partitions module 622, and/or symbol-run VLC and/or proxy VLC encoder for inter-prediction partitions and coding partitions module 623. Also as shown, encoder module 402 may receive video data 412. In some examples, video data 412 may include picture slices or regions data 624, intra-prediction partition data 625, and/or inter-prediction and coding partition data 626.

As shown, picture slices or regions data 624 may be received via adaptive codebook VLC encoder for picture partitions module 621, which may apply adaptive codebook variable length coding to picture slices or regions data 624 to generate compressed picture slices or regions data 627. In some examples, picture slices or regions data 624 may include region boundaries for pictures, slices, regions, or the like. In some examples, adaptive codebook variable length coding may include content adaptive variable length coding using an codebook adaptive to the content of picture slices or regions data 624 or other system parameters or the like.

As shown, intra-prediction partition data 625 may be received via symbol-run VLC and/or proxy VLC encoder for intra-prediction partitions module 622. In some examples, an entropy encoding technique may be determined for intra-prediction partition data 625 based on a parameter, parameters or characteristics of intra-prediction partition data 625 or other system parameters (e.g., compression efficiency, a characteristic of the data, and so on), as discussed herein. The determined entropy encoding technique may be applied to intra-prediction partition data 625 to generate compressed intra-prediction partition data 628. As shown, in some examples, the entropy encoding technique for intra-prediction partition data 625 may be one of an adaptive symbol-run variable length coding technique or an adaptive proxy variable length coding technique, as described above. In some examples, intra-prediction partition data 625 may include partitions based on bi-tree partitioning or k-d tree partitioning, or the like.

As shown, inter-prediction and coding partition data 626 may be received via symbol-run VLC and/or proxy VLC encoder for inter-prediction partitions and coding partitions module 623. In some examples, an entropy encoding technique may be determined for or inter-prediction and coding partition data 626 based on a parameter, parameters or characteristics of or inter-prediction and coding partition data 626 or other system parameters (e.g., compression efficiency, a characteristic of the data, and so on), as discussed herein. The determined entropy encoding technique may be applied to or inter-prediction and coding partition data 626 to generate compressed or inter-prediction and coding partition data 629. As shown, in some examples, the entropy encoding technique for or inter-prediction and coding partition data 626 may be one of an adaptive symbol-run variable length coding technique or an adaptive proxy variable length coding technique, as described above. In some examples, or inter-prediction and coding partition data 426 may include inter-partitions and coding tree partitions, or the like.

As shown in FIG. 6, encoder module 403 may include adaptive VLC encoder for joint modes and splits module 631, symbol-run VLC and/or proxy VLC encoder for modes module 632, symbol-run VLC and/or proxy VLC encoder for splits module 633, and/or symbol-run VLC and/or proxy VLC encoder for reference types module 634. Also as shown, encoder module 403 may receive video data 412. In some examples, video data 412 may joint coding of modes and splits data 635, modes information data 636, split/not-split information data 637, and/or prediction reference information data 638.

As shown, joint coding of modes and splits data 635 may be received via adaptive VLC encoder for joint modes and splits module 631, which may apply adaptive variable length coding to joint coding of modes and splits data 635 to generate compressed joint coding of modes and splits data 639. In some examples, adaptive variable length coding may include content adaptive variable length coding adaptive to the content of joint coding of modes and splits data 635 or other system parameters or the like.

As discussed, in some examples, modes and splits data may be coded jointly via adaptive VLC encoder for joint modes and splits module 631. In some examples, modes and splits data may be coded separately via symbol-run VLC and/or proxy VLC encoder for modes module 632 and symbol-run VLC and/or proxy VLC encoder for splits module 633, as is discussed below. In some examples, encoder 100 (via, e.g., adaptive entropy encoder 110 and/or encode controller 103) to code jointly or separately based on results of a comparison of the coding techniques to determine which technique compresses the data most efficiently.

As shown, modes information data 636 may be received via symbol-run VLC and/or proxy VLC encoder for modes module 632. In some examples, an entropy encoding technique may be determined for modes information data 636 based on a parameter, parameters or characteristics of modes information data 636 or other system parameters (e.g., compression efficiency, a characteristic of the data, and so on), as discussed herein. The determined entropy encoding technique may be applied to modes information data 636 to generate compressed modes information data 642. As shown, in some examples, the entropy encoding technique for modes information data 636 may be one of an adaptive symbol-run variable length coding technique or an adaptive proxy variable length coding technique, as described above.

As shown, split/not-split information data 637 may be received via symbol-run VLC and/or proxy VLC encoder for splits module 633. In some examples, an entropy encoding technique may be determined for split/not-split information data 637 based on a parameter, parameters or characteristics of split/not-split information data 637 or other system parameters (e.g., compression efficiency, a characteristic of the data, and so on), as discussed herein. The determined entropy encoding technique may be applied to split/not-split information data 637 to generate compressed split/not-split information data 643. As shown, in some examples, the entropy encoding technique for split/not-split information data 637 may be one of an adaptive symbol-run variable length coding technique or an adaptive proxy variable length coding technique, as described above.

As shown, prediction reference information data 638 may be received via symbol-run VLC and/or proxy VLC encoder for reference types module 634. In some examples, an entropy encoding technique may be determined for prediction reference information data 638 based on a parameter, parameters or characteristics of prediction reference information data 638 or other system parameters (e.g., compression efficiency, a characteristic of the data, and so on), as discussed herein. The determined entropy encoding technique may be applied to prediction reference information data 638 to generate compressed prediction reference information data 644. As shown, in some examples, the entropy encoding technique for prediction reference information data 638 may be one of an adaptive symbol-run variable length coding technique or an adaptive proxy variable length coding technique, as described above.

As shown, encoder module 404 may include symbol-run VLC and/or proxy VLC encoder for coded/not-coded data 641 and may receive video data 414. Video data 414 may have a data type such that video data 411 may coded/not-coded data. For example, a partition (or sub-partition) may be coded if it has any nonzero transform coefficients and a partition (or sub-partition) may be not-coded if it has all zero transform coefficients. In some examples, coded/not-coded data may not be needed for partitions having an intra or skip mode. In some examples, coded/not-coded data may be needed for partitions having an auto, inter, or multi mode. In some examples, an entropy encoding technique may be determined for video data 414 based on a parameter, parameters or characteristics of video data 414 or other system parameters. In some examples, the entropy encoding technique for video data 414 may be one of an adaptive symbol-run variable length coding technique or an adaptive proxy variable length coding technique, as described above. The determined entropy encoding technique may be applied to video data 414 to generate compressed video data 424. In some examples, encoder module 404 may determine which technique provides the greatest compression efficiency as discussed such that the parameter(s) associated with video data 411 may be the number of bits needed for each coding technique or the like. In some examples, the parameter associated with video data 411 may be based on a characteristic of the video data such that the determined encoding technique may be adaptive to the received video data.

As shown, in some examples, encoder module 405 may include an adaptive vector VLC encoder for transform coefficients module 651 and/or an adaptive 1D and 2D VLC encoder for transform coefficients module 652.

As shown, adaptive vector VLC encoder for transform coefficients module 651 may receive transform coefficients data 653, which may include transform coefficient data for blocks or partitions or sub-partitions having a block or partition or sub-partition size of 2 in one dimension (e.g., 2×K partitions or K×2 sized partitions). An adaptive vector variable length coding technique may be applied to transform coefficients data 653 to generate compressed transform coefficients data 655. In some examples, the adaptive vector variable length coding technique may include a quad-tree division of the block or partition or the, representing each quadrant generated via the quad-tree division with a single vector codeword that represents all coefficients with a single index value, and entropy coding the codeword using a variable length coding technique or the like.

Also as shown, adaptive 1D and 2D VLC encoder for transform coefficients module 652 may receive transform coefficient data 654 and may implement an adaptive 1-dimensional variable length coding for blocks or partitions or sub-partitions of size 4×4 and an adaptive 2-dimensional variable length coding for all other block or partition or sub-partition sizes (e.g., 4×8, 8×4, 8×8, 16×16, 32×32, 64×64, and so on) to generate compressed transform coefficient data 656. As discussed, transform coefficient data 653, 654 may result from a forward transform of rectangular (or square or the like) partitions of pixel data or rectangular (or square or the like) of pixel difference values implemented via adaptive transform module 108 followed by a quantization of the resulting coefficients via adaptive quantize module 109. In some examples, the transform coefficient data may be scanned to convert it to a 1-dimensional frequency ordered partition via encoder module 405. Such conversion may be highly adaptive any partition size (e.g., 24 or more or 32 or more partition sizes), different data types (e.g., discrete cosine transform coefficients or hybrid parametric Haar transform coefficients or the like of either intra or inter partitions), and/or different quantizer set characteristics (e.g., various combinations of quantizer parameters and/or matrices). Further, a block or partition or sub-partition may belong to different picture types: I-picture (e.g., intra compensation only), P-picture (e.g., predictive) or F-picture (e.g., functional) and/or may represent different types of signal or data (e.g., luma or chroma or the like), which may be quantized with different quantizer setting.

As shown, encoder module 406 may include a motion vector predictor module 661, an adaptive VLC encoder for motion vector differences module 662, and/or a differencer 663. As shown, encoder module 406 may receive video data 416, which may include motion vector data, via motion vector predictor module 661. Motion vector predictor module 661 may perform motion vector prediction based on video data 416 (e.g., the motion vector data of video data 516) using original motion vector(s) to generate associated predicted motion vector(s). In some examples, the motion vector prediction may be based on immediate neighbors to left, right, above, or below the motion vector being predicted. In some examples, other spatial neighbors that may share the same or similar characteristics may be used. For example, a number of different types of prediction may be adaptively selected and the selection information may provided to decoder 200 via bitstream 111. Differencer 663 may difference the predicted motion vector(s) and the original motion vector(s) to generate difference motion vector(s) for entropy coding. As shown adaptive VLC encoder for motion vector differences module 662 may apply an adaptive variable length coding technique to the difference motion vector(s) to generate compressed video data 526. In some examples, differential (e.g., difference) motion vectors may have twice the range of original motion vectors. Further $\frac{1}{8}^{th}$ pel precision motion compensation may expand the range of the difference motion vector by a factor of 8. In some examples, to address such expansion, classification of large space(s) into smaller subintervals and indexing of vectors inside the subinterval may be used.

As shown, encoder module 407 may include adaptive VLC and/or arithmetic encoder for intra-prediction and directions data module 671 and may receive video data 417. Video data 517 may have a data type such that video data 417 may include intra-prediction type or intra-prediction direction data. In some examples, an entropy encoding technique may be determined for video data 417 based on a parameter, parameters or characteristics of video data 417 or other system parameters (e.g., compression efficiency or the like) as discussed herein. In some examples, the entropy encoding technique for video data 417 may be one of an adaptive variable length coding technique or an arithmetic coding technique, as described above. The determined entropy encoding technique may be applied to video data 417 to generate compressed video data 427. In some examples, the adaptive variable length coding technique may include a content adaptive variable length coding based on the content of video data 417. In some examples, the arithmetic coding technique may include a content adaptive binary arithmetic coding based on the content of video data 417. In some examples, video data 417 may support 9 or more prediction directions and a variety of prediction types including planar, Binary Tree Predictive Coding (BTPC), or the like.

As shown in FIG. 6 and discussed above with respect to FIG. 4, the output encoder modules 401-407 (via the associated sub-modules) may be input to bitstream assembler 408, which may output a multiplexed bitstream formatted per the bitstream syntax, as discussed above.

Figure 7:
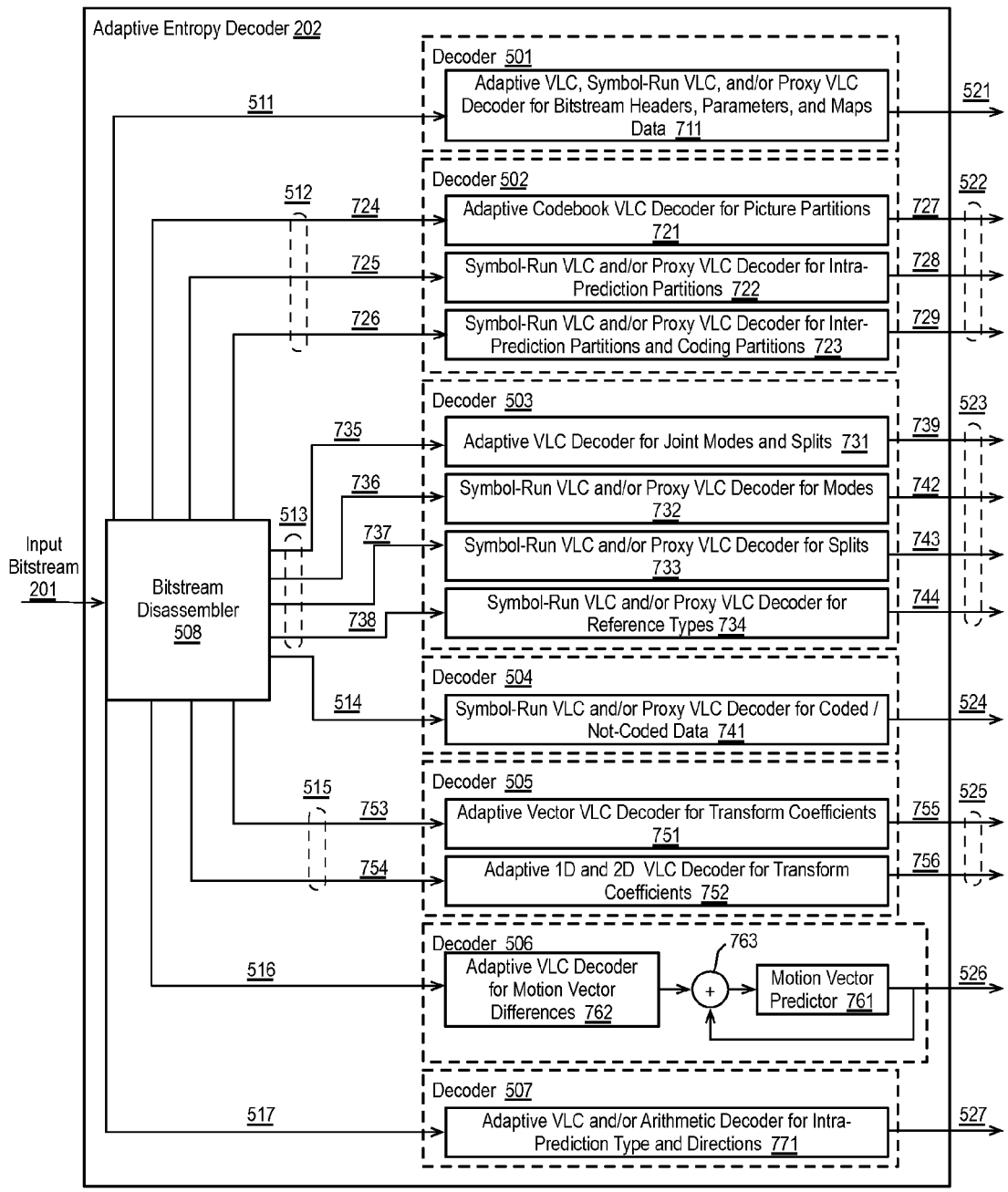
FIG. 7 is an illustrative diagram of an example entropy decoder module.

FIG. 7 is an illustrative diagram of an example entropy decoder module 202, arranged in accordance with at least some implementations of the present disclosure. As shown and as discussed above with respect to FIG. 5, entropy decoder module 202 may include headers, parameters and maps data decoder module 501, picture partitions, prediction partitions, and coding partitions decoder module 502, coding modes and reference types decoder module 503, coded/not-coded data decoder module 504, transform coefficients decoder module 505, motion vector and differential motion vector decoder module 506, intra-prediction and direction data decoder module 507, and/or bitstream disassembler module 508. In some examples, entropy decoder module 202 (and the pertinent sub-modules) may perform an inverse technique with respect to entropy encoder module 110 (and the pertinent sub-modules) such that there may be a one-to-one correspondence between encoder modules (and sub-modules) and decoder modules (and sub-modules).

As shown, bitstream disassembler module 508 may receive input bitstream 201. In some examples, input bitstream 201 may be a valid bitstream such as, for example, a valid next generation video (NGV) coded bitstream, which may follow a NGV bitstream syntax specification or any valid bitstream as discussed herein. As discussed with respect to FIG. 5, bitstream disassembler module 508 may disassemble input bitstream 201 to determine compressed video data 511-517, which may each have one or more component parts as discussed further below. For example, bitstream disassembler module 508 may use a predefined syntax or specification to divide input bitstream 201 into component compressed video data 511-517 by data type for decompression via decoder modules 501-507. In some examples, bitstream disassembler module 508 may perform an inverse operation with respect to bitstream assembler module 308. In some examples, the disassembling of input bitstream 201 may be characterized as a de-multiplexing.

As shown, decoder module 501 may include adaptive VLC, symbol-run VLC, and/or proxy VLC decoder for headers, parameters, and maps data module 711 and may receive compressed video data 511. In some examples, compressed video data 511 may include header data (e.g., sequence and/or picture level bitstream headers), morphing parameters, synthesizing parameters, and/or global maps data entropy encoded using one of an adaptive symbol-run variable length coding technique, an adaptive proxy variable length coding technique, or a variable length coding table or tables compression technique. In some examples, adaptive VLC, symbol-run VLC, and/or proxy VLC decoder for headers, parameters, and maps data module 711 may determine an entropy decoding technique applicable to compressed video data 511 and decode compressed video data 511 using the applicable technique to generate video data 521. In some examples, the applicable technique may be determined based on an indicator, parameter, header data, or the like conveyed via input bitstream 201.

As shown, decoder module 502 may include adaptive codebook VLC decoder for picture partitions module 721, symbol-run VLC and/or proxy VLC decoder for intra-prediction partitions data module 722, and/or symbol-run VLC and/or proxy VLC decoder for inter-prediction partitions and coding partitions data module 723 and may receive compressed video data 512.

As shown, compressed picture slices or regions data 724 may be received via adaptive codebook VLC decoder for picture partitions module 721. In some examples, adaptive codebook VLC decoder for picture partitions module 721 may apply adaptive codebook variable length coding to compressed picture slices or regions data 724 to generate picture slices or regions data 727. As discussed, adaptive codebook variable length coding may include content adaptive variable length coding using an codebook adaptive to the content of compressed picture slices or regions data 724 or other system parameters or the like. In some examples, the codebook may be implemented via adaptive codebook VLC decoder for picture partitions module 721.

As shown, symbol-run VLC and/or proxy VLC decoder for intra-prediction partitions data 722 may receive compressed intra-prediction partition data 725. In some examples, compressed intra-prediction partition data 725 may include compressed intra-prediction partition data entropy encoded using one of an adaptive symbol-run variable length coding technique or an adaptive proxy variable length coding technique, as described herein. In some examples, symbol-run VLC and/or proxy VLC decoder for intra-prediction partitions data 722 may determine an entropy decoding technique applicable to compressed intra-prediction partition data 725 and entropy decode compressed intra-prediction partition data 725 using the applicable technique to generate intra-prediction partition data 728. In some examples, the applicable coding technique may be determined based on an indicator, parameter, header data, or the like conveyed via input bitstream 201.

As shown, symbol-run VLC and/or proxy VLC decoder for inter-prediction partitions and coding partitions data 723 may receive compressed inter-prediction and coding partition data 726. In some examples, compressed inter-prediction and coding partition data 726 may include compressed inter-prediction and coding partition data entropy encoded using one of an adaptive symbol-run variable length coding technique or an adaptive proxy variable length coding technique, as described herein. In some examples, symbol-run VLC and/or proxy VLC decoder for inter-prediction partitions and coding partitions data 723 may determine an entropy decoding technique applicable to compressed inter-prediction and coding partition data 726 and entropy decode compressed inter-prediction and coding partition data 726 using the applicable technique to generate inter-prediction and coding partition data 729. In some examples, the applicable coding technique may be determined based on an indicator, parameter, header data, or the like conveyed via input bitstream 201.

As shown, decoder module 503 may include adaptive VLC decoder for joint modes and splits module 731, symbol-run VLC and/or proxy VLC decoder for modes module 732, symbol-run VLC and/or proxy VLC decoder for splits module 733, and/or symbol-run VLC and/or proxy VLC decoder for reference types module 734 and may receive compressed video data 513.

As discussed above with respect to encoder module 403, in some examples, modes and splits data may be coded jointly and, in some examples, modes and splits data may be coded separately. In some examples, adaptive VLC decoder for joint modes and splits module 731 may decode jointly coded data, and symbol-run VLC and/or proxy VLC decoder for modes module 732 and symbol-run VLC and/or proxy VLC decoder for splits module 733 may decode separately coded data. In some examples, whether data is jointly or separately coded may be indicated via input bitstream 201.

As shown, compressed joint coding of modes and splits data 735 may be received via adaptive VLC decoder for joint modes and splits module 731. In some examples, adaptive VLC decoder for joint modes and splits module 731 may apply adaptive variable length coding to compressed joint coding of modes and splits data 735 to generate joint coding of modes and splits data 739. As discussed, adaptive variable length coding may be content adaptive variable length coding adaptive to the content of compressed joint coding of modes and splits data 735 or other system parameters or the like.

As shown, symbol-run VLC and/or proxy VLC decoder for modes module 732 may receive compressed modes information data 736. In some examples, compressed modes information data 736 may include compressed modes information data entropy encoded using one of an adaptive symbol-run variable length coding technique or an adaptive proxy variable length coding technique, as described herein. In some examples, symbol-run VLC and/or proxy VLC decoder for modes module 732 may determine an entropy decoding technique applicable to compressed modes information data 736 and entropy decode compressed modes information data 736 using the applicable technique to generate modes information data 742. In some examples, the applicable coding technique may be determined based on an indicator, parameter, header data, or the like conveyed via input bitstream 201.

As shown, symbol-run VLC and/or proxy VLC decoder for splits module 733 may receive compressed splits information data 737. In some examples, compressed splits information data 737 may include compressed splits information data entropy encoded using one of an adaptive symbol-run variable length coding technique or an adaptive proxy variable length coding technique, as described herein. In some examples, symbol-run VLC and/or proxy VLC decoder for splits module 733 may determine an entropy decoding technique applicable to compressed splits information data 737 and entropy decode compressed splits information data 737 using the applicable technique to generate splits information data 743. In some examples, the applicable coding technique may be determined based on an indicator, parameter, header data, or the like conveyed via input bitstream 201.

As shown, symbol-run VLC and/or proxy VLC decoder for reference types module 734 may receive compressed reference types information data 738. In some examples, compressed reference types information data 738 may include compressed reference types information data entropy encoded using one of an adaptive symbol-run variable length coding technique or an adaptive proxy variable length coding technique, as described herein. In some examples, symbol-run VLC and/or proxy VLC decoder for reference types module 734 may determine an entropy decoding technique applicable to compressed reference types information data 738 and entropy decode compressed reference types information data 738 using the applicable technique to generate reference types information data 744. In some examples, the applicable coding technique may be determined based on an indicator, parameter, header data, or the like conveyed via input bitstream 201.

As shown, decoder module 504 may include symbol-run VLC and/or proxy VLC decoder for coded/not-coded data module 741 and may receive compressed video data 514. In some examples, compressed video data 514 may include coded/not-coded, as discussed herein, entropy encoded using one of an adaptive symbol-run variable length coding technique or an adaptive proxy variable length coding technique. In some examples, symbol-run VLC and/or proxy VLC decoder for coded/not-coded data module 741 may determine an entropy decoding technique applicable to compressed video data 514 and decode compressed video data 514 using the applicable technique to generate video data 524. In some examples, the applicable technique may be determined based on an indicator, parameter, header data, or the like conveyed via input bitstream 201. In some examples, the applicable technique may be one of an adaptive symbol-run variable length coding technique or an adaptive proxy variable length coding technique.

As shown, decoder module 505 may include adaptive vector VLC decoder for transform coefficients module 751 and/or adaptive 1D and 2D VLC decoder for transform coefficients module 752 and may receive compressed video data 515.

As shown, adaptive vector VLC decoder for transform coefficients module 751 may receive compressed transform coefficients data 753, which may include compressed transform coefficients data for blocks or partitions or sub-partitions having a size of 2 in one dimension (e.g., 2×K partitions or K×2 sized partitions), as discussed herein. In some examples, adaptive vector VLC decoder for transform coefficients module 751 may apply an adaptive vector variable length coding technique to entropy decode compressed transform coefficients data 753 to generate transform coefficients data 755. As discussed, In some examples, the adaptive vector variable length coding technique may include using a variable length codeword to generate all coefficients of a quad-tree division of the block, which may be generated via merging the quad-tree division.

As shown, adaptive 1D and 2D VLC decoder for transform coefficients module 752 may receive compressed transform coefficients data 754, which may include compressed transform coefficients data for blocks or partitions or sub-partitions of size 4×4 and all other block or partition or sub-partition sizes (e.g., 4×8, 8×4, 8×8, 16×16, 32×32, 64×64, and so on). In some examples, adaptive 1D and 2D VLC decoder for transform coefficients module 752 may apply an adaptive 1-dimensional variable length coding for blocks or partitions or sub-partitions of size 4×4 and an adaptive 2-dimensional variable length coding for all other block or partition or sub-partition sizes (e.g., 4×8, 8×4, 8×8, 16×16, 32×32, 64×64, and so on) to entropy decode compressed transform coefficients data 754 to generate transform coefficients data 756.

As shown, decoder module 506 may include an adaptive VLC decoder for motion vector differences module 762, a motion vector predictor 761 and an adder 763, and may receive compressed video data 516. In some examples, adaptive VLC decoder for motion vector differences module 762 may decode compressed video data 516 to generate motion vector differences. Furthermore, motion vector predictor 761 may generate prediction motion vectors using previously decoded neighboring motion vectors in analogy to the techniques discussed with respect to motion vector predictor module 661. As shown, decoded difference motion vector(s) may be added via adder 763 to prediction motion vector(s) to generate reconstructed motion vector(s), which may be output as a part of video data 526 and further used to perform motion vector prediction for other motion vectors via motion vector predictor module 761.

As shown, decoder module 507 may include adaptive VLC and/or arithmetic decoder for intra-prediction type and direction module 771 and may receive compressed video data 517. In some examples, compressed video data 517 may include intra-prediction type and direction data entropy encoded using one of an adaptive VLC technique or an arithmetic coding technique. In some examples, adaptive VLC and/or arithmetic decoder for intra-prediction type and direction module 771 may determine an entropy decoding technique applicable to compressed video data 517 and decode compressed video data 517 using the applicable technique to generate video data 527. In some examples, the applicable technique may be determined based on an indicator, parameter, header data, or the like conveyed via input bitstream 201.

As discussed, video data 521-527 (including various sub-components as discussed) may be transmitted to various components of decoder 200. Further, as discussed, decoder 200 may use entropy decoded video data 521-527 to generate video frames, which may be output, via display video 219, for presentment or display via a display device for a user.

FIG. 8 is a flow diagram illustrating an example process 800, arranged in accordance with at least some implementations of the present disclosure. Process 800 may include one or more operations, functions or actions as illustrated by one or more of operations 802, 804, 806, and/or 808. Process 800 may form at least part of a next generation video coding process. By way of non-limiting example, process 800 may form at least part of a next generation video encoding process as undertaken by encoder system 100 of FIG. 1 and/or entropy encoder module 110 of FIG. 5 or 7.

Process 800 may begin at operation 802, "Obtain First and Second Video Data of Different Types for Entropy Encoding", where first and second (or additional) video data of different types may be obtained or received for entropy coding. For example, two or more of video data 411-417 (and/or any sub-components of video data 511-517) may be received. In some examples, video data 411-417 may be received via adaptive entropy encoder 110. As discussed, the first and second (or additional) video data may be of different types such as any of the types or sub-component types as discussed with respect to video data 411-417 or elsewhere herein.

Process 800 may continue at operation 804, "Determine an Entropy Encoding Technique for the First Video Data", where a first entropy encoding technique may be determined for the first video data. As discussed, in some examples, one or more of encoder modules 401-407 may determine a coding technique for video data 411-417 from various coding technique options. For example, encoder module 401 may determine a coding technique for video data 411 from one of an adaptive symbol-run variable length coding technique, an adaptive proxy variable length coding technique, or a variable length coding table or tables compression technique. Further, encoder module 402 may determine a coding technique for intra-prediction partition data 625 of video data 402 from one of an adaptive symbol-run variable length coding technique and an adaptive proxy variable length coding technique, and so on. A wide range of examples have been provided herein with respect to FIGS. 4 and 6 and will not be repeated here for the sake of brevity. As discussed, in some examples, two ore more types of video data may be received. In some examples, an entropy encoding technique may be determined for two, three, or more types of video data as described herein.

As discussed, an entropy encoding technique may be determined for video data. In some examples, a selected coding table associated with the first encoding technique may be determined from two or more available tables. For example, the table selection may be made based on a bit count comparison, a coding efficiency, or the like between the available tables. For example, any of the described entropy encoding techniques discussed herein may have multiple available tables. In some examples, a table indicator may be generated and provided in bitstream 900 indicating the selected table for the video data. For example, bitstream 900 may include indicators indicating the selected encoding technique and the selected coding table. Further an indicator or indicators associated with the length of the video data may be included into bitstream 900. For example, the length or number of tuples in the video data (e.g. the length of the string of video) may be provided and any remainder portion (e.g., if the length is not evenly divided into tuples) may be coded using a bit map technique and provided into the output bitstream.

Process 800 may continue at operation 806, "Entropy Encode the First Video Data using the First Entropy Encoding Technique and Entropy Encode the Second Video Data to Generate First and Second Compressed Video Data", where the first video data may be entropy encoded using the first entropy encoding technique to generate first compressed video data and the second video data may be compressed using a second entropy encoding technique to generate first and second compressed video data.

Process 800 may continue at operation 808, "Assemble the First and Second Compressed Video Data to Generate an Output Bitstream", where the first compressed video data and the second compressed video data may be assembled to generate an output bitstream. For example, bitstream assembler 508 may assemble or multiplex the first compressed video data and the second compressed video data to generate output bitstream 111 as discussed herein.

As discussed, in some examples, output bitstream 111 may be multiplexed with an audio stream (coded or uncoded) to generate a multiplexed audio-visual stream. Further, as discussed, in some examples, one or more of the video data may be preprocessed or otherwise manipulated prior to entropy coding. For example, for motion vector data, motion vector prediction may be performed to generate predicted motion vector(s), the predicted motion vector(s) may be differenced with the original motion vector(s) to generate difference motion vector(s), and the difference motion vector(s) may be entropy coded as discussed herein. Further, in some examples, each of the seven encoder modules 401-407 may be implemented simultaneously to operate on seven types of video data 411-417. Process 800 may be implemented via adaptive entropy encoder module 110 as discussed herein. Further, process 800 may be repeated either in serial or in parallel on any number of instantiations of video data.

As discussed, video data of different types may be entropy coded using a variety of determined (or predetermined) adaptive entropy coding techniques to generate compressed video data. The compressed video data may be assembled to generate an output bitstream.

Figure 9:
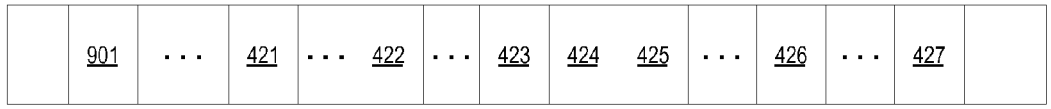
FIG. 9 illustrates an example bitstream.

FIG. 9 illustrates an example bitstream 900, arranged in accordance with at least some implementations of the present disclosure. In some examples, bitstream 900 may correspond to output bitstream 111 as shown in FIGS. 1,3a, 4, and 6 and/or input bitstream 201 as shown in FIGS. 2, 3b, 5, and 7. Although not shown in FIG. 9 for the sake of clarity of presentation, in some examples bitstream 900 may include a header portion and a data portion. In various examples, bitstream 900 may include data, indicators, index values, mode selection data, or the like associated with encoding compressed video as discussed herein. As shown, in some examples, bitstream 900 may include indicator data 901, compressed video data 421, compressed video data 422, compressed video data 423, compressed video data 424, compressed video data 425, compressed video data 426, and/or compressed video data 427. The illustrated data may be in any order in bitstream 900 and may be adjacent or separated by any other of a variety of additional data for coding video. As discussed, bitstream 900 may also include indicators indicating the selected encoding technique and the selected coding table (e.g., in indicator data 901). Further an indicator or indicators associated with the length of the video data may be included into bitstream 900. For example, the length or number of tuples in the video data (e.g. the length of the string of video) may be provided and any remainder portion (e.g., if the length is not evenly divided into tuples) may be coded using a bit map technique and provided into the output bitstream.

In some examples, compressed video data 421-427 may include any compressed video data encoded via any technique as discussed herein. In some examples, indicator data 901 may include header data, mode indicator data, and/or data indicating entropy encoding techniques associated with compressed video data 421-427. For example, indicator data 901 may indicate an entropy coding technique used for compressing video data 421, an entropy coding technique used for compressing portions of video data 422, an entropy coding technique used for compressing portions of video data 423, an entropy coding technique used for compressing video data 424, and/or an entropy coding technique used for compressing video data 427, as discussed herein with respect to FIGS. 4 and 6.

As discussed, bitstream 900 may be generated by an encoder such as, for example, encoder 100 and/or received by a decoder 200 for decoding such that video frames may be presented via a display device.

Figure 10:
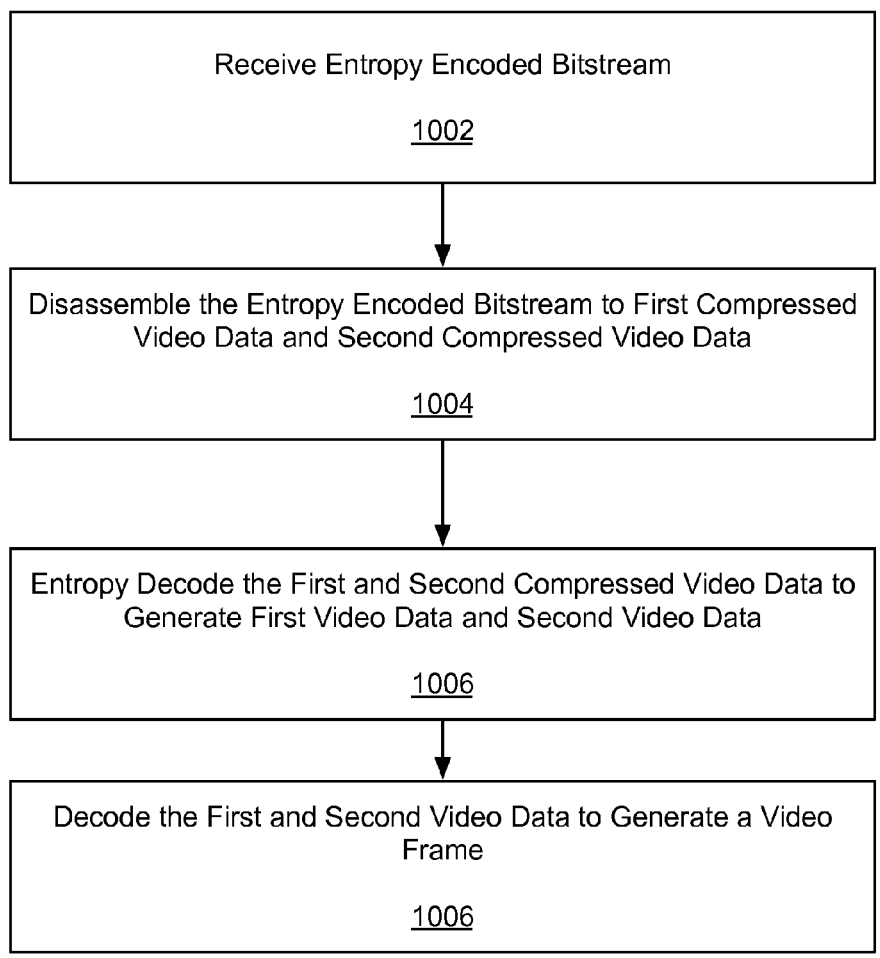
FIG. 10 is a flow diagram illustrating an example process.

FIG. 10 is a flow diagram illustrating an example process 1000, arranged in accordance with at least some implementations of the present disclosure. Process 1000 may include one or more operations, functions or actions as illustrated by one or more of operations 1002, 1004, 1006, and/or 1008. Process 1000 may form at least part of a next generation video coding process. By way of non-limiting example, process 1000 may form at least part of a next generation video decoding process as undertaken by decoder system 200 of FIG. 2.

Process 1000 may begin at operation 1002, "Receive Entropy Encoded Bitstream", where an entropy encoded bitstream may be received. For example, a bitstream encoded as discussed herein may be received at a video decoder. In some examples, bitstream 100 or 900 or the like may be received via decoder 200.

Process 1000 may continue at operation 1004, "Disassemble the Entropy Encoded Bitstream to First Compressed Video Data and Second Compressed Video Data", where the received bitstream may be disassembled to determine different types of compressed video data. For example, bitstream 201 may be disassembled via bitstream disassembler 508 to generate compressed video data 511-517 (and any sub-component video data) as illustrated in FIG. 7. For example, the disassembled compressed video data may include first compressed video and second compressed video data.

Process 1000 may continue at operation 1006, "Entropy Decode the First and Second Compressed Video Data to Generate First Video Data and Second Video Data", where first and second compressed video data may be entropy decoded to generate (decompressed) first and second video data. As discussed, in some examples, one or more of decoder modules 501-507 may determine a coding technique for compressed video data 511-517 from various coding technique options. For example, decoder module 501 may determine a coding technique for compressed video data 511 from one of an adaptive symbol-run variable length coding technique, an adaptive proxy variable length coding technique, or a variable length coding table or tables compression technique based on an indicator or indicators provided via the input bitstream. Further, decoder module 502 may determine a coding technique for compressed intra-prediction partition data 725 of video data 512 from one of an adaptive symbol-run variable length coding technique and an adaptive proxy variable length coding technique, and so on. A wide range of examples have been provided herein with respect to FIGS. 5 and 7 and will not be repeated here for the sake of brevity. As discussed, in some examples, two ore more types of video data may be received. In some examples, an entropy decoding technique may be determined for two, three, or more types of video data as described herein.

Process 1000 may continue at operation 1008, "Decode the First and Second Video Data to Generate a Video Frame", where the first and second video data (and any other entropy decoded video data) may be decoded to generate video frame(s). The video frames may be suitable for presentment to a user via a display device, for example.

As discussed, in some examples, one or more of the entropy decoded video data may be post-processed or otherwise manipulated prior to further decoding. For example, entropy decoded difference motion vector(s) may be added to prediction motion vector(s) to generate reconstructed motion vector(s), which may be output for use in motion vector prediction (e.g., inter-prediction) via decoder 200.

Various components of the systems described herein may be implemented in software, firmware, and/or hardware and/or any combination thereof. For example, various components of encoder 100 or encoder 200 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

Some additional and/or alternative details related to process 800, 1000 and other processes discussed herein may be illustrated in one or more examples of implementations discussed herein and, in particular, with respect to FIG. 11 below.

Figure 11:
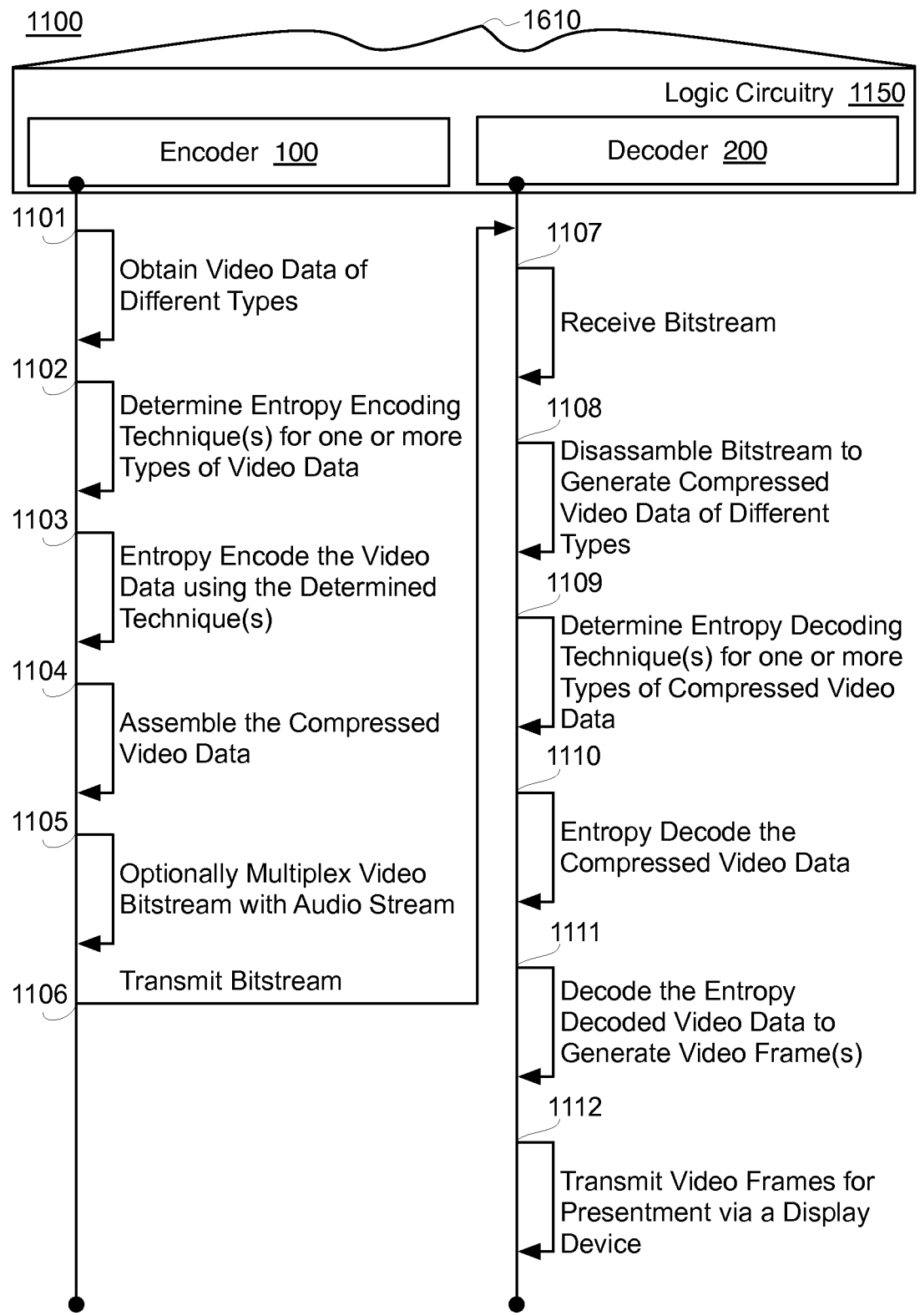
FIG. 11 is an illustrative diagram of an example video coding system and video coding process in operation.

FIG. 11 is an illustrative diagram of an example video coding system 1610 and video coding process 1100 in operation, arranged in accordance with at least some implementations of the present disclosure. In the illustrated implementation, process 1100 may include one or more operations, functions or actions as illustrated by one or more of actions 1100-1112. By way of non-limiting example, process 1100 will be described herein with reference to example video coding system 1610 including encoder 100 of FIG. 1 and decoder 200 of FIG. 2, as is discussed further herein below with respect to FIG. 16. In various examples, process 1100 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

Figure 16:
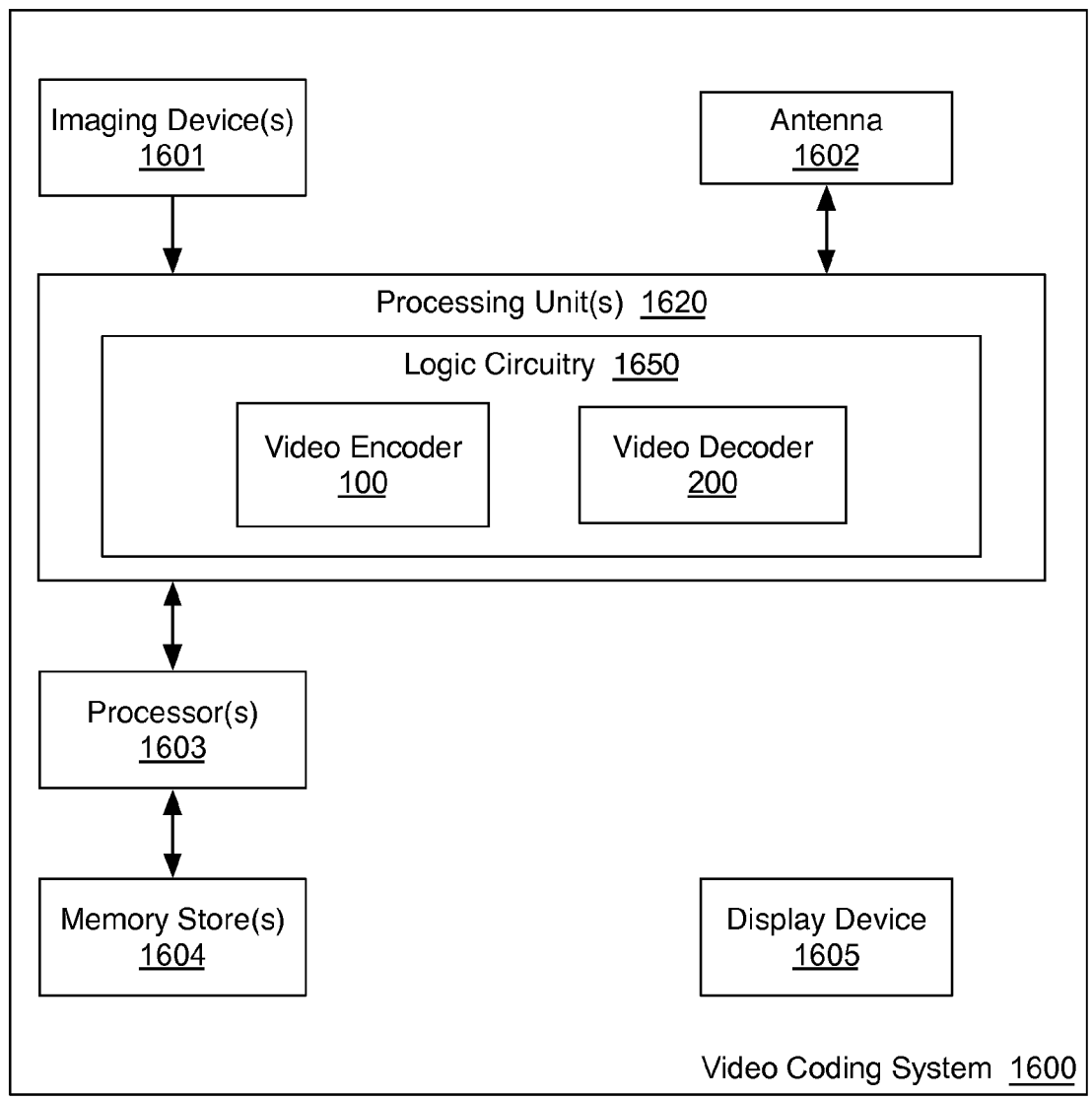
FIG. 16 is an illustrative diagram of an example video coding system.

In the illustrated implementation, video coding system 1610 may include logic circuitry 1150, the like, and/or combinations thereof. For example, logic circuitry 1150, may include encoder 100 and may include any modules as discussed with respect to FIG. 1 and/or FIGS. 3 and 5 and decoder 200 and may include any modules as discussed with respect to FIG. 2 and/or FIGS. 4 and 6. Although video coding system 1610, as shown in FIG. 16, may include one particular set of blocks or actions associated with particular modules, these blocks or actions may be associated with different modules than the particular module illustrated here. Although process 1100, as illustrated, is directed to encoding and decoding, the concepts and/or operations described may be applied to encoding and/or decoding separately, and, more generally, to video coding.

Process 1100 may begin at operation 1101, "Obtain Video Data of Different Types", where video data of different types may be received for entropy encoding. For example two or more types of video data may be received for entropy encoding. For example, two or more of video data 411-417 (and/or any sub-components of video data 411-417) may be received via adaptive entropy encoder 110. As discussed, the first and second (or additional) video data may be of different types such as any of the types or sub-component types as discussed with respect to video data 411-417 or elsewhere herein.

Process 1100 may continue from operation 1101 to operation 1102, "Determine Entropy Encoding Technique(s) for one or more Types of Video Data", where entropy encoding technique(s) may be determined for one or more of the video data types. As discussed, in some examples, one or more of encoder modules 401-407 may determine a coding technique for video data 411-417 from various coding technique options. For example, encoder module 401 may determine a coding technique for video data 411 from one of an adaptive symbol-run variable length coding technique, an adaptive proxy variable length coding technique, or a variable length coding table or tables compression technique. Further, encoder module 402 may determine a coding technique for intra-prediction partition data 625 of video data 402 from one of an adaptive symbol-run variable length coding technique and an adaptive proxy variable length coding technique, and so on as discussed herein.

Process 1100 may continue at operation 1103, "Entropy Encode the Video Data using the Determined Technique(s)", the video data may be entropy encoded using the determined technique(s). For example, first video data may be entropy encoded using a first entropy encoding technique to generate first compressed video data. In some examples, second, third, or more additional video data may be entropy encoded using second, third or more additional entropy encoding techniques as discussed herein to generate first, second, third, and so on respective compressed video data.

Process 1100 may continue from operation 1103 to operation 1104, "Assemble the Compressed Video Data", where the compressed video data of different types may be assembled to generate an output bitstream. For example, bitstream assembler 408 may assemble or multiplex the compressed video data to generate output bitstream 111 as discussed herein.

Process 1100 may continue from operation 1104 to operation 1105, "Optionally Multiplex Video Bitstream with Audio Stream", where the video bitstream may be optionally multiplexed with a coded or uncoded audio stream to generate an audio-visual bitstream.

Process 1100 may continue from operation 1105 or operation 1104 to operation 1106, "Transmit Bitstream", where the bitstream may be transmitted. For example, video coding system 1610 may transmit output bitstream 111 or bitstream 800 or the like via an antenna 1102 (please refer to FIG. 16).

Operations 1101-1106 may provide for video encoding and bitstream transmission techniques, which may be employed by an encoder system as discussed herein. The following operations, operations 1107-1112 may provide for video decoding and video display techniques, which may be employed by a decoder system as discussed herein.

Process 1100 may continue at operation 1107, "Receive Bitstream", where the encoded bitstream may be received. For example, input bitstream 100, 201, or bitstream 800 or the like may be received via decoder 200. In some examples, the bitstream may include different types of entropy encoded data as discussed herein.

Process 1100 may continue from operation 1107 to operation 1108, "Disassemble Bitstream to Generate Compressed Video Data of Different Types", where the received bitstream may be disassembled to determine different types of compressed video data. For example, bitstream 201 may be disassembled via bitstream disassembler 508 to generate compressed video data 511-517 (and any sub-component video data) as illustrated in FIG. 7. For example, the disassembled compressed video data may include first, second, third, or more compressed video data.

Process 1100 may continue from operation 1108 to operation 1109, "Determine Entropy Decoding Technique(s) for one or more Types of Compressed Video Data", entropy decoding technique(s) may be determined for one or more of the compressed video data types. In some examples, the entropy decoding technique(s) may be determined based on a flag or indicator or the like conveyed via the received bitstream. As discussed, in some examples, one or more of decoder modules 501-507 may determine a coding technique for compressed video data 511-517 from various coding technique options. For example, decoder module 401 may determine a coding technique for compressed video data 511 from one of an adaptive symbol-run variable length coding technique, an adaptive proxy variable length coding technique, or a variable length coding table or tables compression technique based on an indicator or indicators provided via the input bitstream. Further, decoder module 502 may determine a coding technique for compressed intra-prediction partition data 725 of video data 512 from one of an adaptive symbol-run variable length coding technique and an adaptive proxy variable length coding technique, and so on. A wide range of examples have been provided herein and will not be repeated here for the sake of brevity. As discussed, in some examples, two ore more types of video data may be received. In some examples, an entropy decoding technique may be determined for two, three, or more types of video data as described herein.

Process 1100 may continue from operation 1109 to operation 1610, "Entropy Decode the Compressed Video Data", where the compressed video data may be entropy decoded based on the determined entropy decoding techniques. For example, compressed video data 511-517 may be entropy decoded via decode modules 501-507.

Process 1100 may continue from operation 1610 to operation 1111, "Decode the Entropy Decoded Video Data to Generate Video Frame(s)", where the first and second video data (and any other entropy decoded video data) may be decoded to generate video frame(s). The video frames may be suitable for presentment to a user via a display device, for example. For example, the video frame may be determined based on the implementation of decode techniques discussed with respect to decoder 200.

Process 1100 may continue from operation 1111 to operation 1112, "Transmit Video Frames for Presentment via a Display Device", where generated video frame(s) may be transmitted for presentment via a display device. For example, the video frame(s) may be transmitted to a display device 1105 (as shown in FIG. 16) for presentment. In some examples, display device 1105 may display the video frames to a user, for example.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the video systems as discussed herein.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

Figure 12:
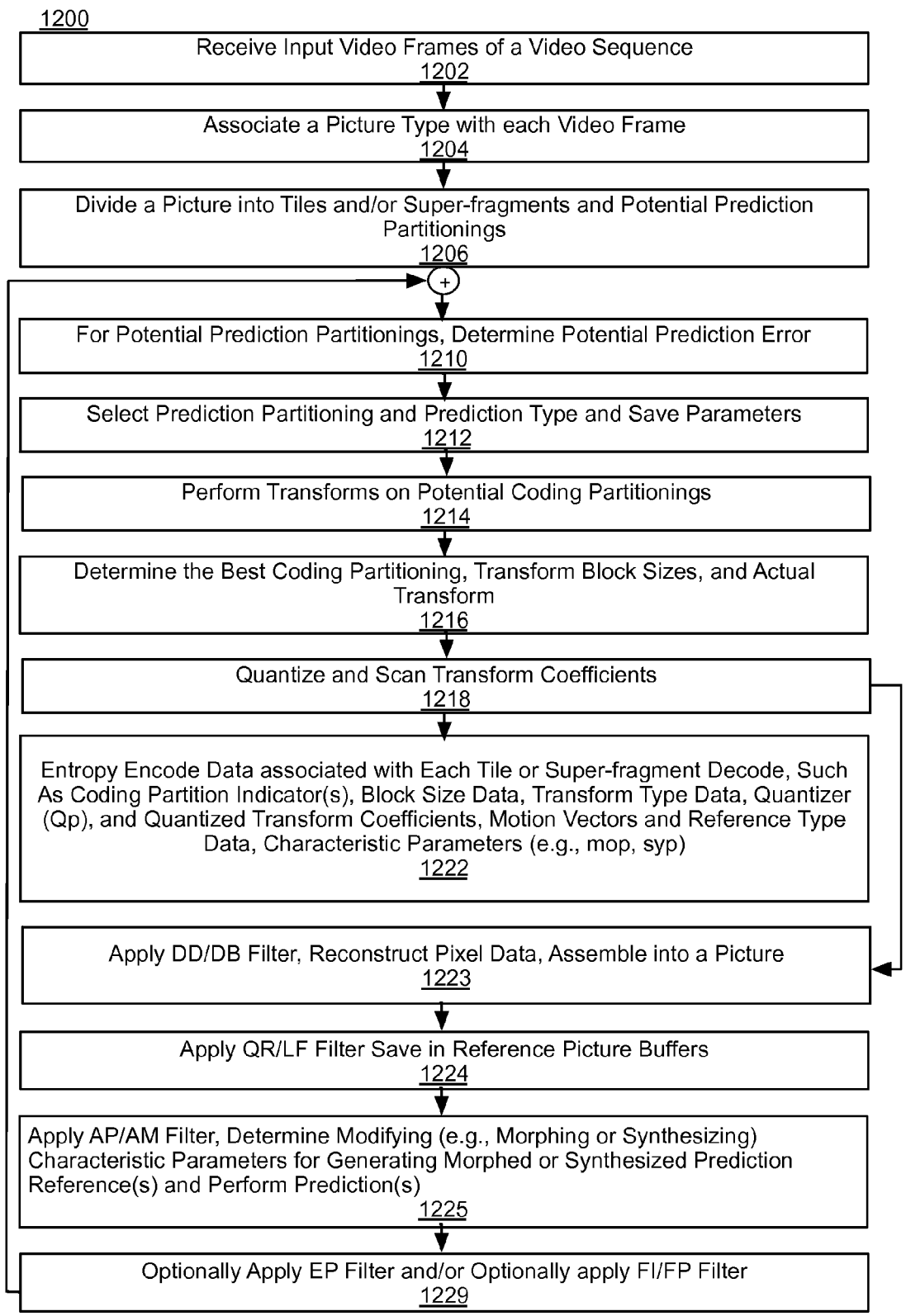
FIG. 12 is a flow diagram illustrating an example encoding process.

FIG. 12 is a flow diagram illustrating an example process 1200, arranged in accordance with at least some implementations of the present disclosure. Process 1200 may include one or more operations, functions or actions as illustrated by one or more operations. Process 1200 may form at least part of a next generation video coding process. By way of non-limiting example, process 1200 may form at least part of a next generation video encoding process as undertaken by encoder system 100 of FIG. 1 and/or any other encoder system or subsystems described herein.

Process 1200 may begin at operation 1202, "Receive Input Video Frames of a Video Sequence", where input video frames of a video sequence may be received via encoder 100 for example.

Process 1200 may continue at operation 1204, "Associate a Picture Type with each Video Frame", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 1203 through 1211) may be performed on a frame or picture of a group of pictures and the processing may be repeated for all frames or pictures of a group and then repeated for all groups of pictures in a video sequence.

Process 1200 may continue at operation 1206, "Divide a Picture into Tiles and/or Super-fragments and Potential Prediction Partitionings", where a picture may be divided into tiles or super-fragments and potential prediction partitions via prediction partitions generator 105 for example.

Process 1200 may continue at operation 1210, "For Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 1200 may continue at operation 1212, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 1200 may continue at operation 1214, "Perform Transforms on Potential Coding Partitionings", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 1200 may continue at operation 1216, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 1200 may continue at operation 1218, "Quantize and Scan Transform Coefficients", where transform coefficients associated with coding partitions (and/or transform blocks) may be quantized and scanned in preparation for entropy coding.

Process 1200 may continue at operation 1222, "Entropy Encode Data associated with Each Tile or Super-fragment Decode, Such As Coding Partition Indicator(s), Block Size Data, Transform Type Data, Quantizer (Qp), and Quantized Transform Coefficients, Motion Vectors and Reference Type Data, Characteristic Parameters (e.g., mop, syp)", where data may be entropy encoded. For example, the entropy encoded data may include the coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Process 1200 may continue at operation 1223 "Apply DD/DB Filter, Reconstruct Pixel Data, Assemble into a Picture", where deblock filtering (e.g., DD or DB filters) may be applied, pixel data may be reconstructed, and assembled into a picture. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture.

Process 1200 may continue at operation 1224 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 1200 may continue at operation 1225, "Apply AP/AM Filter, Determine Modifying (e.g., Morphing or Synthesizing) Characteristic Parameters for Generating Morphed or Synthesized Prediction Reference(s) and Perform Prediction(s)", where, modifying (e.g., morphing or synthesizing) characteristic parameters and prediction(s) may be performed and adaptive motion filtering or adaptive precision filtering (e.g., AP/AM Filter) may be applied. For example, modifying (e.g., morphing or synthesizing) characteristic parameters for generating morphed or synthesized prediction reference(s) may be generated and prediction(s) may be performed. Additionally, adaptive motion filtering or adaptive precision filtering may be applied at this point in the process.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to nine reference types may be supported in P-pictures, and up to ten reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, and the bitstream (discussed below with respect to operation 1212) may include a frame reference, morphing parameters, or synthesizing parameters associated with the prediction partition.

Process 1200 may continue at operation 1229 "Optionally Apply EP Filter and/or Optionally apply FI/FP Filter", where enhanced predicted partition (e.g., EP Filtering) or FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

In implementations where both EP Filtering or FI/FP Filtering are available, an indicator may be generated that indicates to the decoder system whether to use the enhanced predicted partition (e.g., EP Filtering) or the predicted partition data as the selected predicted partition for the prediction partition.

Operations 1202 through 1229 may provide for video encoding and bitstream transmission techniques, which may be employed by an encoder system as discussed herein.

FIG. 13 illustrates an example bitstream 1300, arranged in accordance with at least some implementations of the present disclosure. In some examples, bitstream 1300 may correspond to output bitstream 111 as shown in FIG. 1 and/or input bitstream 201 as shown in FIG. 2. Although not shown in FIG. 29 for the sake of clarity of presentation, in some examples bitstream 1300 may include a header portion and a data portion. In various examples, bitstream 1300 may include data, indicators, index values, mode selection data, or the like associated with encoding a video frame as discussed herein.

As discussed, bitstream 1300 may be generated by an encoder such as, for example, encoder 100 and/or received by a decoder 200 for decoding such that decoded video frames may be presented via a display device.

FIG. 14 is a flow diagram illustrating an example process 1400, arranged in accordance with at least some implementations of the present disclosure. Process 1400 may include one or more operations, functions or actions as illustrated by one or more operations. Process 1400 may form at least part of a next generation video coding process. By way of non-limiting example, process 1400 may form at least part of a next generation video decoding process as undertaken by decoder system 200 and/or any other decoder system or subsystems described herein.

Process 1400 may begin at operation 1402, "Receive Encoded Bitstream", where a bitstream may be received. For example, a bitstream encoded as discussed herein may be received at a video decoder. In some examples, bitstream 900 or 1300 may be received via decoder 200.

Process 1400 may continue at operation 1404, "Decode the Entropy Encoded Bitstream to Determine Coding Partition Indicator(s), Block Size Data, Transform Type Data, Quantizer (Qp), Quantized Transform Coefficients, Motion Vectors and Reference Type Data, Characteristic Parameters (e.g., mop, syp)", where the bitstream may be decoded to determine coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Process 1400 may continue at operation 1406, "Apply Quantizer (Qp) on Quantized Coefficients to Generate Inverse Quantized Transform Coefficients", where quantizer (Qp) may be applied to quantized transform coefficients to generate inverse quantized transform coefficients. For example, operation 1406 may be applied via adaptive inverse quantize module 203.

Process 1400 may continue at operation 1408, "On each Decoded Block of Coefficients in a Coding (or Intra Predicted) Partition Perform Inverse Transform based on Transform Type and Block Size Data to Generate Decoded Prediction Error Partitions", where, on each decode block of transform coefficients in a coding (or intra predicted) partition, an inverse transform based on the transform type and block size data may be performed to generate decoded prediction error partitions. In some examples, the inverse transform may include an inverse fixed transform. In some examples, the inverse transform may include an inverse content adaptive transform. In such examples, performing the inverse content adaptive transform may include determining basis functions associated with the inverse content adaptive transform based on a neighboring block of decoded video data, as discussed herein. Any forward transform used for encoding as discussed herein may be used for decoding using an associated inverse transform. In some examples, the inverse transform may be performed by adaptive inverse transform module 204. In some examples, generating the decoded prediction error partitions may also include assembling coding partitions via coding partitions assembler 205.

Process 1400 may continue at operation 1423 "Apply DD/DB Filter, Reconstruct Pixel Data, Assemble into a Picture", where deblock filtering (e.g., DD or DB filters) may be applied, pixel data may be reconstructed, and assembled into a picture. For example, after inverse scan, inverse transform, and assembling coding partitions, the prediction error data partitions may be added with a prediction partition to generate reconstructed prediction partitions, which may be assembled into tiles or super-fragments. The assembled tiles or super-fragments may be optionally processed via deblock filtering.

Process 1400 may continue at operation 1424 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 1400 may continue at operation 1425, "Apply AP/AM Filter, Use Decoded Modifying Characteristics (e.g., mop, syp) to Generate Modified References for Prediction and Use Motion Vectors and Reference Info, Predicted Partition Info, and Modified References to Generate Predicted Partition", where modified references for prediction may be generated and predicted partitions may be generated as well, and where adaptive motion filtering or adaptive precision filtering (e.g., AP/AM Filter) may be applied. For example, where modified references for prediction may be generated based at least in part on decoded modifying characteristics (e.g., mop, syp) and predicted partitions may be generated based at least in part on motion vectors and reference information, predicted partition information, and modified references. Additionally, adaptive motion filtering or adaptive precision filtering may be applied at this point in the process.

Process 1400 may continue at operation 1429 "Optionally Apply EP Filter and/or Optionally apply FI/FP Filter", where enhanced predicted partition (e.g., EP Filtering) or FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

In implementations where both EP Filtering or FI/FP Filtering are available, an indicator may be received from the encoder system that indicates to the decoder system whether to use the enhanced predicted partition (e.g., EP Filtering) or the predicted partition data as the selected predicted partition for the prediction partition.

Process 1400 may continue at operation 1430, "Add Prediction Partition to the Decoded Prediction Error Data Partition to Generate a Reconstructed Partition", where a prediction partition my be added to the decoded prediction error data partition to generate a reconstructed prediction partition. For example, the decoded prediction error data partition may be added to the associated prediction partition via adder 206.

Process 1400 may continue at operation 1432, "Assemble Reconstructed Partitions to Generate a Tile or Super-Fragment", where the reconstructed prediction partitions may be assembled to generate tiles or super-fragments. For example, the reconstructed prediction partitions may be assembled to generate tiles or super-fragments via prediction partitions assembler module 207.

Process 1400 may continue at operation 1434, "Assemble Tiles or Super-Fragments of a Picture to Generate a Full Decoded Picture", where the tiles or super-fragments of a picture may be assembled to generate a full decoded picture. For example, after optional deblock filtering and/or quality restoration filtering, tiles or super-fragments may be assembled to generate a full decoded picture, which may be stored via decoded picture buffer 210 and/or transmitted for presentment via a display device after processing via adaptive picture re-organizer module 217 and content post-restorer module 218.

Figure 15A:
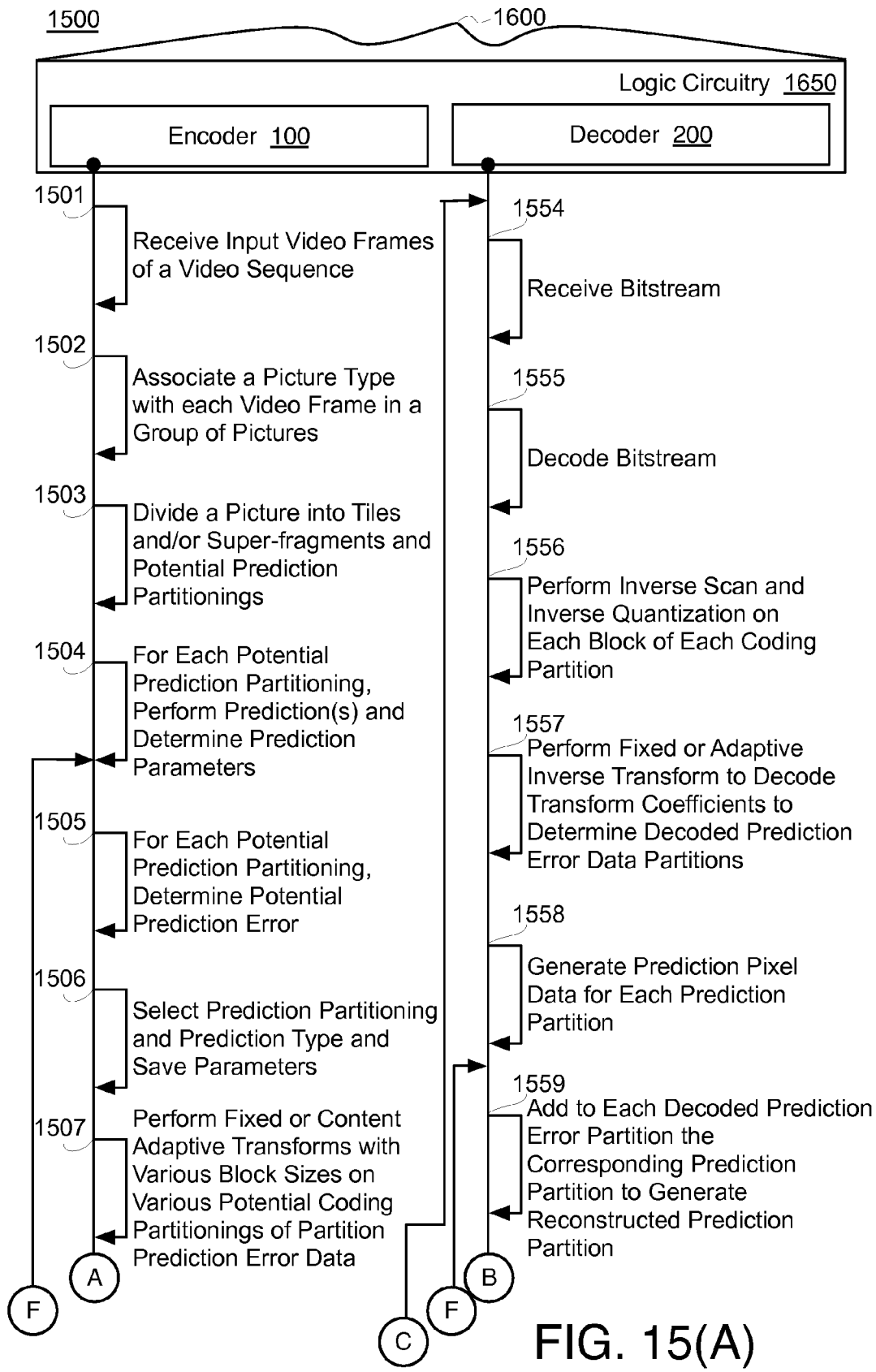
FIGS. 15(A), 15(B), and 15(C) provide an illustrative diagram of an example video coding system and video coding process in operation.
Figure 15B:
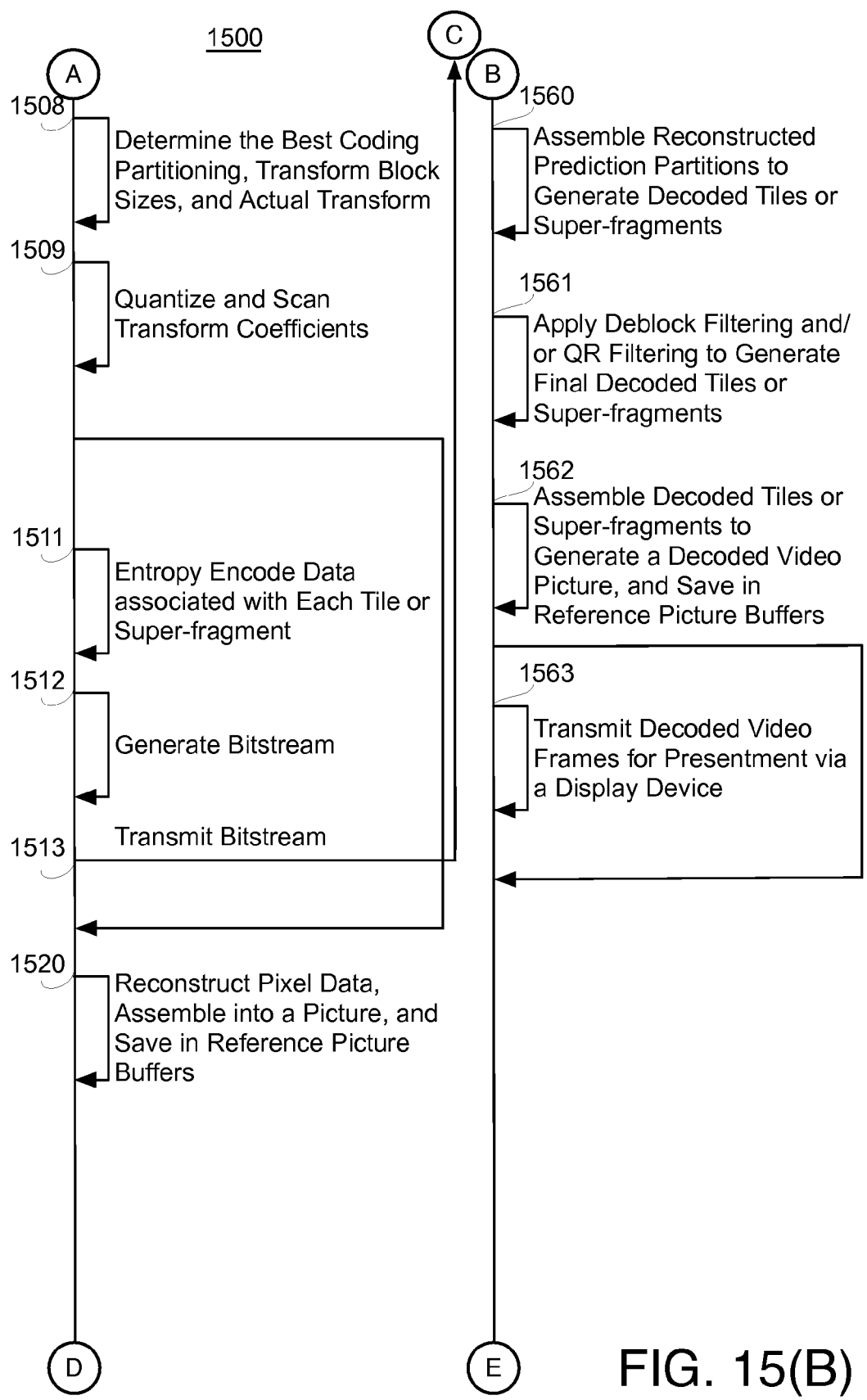
Figure 15C:
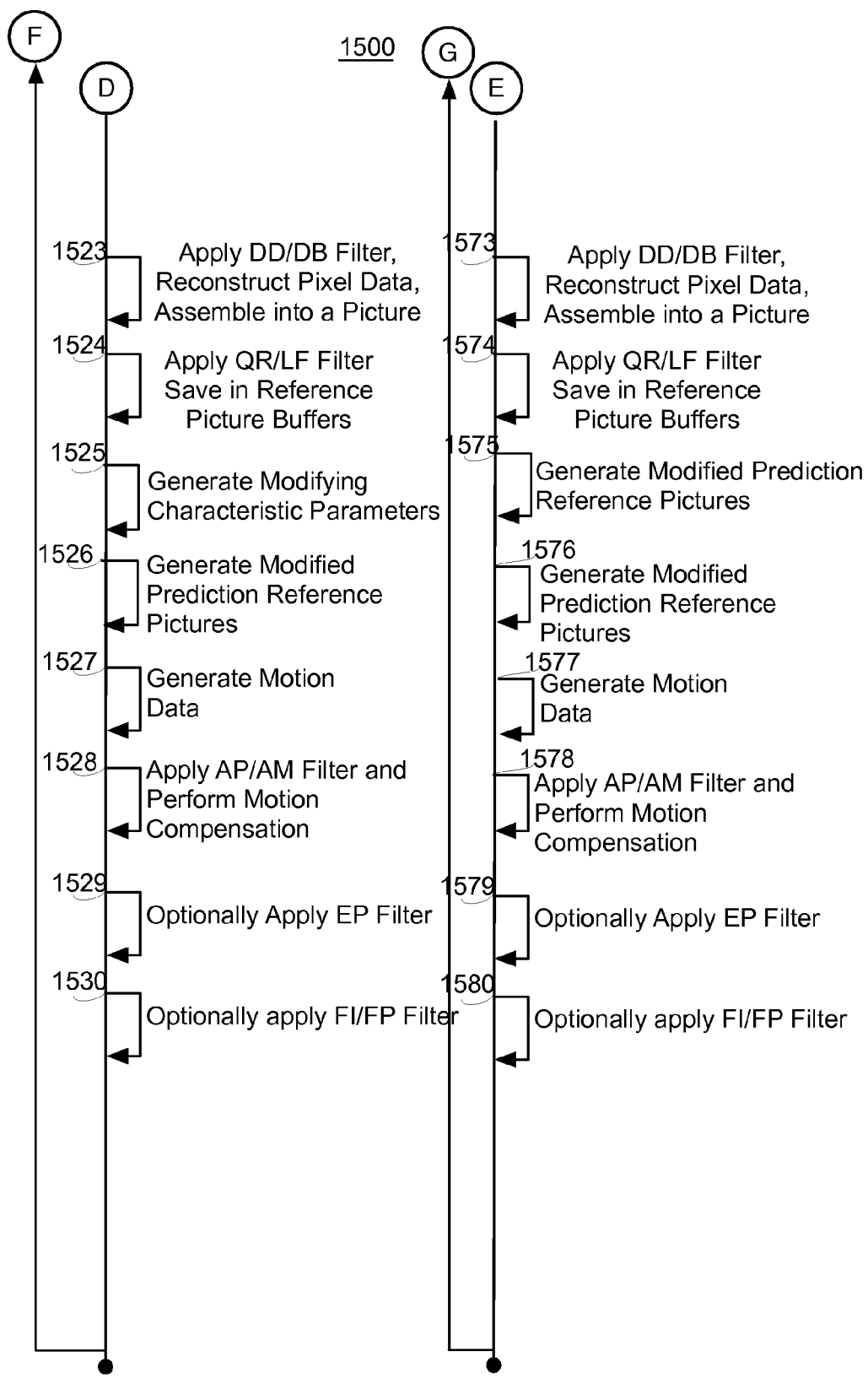

FIGS. 15(A), 15(B), and 15(C) provide an illustrative diagram of an example video coding system 1600 and video coding process 1500 in operation, arranged in accordance with at least some implementations of the present disclosure. In the illustrated implementation, process 1500 may include one or more operations, functions or actions as illustrated by one or more of actions 1501 through 1580. By way of non-limiting example, process 1500 will be described herein with reference to example video coding system 1600 including encoder 100 of FIG. 1 and decoder 200 of FIG. 2, as is discussed further herein below with respect to FIG. 16. In various examples, process 1500 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

In the illustrated implementation, video coding system 1600 may include logic circuitry 1650, the like, and/or combinations thereof. For example, logic circuitry 1650 may include encoder system 100 of FIG. 1 and/or decoder system 200 of FIG. 2 and may include any modules as discussed with respect to any of the encoder systems or subsystems described herein and/or decoder systems or subsystems described herein. Although video coding system 1600, as shown in FIGS. 15(A)-(C) may include one particular set of blocks or actions associated with particular modules, these blocks or actions may be associated with different modules than the particular modules illustrated here. Although process 1500, as illustrated, is directed to encoding and decoding, the concepts and/or operations described may be applied to encoding and/or decoding separately, and, more generally, to video coding.

Process 1500 may begin at operation 1501, "Receive Input Video Frames of a Video Sequence", where input video frames of a video sequence may be received via encoder 100 for example.

Process 1500 may continue at operation 1502, "Associate a Picture Type with each Video Frame in a Group of Pictures", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 1503 through 1511) may be performed on a frame or picture of a group of pictures and the processing may be repeated for all frames or pictures of a group and then repeated for all groups of pictures in a video sequence.

Process 1500 may continue at operation 1503, "Divide a Picture into Tiles and/or Super-fragments and Potential Prediction Partitionings", where a picture may be divided into tiles or super-fragments and potential prediction partitions via prediction partitions generator 105 for example.

Process 1500 may continue at operation 1504, "For Each Potential Prediction Partitioning, Perform Prediction(s) and Determine Prediction Parameters", where, for each potential prediction partitionings, prediction(s) may be performed and prediction parameters may be determined. For example, a range of potential prediction partitionings (each having various prediction partitions) may be generated and the associated prediction(s) and prediction parameters may be determined. For example, the prediction(s) may include prediction(s) using characteristics and motion based multi-reference predictions or intra-predictions.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to 9 reference types may be supported in P-pictures, and up to 10 reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, and the bitstream (discussed below with respect to operation 1512) may include a frame reference, morphing parameters, or synthesizing parameters associated with the prediction partition.

Process 1500 may continue at operation 1505, "For Each Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 1500 may continue at operation 1506, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 1500 may continue at operation 1507, "Perform Fixed or Content Adaptive Transforms with Various Block Sizes on Various Potential Coding Partitionings of Partition Prediction Error Data", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 1500 may continue at operation 1508, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 1500 may continue at operation 1509, "Quantize and Scan Transform Coefficients", where transform coefficients associated with coding partitions (and/or transform blocks) may be quantized and scanned in preparation for entropy coding.

Process 1500 may continue at operation 1511, "Entropy Encode Data associated with Each Tile or Super-fragment", where data associated with each tile or super-fragment may be entropy encoded. For example, data associated with each tile or super-fragment of each picture of each group of pictures of each video sequence may be entropy encoded. The entropy encoded data may include the prediction partitioning, prediction parameters, the selected coding partitioning, the selected characteristics data, motion vector data, quantized transform coefficients, filter parameters, selection data (such as mode selection data), and indictors.

Process 1500 may continue at operation 1512, "Generate Bitstream" where a bitstream may be generated based on the entropy encoded data. As discussed, in some examples, the bitstream may include a frame or picture reference, morphing parameters, or synthesizing parameters associated with a prediction partition.

Process 1500 may continue at operation 1513, "Transmit Bitstream", where the bitstream may be transmitted. For example, video coding system 2400 may transmit output bitstream 111, bitstream 2100, or the like via an antenna 2402 (please refer to FIG. 34).

Process 1500 may continue at operation 1520, "Reconstruct Pixel Data, Assemble into a Picture, and Save in Reference Picture Buffers", where pixel data may be reconstructed, assembled into a picture, and saved in reference picture buffers. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture. The picture may be saved in decoded picture buffer 119 as a reference picture for prediction of other (e.g., following) pictures.

Process 1500 may continue at operation 1523 "Apply DD/DB Filter, Reconstruct Pixel Data, Assemble into a Picture", where deblock filtering (e.g., DD or DB filters) may be applied, pixel data may be reconstructed, and assembled into a picture. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture.

Process 1500 may continue at operation 1524 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 1500 may continue at operation 1525, "Generate Modifying Characteristic Parameters", where, modified characteristic parameters may be generated. For example, a second modified prediction reference picture and second modifying characteristic parameters associated with the second modified prediction reference picture may be generated based at least in part on the second decoded prediction reference picture, where the second modified reference picture may be of a different type than the first modified reference picture.

Process 1500 may continue at operation 1526, "Generate Modified Prediction Reference Pictures", where modified prediction reference pictures may be generated, for example, a first modified prediction reference picture and first modifying characteristic parameters associated with the first modified prediction reference picture may be generated based at least in part on the first decoded prediction reference picture.

Process 1500 may continue at operation 1527, "Generate Motion Data", where, motion estimation data may be generated. For example, motion data associated with a prediction partition of a current picture may be generated based at least in part on one of the first modified prediction reference picture or the second modified prediction reference picture.

Process 1500 may continue at operation 1528, "Apply AP/AM Filter Perform Motion Compensation", where, motion compensation may be performed. For example, motion compensation may be performed based at least in part on the motion data and at least one of the first modified prediction reference picture or the second modified prediction reference picture to generate prediction partition data for the prediction partition and adaptive motion filtering or adaptive precision filtering (e.g., AP/AM Filter) may be applied. Process 1500 may feed this information back to operation 1504 where each decoded prediction error partition (e.g., including zero prediction error partitions) may be added to the corresponding prediction partition to generate a reconstructed prediction partition. Additionally, adaptive motion filtering or adaptive precision filtering may be applied at this point in the process.

Process 1500 may continue at operation 1529 "Optionally Apply EP", where enhanced predicted partition (e.g., EP Filtering) may be optionally applied. In some examples, where both EP Filtering or FI/FP Filtering are available, an indicator may be generated that indicates to the decoder system whether to use the enhanced predicted partition (e.g., EP Filtering) or the predicted partition data as the selected predicted partition for the prediction partition.

Process 1500 may continue at operation 1530 "Optionally apply FI/FP Filter", where FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

Operations 1501 through 1530 may provide for video encoding and bitstream transmission techniques, which may be employed by an encoder system as discussed herein. The following operations, operations 1554 through 1568 may provide for video decoding and video display techniques, which may be employed by a decoder system as discussed herein.

Process 1500 may continue at operation 1554, "Receive Bitstream", where the bitstream may be received. For example, input bitstream 201, bitstream 2100, or the like may be received via decoder 200. In some examples, the bitstream may include data associated with a coding partition, one or more indicators, and/or data defining coding partition(s) as discussed above. In some examples, the bitstream may include the prediction partitioning, prediction parameters, the selected coding partitioning, the selected characteristics data, motion vector data, quantized transform coefficients, filter parameters, selection data (such as mode selection data), and indictors.

Process 1500 may continue at operation 1555, "Decode Bitstream", where the received bitstream may be decoded via adaptive entropy decoder module 202 for example. For example, received bitstream may be entropy decoded to determine the prediction partitioning, prediction parameters, the selected coding partitioning, the selected characteristics data, motion vector data, quantized transform coefficients, filter parameters, selection data (such as mode selection data), and indictors.

Process 1500 may continue at operation 1556, "Perform Inverse Scan and Inverse Quantization on Each Block of Each Coding Partition", where an inverse scan and inverse quantization may be performed on each block of each coding partition for the prediction partition being processed. For example, the inverse scan and inverse quantization may be performed via adaptive inverse quantize module 203.

Process 1500 may continue at operation 1557, "Perform Fixed or Content Adaptive Inverse Transform to Decode Transform Coefficients to Determine Decoded Prediction Error Data Partitions", where a fixed or content adaptive inverse transform may be performed to decode transform coefficients to determine decoded prediction error data partitions. For example, the inverse transform may include an inverse content adaptive transform such as a hybrid parametric Haar inverse transform such that the hybrid parametric Haar inverse transform may include a parametric Haar inverse transform in a direction of the parametric transform direction and a discrete cosine inverse transform in a direction orthogonal to the parametric transform direction. In some examples, the fixed inverse transform may include a discrete cosine inverse transform or a discrete cosine inverse transform approximator. For example, the fixed or content adaptive transform may be performed via adaptive inverse transform module 204. As discussed, the content adaptive inverse transform may be based on other previously decoded data, such as, for example, decoded neighboring partitions or blocks. In some examples, generating the decoded prediction error data partitions may include assembling decoded coding partitions via coding partitions assembler module 205.

Process 1500 may continue at operation 1558, "Generate Prediction Pixel Data for Each Prediction Partition", where prediction pixel data may be generated for each prediction partition. For example, prediction pixel data may be generated using the selected prediction type (e.g., based on characteristics and motion, or intra-, or other types) and associated prediction parameters.

Process 1500 may continue at operation 1559, "Add to Each Decoded Prediction Error Partition the Corresponding Prediction Partition to Generate Reconstructed Prediction Partition", where each decoded prediction error partition (e.g., including zero prediction error partitions) may be added to the corresponding prediction partition to generated a reconstructed prediction partition. For example, prediction partitions may be generated via the decode loop illustrated in FIG. 2 and added via adder 206 to decoded prediction error partitions.

Process 1500 may continue at operation 1560, "Assemble Reconstructed Prediction Partitions to Generate Decoded Tiles or Super-fragments", where reconstructed prediction partitions may be assembled to generate decoded tiles or super-fragments. For example, prediction partitions may be assembled to generate decoded tiles or super-fragments via prediction partitions assembler module 207.

Process 1500 may continue at operation 1561, "Apply Deblock Filtering and/or QR Filtering to Generate Final Decoded Tiles or Super-fragments", where optional deblock filtering and/or quality restoration filtering may be applied to the decoded tiles or super-fragments to generate final decoded tiles or super-fragments. For example, optional deblock filtering may be applied via deblock filtering module 208 and/or optional quality restoration filtering may be applied via quality restoration filtering module 209.

Process 1500 may continue at operation 1562, "Assemble Decoded Tiles or Super-fragments to Generate a Decoded Video Picture, and Save in Reference Picture Buffers", where decoded (or final decoded) tiles or super-fragments may be assembled to generate a decoded video picture, and the decoded video picture may be saved in reference picture buffers (e.g., decoded picture buffer 210) for use in future prediction.

Process 1500 may continue at operation 1563, "Transmit Decoded Video Frames for Presentment via a Display Device", where decoded video frames may be transmitted for presentment via a display device. For example, decoded video pictures may be further processed via adaptive picture re-organizer 217 and content post restorer module 218 and transmitted to a display device as video frames of display video 219 for presentment to a user. For example, the video frame(s) may be transmitted to a display device 2405 (as shown in FIG. 34) for presentment.

Process 1500 may continue at operation 1573 "Apply DD/DB Filter, Reconstruct Pixel Data, Assemble into a Picture", where deblock filtering (e.g., DD or DB filters) may be applied, pixel data may be reconstructed, and assembled into a picture. For example, after inverse scan, inverse transform, and assembling coding partitions, the prediction error data partitions may be added with a prediction partition to generate reconstructed prediction partitions, which may be assembled into tiles or super-fragments. The assembled tiles or super-fragments may be optionally processed via deblock filtering.

Process 1500 may continue at operation 1574 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in a picture buffer as a reference picture for prediction of other (e.g., following) pictures.

Process 1500 may continue at operation 1576, "Generate Modified Prediction Reference Pictures", where modified prediction reference pictures may be generated, for example, at least a portion of a third modified prediction reference picture may be generated based at least in part on the third modifying characteristic parameters. Similarly, at least a portion a fourth modified prediction reference picture may be generated based at least in part on the second modifying characteristic parameters associated.

Process 1500 may continue at operation 1577, "Generate Motion Data", where, motion estimation data may be generated. For example, motion data associated with a prediction partition of a current picture may be generated based at least in part on one of the third modified prediction reference picture or the third modified prediction reference picture.

Process 1500 may continue at operation 1578, "Apply AP/AM Filter and Perform Motion Compensation", where, motion compensation may be performed and where adaptive motion filtering or adaptive precision filtering (e.g., AP/AM Filter) may be applied. For example, motion compensation may be performed based at least in part on the motion data and at least one of the third modified prediction reference picture or the fourth modified prediction reference picture to generate prediction partition data for the prediction partition. Process 1300 may feed this information back to operation 1559 where each decoded prediction error partition (e.g., including zero prediction error partitions) may be added to the corresponding prediction partition to generate a reconstructed prediction partition. Additionally, adaptive motion filtering or adaptive precision filtering may be applied at this point in the process.

Process 1500 may continue at operation 1579 "Optionally Apply EP Filter", where enhanced predicted partition (e.g., EP Filtering) may be optionally applied. In some examples, where both EP Filtering or FI/FP Filtering are available, an indicator may be received from the encoder system that indicates to the decoder system whether to use the enhanced predicted partition (e.g., EP Filtering) or the predicted partition data as the selected predicted partition for the prediction partition.

Process 1500 may continue at operation 1580 "Optionally apply FI/FP Filter", where FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

Process 1500 may be implemented via any of the coder systems as discussed herein. Further, process 1500 may be repeated either in serial or in parallel on any number of instantiations of video data such as prediction error data partitions, original data partitions, or wavelet data or the like.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

FIG. 16 is an illustrative diagram of example video coding system 1600, arranged in accordance with at least some implementations of the present disclosure. In the illustrated implementation, video coding system 1600 may include imaging device(s) 1601, video encoder 100 and/or a video encoder implemented via logic circuitry 1650 of processing unit(s) 1620, video decoder 200 and/or a video decoder implemented via logic circuitry 1650 of processing unit(s) 1620, an antenna 1602, one or more processor(s) 1603, one or more memory store(s) 2004, and/or a display device 1605.

As illustrated, imaging device(s) 1601, antenna 1602, processing unit(s) 1620, logic circuitry 1650, video encoder 100, video decoder 200, processor(s) 1603, memory store(s) 1604, and/or display device 1605 may be capable of communication with one another. As discussed, although illustrated with both video encoder 100 and video decoder 200, video coding system 1600 may include only video encoder 100 or only video decoder 200 in various examples.

As shown, in some examples, video coding system 1600 may include antenna 1602. Antenna 1602 may be configured to transmit or receive an encoded bitstream of video data, for example. Further, in some examples, video coding system 1600 may include display device 1605. Display device 1605 may be configured to present video data. As shown, in some example, logic circuitry 1650 may be implemented via processing unit(s) 1620. Processing unit(s) 1620 may include application-specific integrated circuit (ASIC) logic, graphics processor(s), general purpose processor(s), or the like. Video coding system 1600 also may include optional processor(s) 1603, which may similarly include application-specific integrated circuit (ASIC) logic, graphics processor(s), general purpose processor(s), or the like. In some examples, logic circuitry 1650 may be implemented via hardware or video coding dedicated hardware or the like, and processor(s) 1603 may implemented general purpose software or operating systems or the like. In addition, memory stores 1604 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1604 may be implemented by cache memory. In some examples, logic circuitry 1650 may access memory stores 1604 (for implementation of an image buffer for example). In other examples, logic circuitry 1650 and/or processing unit(s) 1620 may include memory stores (e.g., cache or the like) for the implementation of an image buffer or the like.

In some examples, video encoder 100 implemented via logic circuitry may include an image buffer (e.g., via either processing unit(s) 1620 or memory store(s) 1604)) and a graphics processing unit (e.g., via processing unit(s) 1620). The graphics processing unit may be communicatively coupled to the image buffer. The graphics processing unit may include video encoder 100 as implemented via logic circuitry 1650 to embody the various modules as discussed with respect to FIG. 1 and FIGS. 3 and 5. For example, the graphics processing unit may include entropy encoder logic circuitry, and so on. The logic circuitry may be configured to perform the various operations as discussed herein. For example, the entropy encoder logic circuitry may be configured to receive first video data and second video data of different types for entropy encoding, determine a first entropy encoding technique for the first video data based at least in part on a parameter associated with the first video data such that the first entropy encoding technique comprises at least one of an adaptive symbol-run variable length coding technique or an adaptive proxy variable length coding technique, entropy encode the first video data using the first encoding technique to generate first compressed video data and the second video data using a second encoding technique to generate second compressed video data, and assemble the first compressed video data and the second compressed video data to generate an output bitstream. Video decoder 200 may be implemented in a similar manner.

In some examples, antenna 1602 of video coding system 1600 may be configured to receive an entropy encoded bitstream of video data. As discussed, the bitstream may include two or more compressed video data types. Video coding system 1600 may also include video decoder 200 coupled to antenna 1602 and configured to decode the encoded bitstream. For example, video decoder 200 may be configured to disassemble the entropy encoded bitstream to determine first compressed video data and second compressed video data, determine a first entropy decoding technique for the first compressed video data, such that the first entropy decoding technique comprises at least one of an adaptive symbol-run variable length coding technique or an adaptive proxy variable length coding technique, entropy decode the first compressed video data based on the first entropy decoding technique to generate first video data and the second compressed video data based on a second entropy decoding technique to generate second video data, and decode the first video data and the second video data to generate a video frame.

In embodiments, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein.

Figure 17:
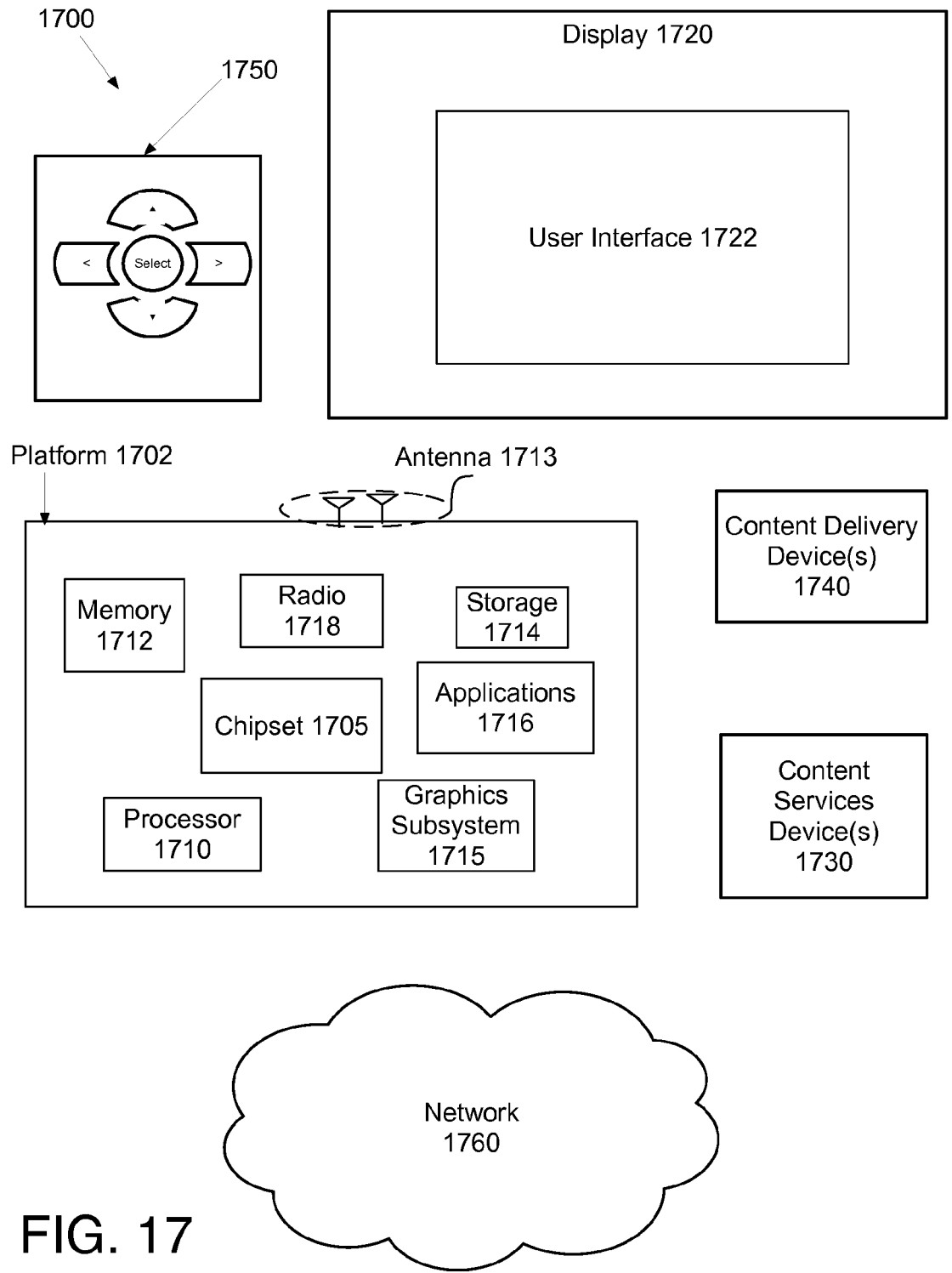
FIG. 17 is an illustrative diagram of an example system.

FIG. 17 is an illustrative diagram of an example system 1700, arranged in accordance with at least some implementations of the present disclosure. In various implementations, system 1700 may be a media system although system 1700 is not limited to this context. For example, system 1700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1700 includes a platform 1702 coupled to a display 1720. Platform 1702 may receive content from a content device such as content services device(s) 1730 or content delivery device(s) 1740 or other similar content sources. A navigation controller 1750 including one or more navigation features may be used to interact with, for example, platform 1702 and/or display 1720. Each of these components is described in greater detail below.

In various implementations, platform 1702 may include any combination of a chipset 1705, processor 1710, memory 1712, antenna 1713, storage 1714, graphics subsystem 1715, applications 1716 and/or radio 1718. Chipset 1705 may provide intercommunication among processor 1710, memory 1712, storage 1714, graphics subsystem 1715, applications 1716 and/or radio 1718. For example, chipset 1705 may include a storage adapter (not depicted) capable of providing intercommunication with storage 1714.

Processor 1710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1710 may be dual-core processor(s), dual-core mobile processor(s), and so forth.

Memory 1712 may be implemented as a volatile memory device such as, but not limited to, a Random Access Memory (RAM), Dynamic Random Access Memory (DRAM), or Static RAM (SRAM).

Storage 1714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1714 may include technology to increase the storage performance enhanced protection for valuable digital media when multiple hard drives are included, for example.

Graphics subsystem 1715 may perform processing of images such as still or video for display. Graphics subsystem 1715 may be a graphics processing unit (GPU) or a visual processing unit (VPU), for example. An analog or digital interface may be used to communicatively couple graphics subsystem 1715 and display 1720. For example, the interface may be any of a High-Definition Multimedia Interface, DisplayPort, wireless HDMI, and/or wireless HD compliant techniques. Graphics subsystem 1715 may be integrated into processor 1710 or chipset 1705. In some implementations, graphics subsystem 1715 may be a stand-alone device communicatively coupled to chipset 1705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1718 may operate in accordance with one or more applicable standards in any version.

In various implementations, display 1720 may include any television type monitor or display. Display 1720 may include, for example, a computer display screen, touch screen display, video monitor, television-like device, and/or a television. Display 1720 may be digital and/or analog. In various implementations, display 1720 may be a holographic display. Also, display 1720 may be a transparent surface that may receive a visual projection. Such projections may convey various forms of information, images, and/or objects. For example, such projections may be a visual overlay for a mobile augmented reality (MAR) application. Under the control of one or more software applications 1716, platform 1702 may display user interface 1722 on display 1720.

In various implementations, content services device(s) 1730 may be hosted by any national, international and/or independent service and thus accessible to platform 1702 via the Internet, for example. Content services device(s) 1730 may be coupled to platform 1702 and/or to display 1720. Platform 1702 and/or content services device(s) 1730 may be coupled to a network 1760 to communicate (e.g., send and/or receive) media information to and from network 1760. Content delivery device(s) 1740 also may be coupled to platform 1702 and/or to display 1720.

In various implementations, content services device(s) 1730 may include a cable television box, personal computer, network, telephone, Internet enabled devices or appliance capable of delivering digital information and/or content, and any other similar device capable of unidirectionally or bidirectionally communicating content between content providers and platform 1702 and/display 1720, via network 1760 or directly. It will be appreciated that the content may be communicated unidirectionally and/or bidirectionally to and from any one of the components in system 1700 and a content provider via network 1760. Examples of content may include any media information including, for example, video, music, medical and gaming information, and so forth.

Content services device(s) 1730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1702 may receive control signals from navigation controller 1750 having one or more navigation features. The navigation features of controller 1750 may be used to interact with user interface 1722, for example. In various embodiments, navigation controller 1750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1750 may be replicated on a display (e.g., display 1720) by movements of a pointer, cursor, focus ring, or other visual indicators displayed on the display. For example, under the control of software applications 1716, the navigation features located on navigation controller 1750 may be mapped to virtual navigation features displayed on user interface 1722, for example. In various embodiments, controller 1750 may not be a separate component but may be integrated into platform 1702 and/or display 1720. The present disclosure, however, is not limited to the elements or in the context shown or described herein.

In various implementations, drivers (not shown) may include technology to enable users to instantly turn on and off platform 1702 like a television with the touch of a button after initial boot-up, when enabled, for example. Program logic may allow platform 1702 to stream content to media adaptors or other content services device(s) 1730 or content delivery device(s) 1740 even when the platform is turned "off" In addition, chipset 1705 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1700 may be integrated. For example, platform 1702 and content services device(s) 1730 may be integrated, or platform 1702 and content delivery device(s) 1740 may be integrated, or platform 1702, content services device(s) 1730, and content delivery device(s) 1740 may be integrated, for example. In various embodiments, platform 1702 and display 1720 may be an integrated unit. Display 1720 and content service device(s) 1730 may be integrated, or display 1720 and content delivery device(s) 1740 may be integrated, for example. These examples are not meant to limit the present disclosure.

In various embodiments, system 1700 may be implemented as a wireless system, a wired system, or a combination of both. When implemented as a wireless system, system 1700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 17.

Figure 18:
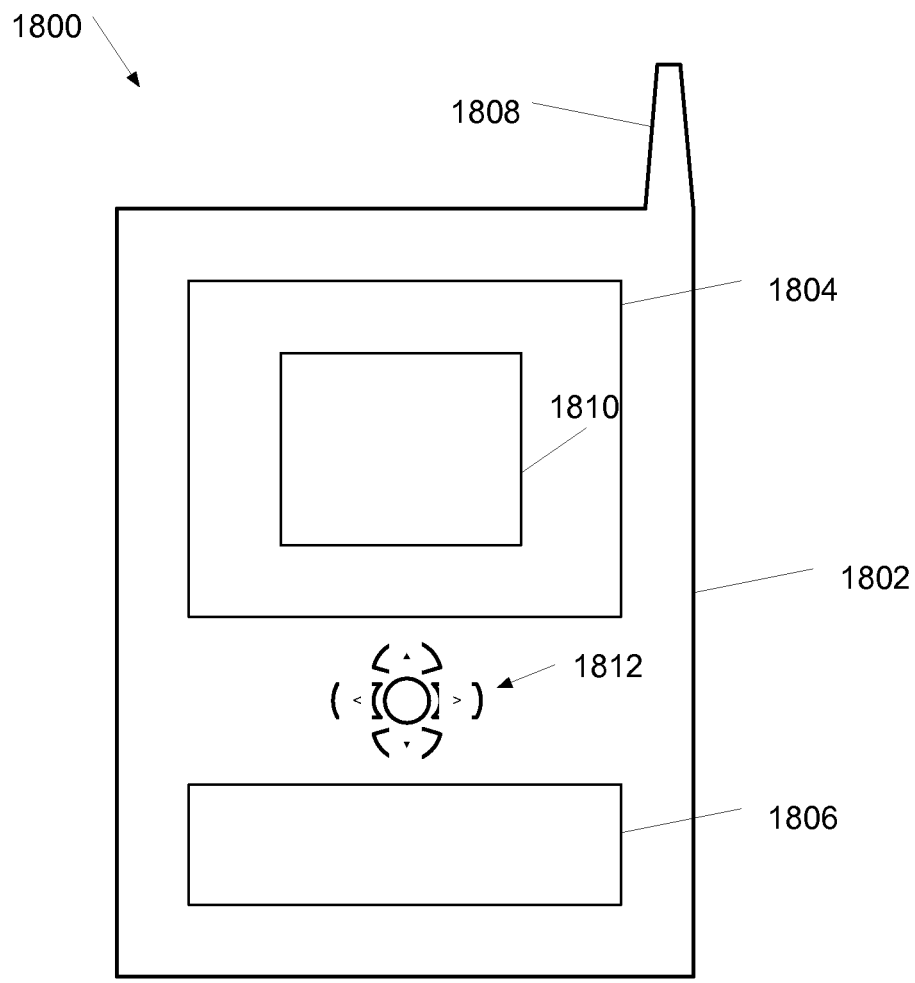
FIG. 18 illustrates an example device.

As described above, system 1700 may be embodied in varying physical styles or form factors. FIG. 18 illustrates implementations of a small form factor device 1800 in which system 1800 may be embodied. In various embodiments, for example, device 1800 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 18, device 1800 may include a housing 1802, a display 1804, an input/output (I/O) device 1806, and an antenna 1808. Device 1800 also may include navigation features 1812. Display 1804 may include any suitable display unit for displaying information appropriate for a mobile computing device. I/O device 1806 may include any suitable I/O device for entering information into a mobile computing device. Examples for I/O device 1806 may include an alphanumeric keyboard, a numeric keypad, a touch pad, input keys, buttons, switches, rocker switches, microphones, speakers, voice recognition device and software, and so forth. Information also may be entered into device 1800 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

As discussed, systems, apparatus, articles, and methods are described herein related to content adaptive entropy coding for video systems. In some examples, systems, apparatus, articles, and methods are described herein related to content adaptive prediction entropy coding for motion vectors (e.g., difference motion vectors) for video systems.

In some examples, a selected motion vector prediction technique may be determined for a block of video data from a plurality of motion vector prediction techniques. A prediction motion vector may be generated for the block of video data based at least in part on the selected motion vector prediction technique. The prediction motion vector may be differenced with an original motion vector associated with the block of video data to generate a motion vector differential. The motion vector differential may be entropy to generate coded motion vector data. The coded motion vector data may be assembled with other types of coded data to generate an output bitstream, which may be transmitted to a decoder system as discussed herein. The output bitstream (or an encoded bitstream) may be received by a video decoder system. The video decoder system may disassemble the bitstream to determine coded video data and decode the coded video data to determine a difference motion vector associated with a block of video data. A selected motion vector prediction technique for the block of video data may be determined from a plurality of motion vector prediction techniques and a prediction motion vector for the block of video data may be generated based at least in part on the selected motion vector prediction technique. The difference motion vector and the predicted motion vector may be added to generate a reconstructed motion vector for the block of video data (e.g., the reconstructed motion vector may match the original motion vector) and a video frame may be generated for eventual display to a user based on the reconstructed motion vector and other decoding techniques as discussed herein.

In some examples, determination of a prediction motion vector may include a spiral motion vector prediction technique. For example, a pattern may be determined to provide a sequence of neighboring blocks of a block of video data such that the pattern has a substantially spiral shape. Original motion vectors associated with the neighboring blocks may be scanned according to the sequence for a first non-zero original motion vector. When a first non-zero original motion vector is determined, a prediction motion vector associated with the block of video data may be generated as the first non-zero original motion vector. And when no non-zero original is determined, a prediction motion vector associated with the block of video data may be generated as a zero vector.

As discussed herein, encoder module 406 may include motion vector predictor module 661, adaptive VLC encoder for motion vector differences module 662, and/or a differencer 663 (please refer to FIG. 6). Also as discussed, encoder module 406 may receive video data 416, which may include motion vector data, via motion vector predictor module 661. Motion vector predictor module 661 may perform motion vector prediction based on video data 416 (e.g., the motion vector data of video data 416) using original motion vector(s) therein to generate associated predicted motion vector(s). Differencer 663 may difference the predicted motion vector(s) and the original motion vector(s) to generate difference (e.g., differential) motion vector(s) for entropy coding. Adaptive VLC encoder for motion vector differences module 662 may apply an adaptive variable length coding technique to the difference motion vector(s) to generate compressed video data 426.

Figure 19:
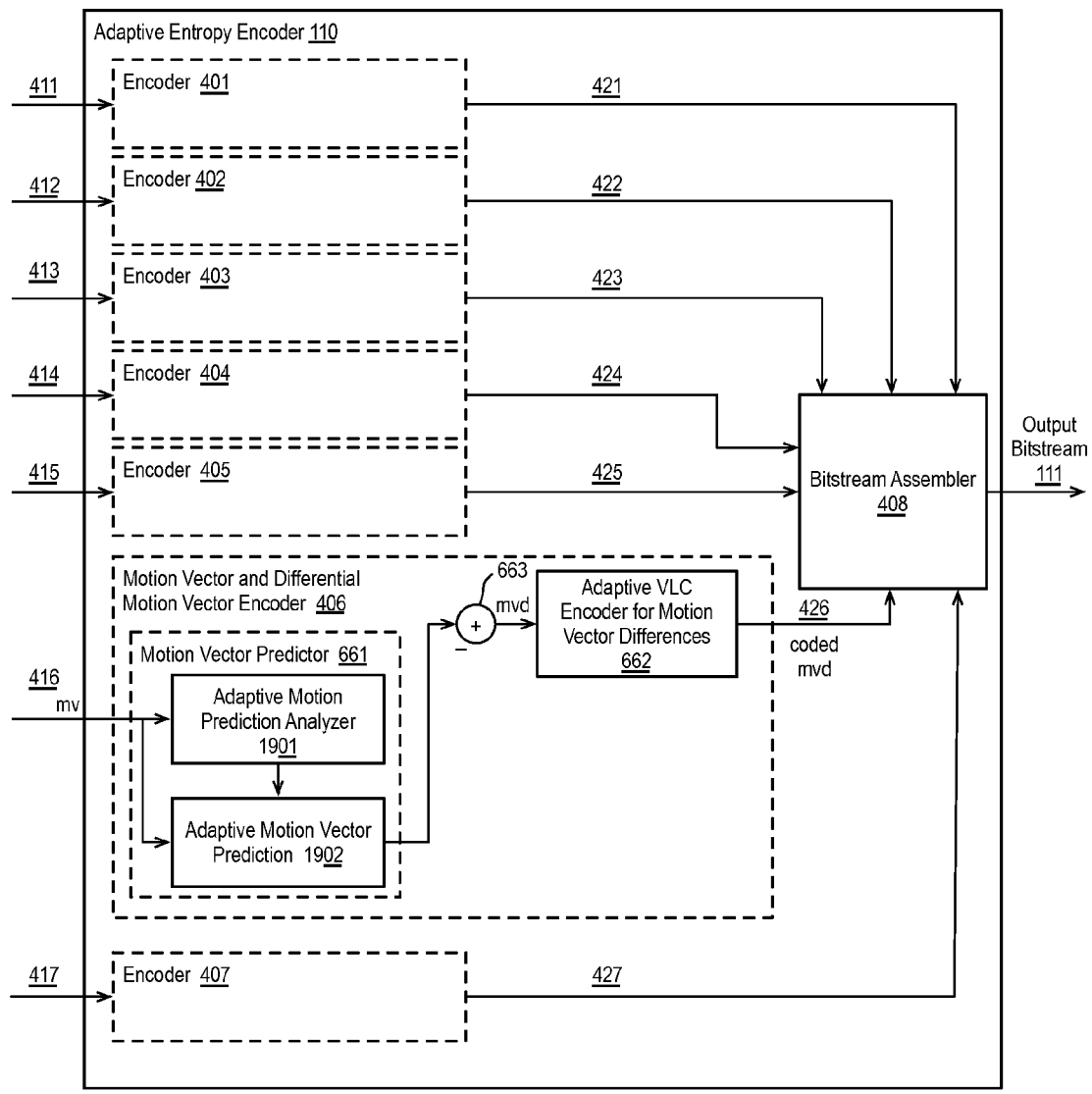
FIG. 19 is an illustrative diagram of an example motion vector and differential motion vector encoder module.

FIG. 19 is an illustrative diagram of an example motion vector and differential motion vector encoder module 406, arranged in accordance with at least some implementations of the present disclosure. As shown, motion vector and differential motion vector encoder module 406, which may be described as encoder module 406 herein for the sake of brevity, may be implemented via adaptive entropy encoder 110. The other modules (e.g., encoder modules 401-405 and 407) of adaptive entropy encoder 110 may be implemented as described elsewhere herein and will not be described further with respect to FIG. 19. In some examples, motion vector and differential motion vector encoder module 406 may provide efficiency by incorporating a number of adaptive techniques. Further, motion vector and differential motion vector encoder module 406 may allow coding efficiency while providing substantially low complexity.

Also as illustrated in FIG. 19, vector and differential motion vector encoder module 406 may include motion vector predictor module 661, adaptive VLC encoder for motion vector differences module 662, and/or a differencer 663. Adaptive motion predictor module may include adaptive motion prediction analyzer module 1901 and/or adaptive motion vector prediction module 1902. As shown, video data 416 may include motion vector data (e.g., original motion vector data, labeled "mv"), which may be received by motion vector predictor module 661 via adaptive motion prediction analyzer module 1901 and/or adaptive motion vector prediction module 1902 for encoding. In some examples, video data 416 may include the block of video data for which a motion vector is to be encoded, neighboring original motion vectors associated with neighboring blocks of the block of video data, or the like. As shown, encoder module 406 may provide compressed video data 426. For example, adaptive VLC encoder for motion vector differences module 662 may process motion vector differentials (e.g., labeled "mvd") to provide compressed video data 426 including a coded representation of the motion vector differentials (e.g., labeled "coded mvd"). As discussed herein, compressed video data 426 may be provided to bitstream assembler 408, which may multiplex compressed video data 426 with compressed video data 421-425 and 427 and provide output bitstream 111.

As discussed, in some examples, motion vector and differential motion vector encoder module 406 may provide efficiency by incorporating a number of adaptive techniques. In some examples, adaptive motion prediction analyzer module 1901 may determine, from multiple motion vector prediction techniques, a selected motion vector prediction technique for a block of video data (e.g., a current block of video data for which a prediction motion is being determined). Adaptive motion vector prediction module 1902 may generate a prediction motion vector for the block of video data based on the selected motion vector prediction technique, for example. In some examples, differencer 663 may difference the prediction motion vector with an original motion vector associated with the block of video data to generate a motion vector differential. The motion vector differential may be entropy encoded to generate the coded motion vector data of compressed video data 426, for example.

In some examples, the multiple motion vector prediction techniques (from which selected motion vector prediction techniques may be chosen for video blocks) may include one or more of a median motion vector prediction technique, a Graham motion vector prediction technique, a Graham last block motion vector prediction technique, or a spiral motion vector prediction technique, or the like.

Figure 20:
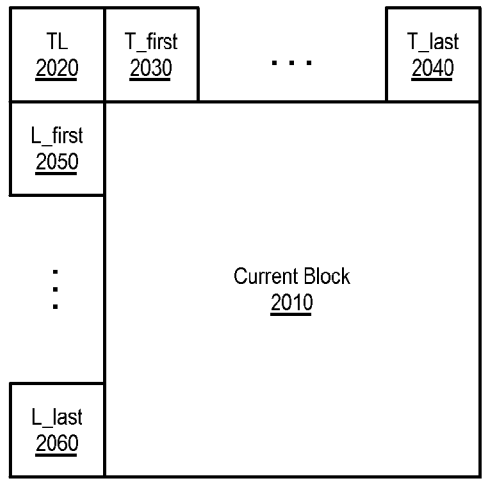
FIG. 20 is an illustrative diagram of an example video block and neighboring blocks.

FIG. 20 is an illustrative diagram of an example video block 2010 (labeled current block 2010) and neighboring blocks 2020-2060, arranged in accordance with at least some implementations of the present disclosure. In some examples, current block 2010 may be a block of video data for which a prediction motion vector is to be determined. As shown, in some examples, immediate neighboring blocks to current block 2010 may be used to determine a prediction motion vector for current block 2010. For example, neighboring block TL 2020 (e.g., top left) may be to the left of and above current block 2010. Similarly, neighboring block T_first 2030 (e.g., top first) may be above and aligned with a left side of current block 2010, neighboring block T_last 2040 (e.g., top last) may be above and aligned with a right side of current block 2010, neighboring block L_first 2050 (e.g., left first) may be to the left of and aligned with a top side of current block 2010, and/or neighboring block L_last 2060 (e.g., left last) may be to the left of and aligned with a bottom side of current block 2010. Similarly, other immediately neighboring or neighboring but removed from (e.g., not in contact with) current block 2010 may be defined.

Figure 21:
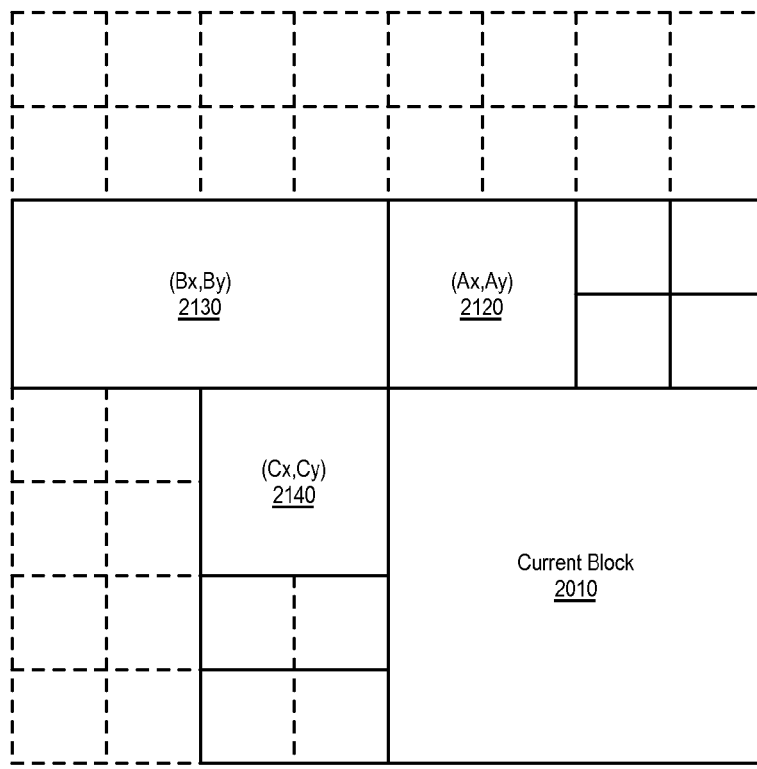
FIG. 21 is an illustrative diagram of an example video block and neighboring blocks for use in example motion vector prediction techniques.

FIG. 21 is an illustrative diagram of an example video block 2010 and neighboring blocks 2120-2140 for use in example motion vector prediction techniques, arranged in accordance with at least some implementations of the present disclosure. As shown, in some examples, neighboring block 2120 (e.g., with x,y-components labeled Ax, Ay) may be above and aligned with a left side of current block 2010, neighboring block 2130 (e.g., with x,y-components labeled Bx, By) may be to the left of and above current block 2010, and neighboring block 2140 (e.g., with x,y-components labeled Cx, Cy) may be to the left of and aligned with a top side of current block 2010. In some examples, neighboring block 2120, 2130, and 2140 may be analogous to neighboring blocks T_first 2030, TL 2020, and L_first 2050 of FIG. 20. As shown in FIG. 21, neighboring blocks 2120-2140 may have any size or shape. Similarly, current block 2010 may have any size or shape.

As discussed, a selected motion vector prediction technique may be determined for current block 2010 from multiple motion vector prediction techniques. In some examples, the multiple motion vector prediction techniques may include a median motion vector prediction technique. With reference to FIG. 20, a median motion vector prediction technique may provide a prediction motion vector (Px, Py) for current block 2010 based on neighboring block 2120, 2130, and 2140 as follows. For example, the following may be determined from video data 316:

$Ax = x$ coordinate of motion vector of block $T\_first$ (e.g., neighboring block 2120)

$Ay = y$ coordinate of motion vector of block $T\_first$ (e.g., neighboring block 2120)

$Bx = x$ coordinate of motion vector of block $TL$ (e.g., neighboring block 2130)

$By = y$ coordinate of motion vector of block $TL$ (e.g., neighboring block 2130)

$Cx = x$ coordinate of motion vector of block $L\_first$ (e.g., neighboring block 2140)

$Cy=y$ coordinate of motion vector of block $L\_first$
(e.g., neighboring block 2140)

In some examples, the prediction motion vector (Px, Py) for current block 2010 via the median motion vector prediction technique may be as follows:

$Px = \text{median}(Ax, Bx, Cx);$ $Py = \text{median}(Ay, By, Cy).$

For example, the median motion vector prediction technique may include determining a first neighboring original motion vector for a first neighboring block of video data above and aligned with a left edge of the block of video data (e.g., Ax, Ay for neighboring block 2120), a second neighboring original motion vector for a second neighboring block of video data to the left of and above the block of video data (e.g., Bx, By for neighboring block 2130), and a third neighboring original motion vector for a third neighboring block of video data to the left of and aligned with a top edge of the block of video data (e.g., Cx, Cy for neighboring block 2140), and generating the prediction motion vector for the block of video data as the median of the first, second and third neighboring original motion vectors.

In some examples, the multiple motion vector prediction techniques may include a Graham motion vector prediction technique. With reference to FIG. 20, a Graham motion vector prediction technique may provide a prediction motion vector (Px, Py) for current block 2010 based on neighboring block 2120, 2130, and 2140 as follows. For example, the following may be determined from video data 316:

$Ax=x$ coordinate of motion vector of block $T\_first$
(e.g., neighboring block 2120)

$Ay=y$ coordinate of motion vector of block $T\_first$
(e.g., neighboring block 2120)

$Bx=x$ coordinate of motion vector of block $TL$ (e.g., neighboring block 2130)

$By=y$ coordinate of motion vector of block $TL$ (e.g., neighboring block 2130)

$Cx=x$ coordinate of motion vector of block $L\_first$
(e.g., neighboring block 2140)

$Cy=y$ coordinate of motion vector of block $L\_first$
(e.g., neighboring block 2140)

In some examples, the following absolute values may be determined:

$DXx = \text{abs}(Cx-Bx)$ $DXy = \text{abs}(Cy-By)$ $DYx = \text{abs}(Ax-Bx)$ $DYy = \text{abs}(Ay-By)$ where abs is a function that takes the absolute value of the given value.

In some examples, the prediction motion vector (Px, Py) for current block 2010 via the Graham motion vector prediction technique may be as follows:

$$Px = \begin{cases} Ax, & \text{if } DXx \le DXy, \text{ or} \\ Cx, & \text{otherwise} \end{cases}$$

$$Py = \begin{cases} Ay, & \text{if } DYx \le DYy, \text{ or} \\ Cy, & \text{otherwise} \end{cases}$$

For example, the Graham motion vector prediction technique may include determining a first neighboring original motion vector for a first neighboring block of video data above and aligned with a left edge of the block of video data (e.g., Ax, Ay for neighboring block 2120), a second neighboring original motion vector for a second neighboring block of video data to the left of and above the block of video data (e.g., Bx, By for neighboring block 2130), and a third neighboring original motion vector for a third neighboring block of video data to the left of and aligned with a top edge of the block of video data (e.g., Cx, Cy for neighboring block 2140), determining an absolute value difference between the second and the third neighboring original motion vectors (e.g., DXx, DXy), determining an absolute value difference between the first and the second neighboring original motion vectors (e.g., DYx, DYy), and generating the prediction motion vector for the block of video data as the first neighboring original motion vector if the absolute value difference between the second and the third neighboring original motion vectors is less than or equal to the absolute value difference between the first and the second neighboring original motion vectors and as the third neighboring original motion vector if the absolute value difference between the second and the third neighboring original motion vectors is greater than the absolute value difference between the first and the second neighboring original motion vectors (e.g., as shown above).

Figure 22:
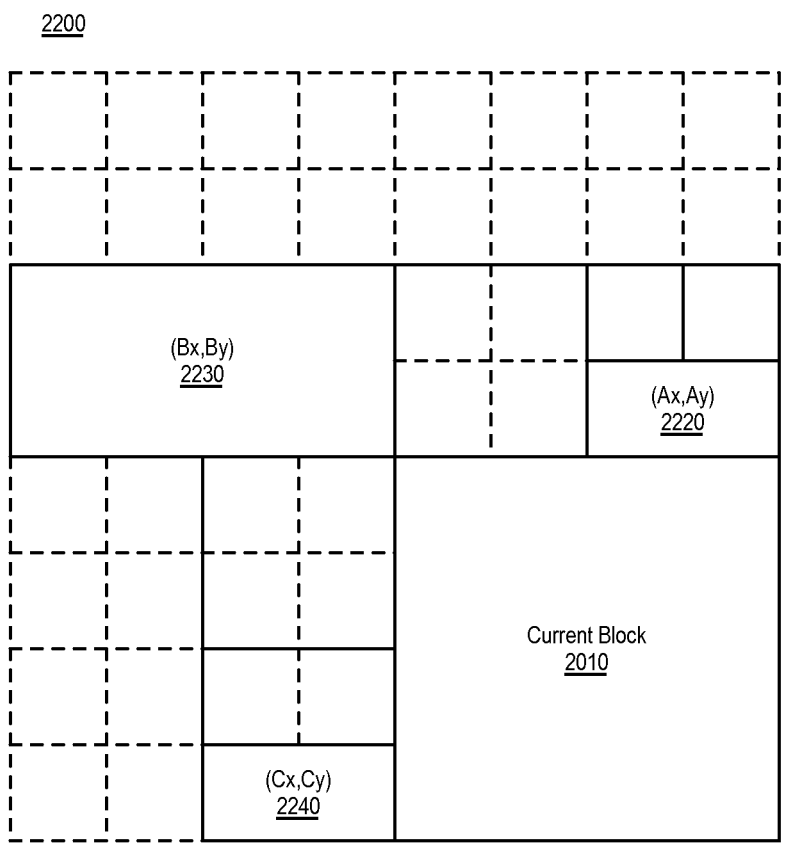
FIG. 22 is an illustrative diagram of an example video block and neighboring blocks for use in example motion vector prediction techniques.

FIG. 22 is an illustrative diagram of an example video block 2010 and neighboring blocks 2220-2240 for use in example motion vector prediction techniques, arranged in accordance with at least some implementations of the present disclosure. As shown, in some examples, neighboring block 2220 (e.g., with x,y-components labeled Ax, Ay) may be above and aligned with a right side of current block 2010, neighboring block 2230 (e.g., with x,y-components labeled Bx, By) may be to the left of and above current block 2010, and neighboring block 2240 (e.g., with x,y-components labeled Cx, Cy) may be to the left of and aligned with a bottom side of current block 2010. In some examples, neighboring block 2220, 2230, and 2240 may be analogous to neighboring blocks T_last 2060, TL 2020, and L_last 2040 of FIG. 20. As shown in FIG. 22, neighboring blocks 2220-2240 may have any size or shape.

As discussed, a selected motion vector prediction technique may be determined for current block 2010 from multiple motion vector prediction techniques. In some examples, the multiple motion vector prediction techniques may include a Graham last block motion vector prediction technique. With reference to FIG. 22, a Graham last block motion vector prediction technique may provide a prediction motion vector (Px, Py) for current block 2010 based on neighboring block 2220, 2230, and 2240 as follows. For example, the following may be determined from video data 316:

$Ax=x$ coordinate of motion vector of block $T\_last$
(e.g., neighboring block 2220)

$Ay=y$ coordinate of motion vector of block $T\_last$
(e.g., neighboring block 2220)

$Bx=x$ coordinate of motion vector of block $TL$ (e.g., neighboring block 2230)

By=y coordinate of motion vector of block TL(e.g., neighboring block 2230)

Cx=x coordinate of motion vector of block L_last (e.g., neighboring block 2240)

Cy=y coordinate of motion vector of block L_last (e.g., neighboring block 2240)

In some examples, the following absolute values may be determined:

DXx=abs(Cx−Bx)

DXy=abs(Cy−By)

DYx=abs(Ax−Bx)

DYy=abs(Ay−By)

where abs is a function that takes the absolute value of the given value.

In some examples, the prediction motion vector (Px, Py) for current block 2010 via the Graham last block motion vector prediction technique may be as follows:

$$Px = \begin{cases} Ax, & \text{if } DXx \leq DXy, \text{ or} \\ Cx, & \text{otherwise} \end{cases}$$

$$Py = \begin{cases} Ay, & \text{if } DYx \leq DYy, \text{ or} \\ Cy, & \text{otherwise} \end{cases}$$

In some examples, the Graham last block motion vector prediction technique may include determining a first neighboring original motion vector for a first neighboring block of video data above and aligned with a right edge of the block of video data (e.g., Ax, Ay for neighboring block 2220), a second neighboring original motion vector for a second neighboring block of video data to the left of and above the block of video data (e.g., Bx, By for neighboring block 2230), and a third neighboring original motion vector for a third neighboring block of video data to the left of and aligned with a bottom edge of the block of video data (e.g., Cx, Cy for neighboring block 2240), determining an absolute value difference between the second and the third neighboring original motion vectors (e.g., DXx, DXy), determining an absolute value difference between the first and the second neighboring original motion vectors (e.g., DXx, DXy), and generating the prediction motion vector for the block of video data as the first neighboring original motion vector if the absolute value difference between the second and the third neighboring original motion vectors is less than or equal to the absolute value difference between the first and the second neighboring original motion vectors and as the third neighboring original motion vector if the absolute value difference between the second and the third neighboring original motion vectors is greater than the absolute value difference between the first and the second neighboring original motion vectors (e.g., as shown above).

Figure 23:
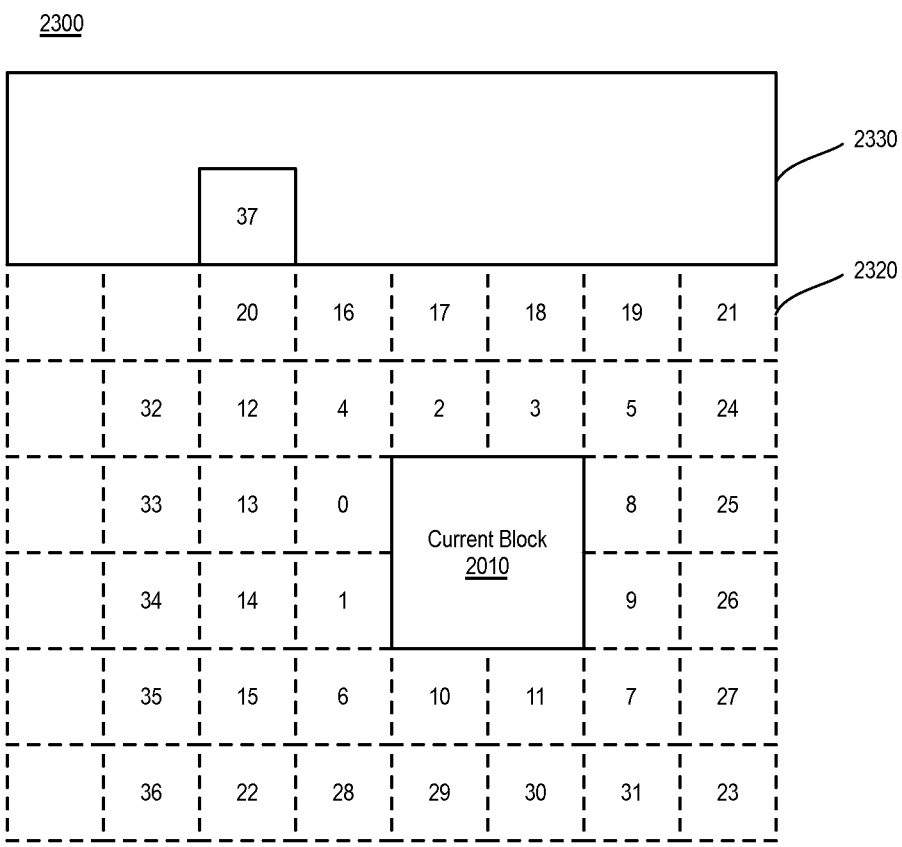
FIG. 23 is an illustrative diagram of an example video block and neighboring blocks for use in example motion vector prediction techniques.

FIG. 23 is an illustrative diagram of an example video block 2010 and neighboring blocks 2320, 2330 for use in example motion vector prediction techniques, arranged in accordance with at least some implementations of the present disclosure. As shown, in some examples, neighboring blocks 2320 (some of which are labeled 0-36) and 2330 (one of which is labeled 37) may surround video block 2010 such that some are immediately adjacent to video block 2010 (e.g., 0-11) and others are adjacent but not immediately adjacent to video block 2010 (e.g., 12-37 and so on). In the example of FIG. 23, neighboring blocks having dashed boundaries may have zero motion vectors and neighboring blocks having solid boundaries may have non-zero motion vectors.

As discussed, a selected motion vector prediction technique may be determined for current block 2010 from multiple motion vector prediction techniques. In some examples, the multiple motion vector prediction techniques may include a spiral motion vector prediction technique. With reference to FIG. 23, a spiral motion vector prediction technique may provide a prediction motion vector for current block 2010 based on neighboring block 2320, 2330 2240 by determining a pattern to provide a sequence of neighboring blocks 2320, 2330 of video block 2010 (e.g., a block of video data) such that the pattern may include a substantially spiral shape. In some examples, original motion vectors associated with neighboring blocks 2320, 2330 may be scanned according to the sequence (e.g., as determined by the pattern) for a first (e.g., sequentially) non-zero original motion vector. When a non-zero original motion vector is determined, the prediction motion vector associated with video block 2010 may be generated as the first non-zero original motion vector. In instances when no non-zero original motion vector is determined before the end of the sequence, the prediction motion vector associated with video block 2010 may be a zero vector.

In some examples, the pattern may be defined by the sequence from 0 to 37 as shown in FIG. 23. For example, the pattern may include a shape beginning at a first neighboring block to the left of and aligned with the top of the block of video data (e.g., neighboring block 0) and progressing downwards to a second neighboring block to the left of and aligned with the bottom of the block of video data (e.g., neighboring block 1), then skipping to a third neighboring block above and aligned with the left of the block of video data (e.g., neighboring block 2), then progressing right to a fourth neighboring block above and aligned with the right side of the block of video data (e.g., neighboring block 3), then skipping to a fifth neighboring block to the left of above the block of video data (e.g., neighboring block 4), then skipping to a sixth neighboring block to the right of and above the block of video data (e.g., neighboring block 5), then skipping to a seventh neighboring block to the left of below the block of video data (e.g., neighboring block 6), then skipping to an eighth neighboring block to the right of and aligned with the top of the block of video data (e.g., neighboring block 7), then progressing downward to a ninth neighboring block to the right of and aligned with the bottom of the block of video data (e.g., neighboring block 8), and so on. Such a pattern may not be strictly spiral but may be a substantially spiral as used herein as the pattern begins immediately adjacent to video block 2010, scans the immediately adjacent neighboring blocks, continues to scan neighboring blocks one level adjacent to video block 2010, and so on.

As shown in FIG. 23, in some examples, the number of scanned neighboring blocks may be 37 blocks or more. In some examples, the number of scanned neighboring blocks may be 20. In some examples, the number of scanned neighboring blocks may be 10, 15, or 25, or the like. In some examples, the scanned neighboring blocks may have any shape or size such as square, or rectangular or the like. In some examples, the number of scanned neighboring blocks may be square in shape and have a size of 4×4.

In some examples, the pattern may be defined by a sequence as follows (please refer to FIG. 23: 0-4-2-3-5-8-9-7-11-10-6-1-13-12-20-15-17-18-19-21-24-25-26-27-23-

31-30-39-38-22-15-14-13-12-20-27, and so on. For example, the pattern may include a shape beginning at a first neighboring block to the left of and aligned with the top of the block of video data (e.g., neighboring block 0) and progressing upwards to a second block to the left of and above the block of video data (e.g., neighboring block 4), then to the right along the top of the block of video data to a third neighboring block to the right of and above the block of video data (e.g., neighboring block 5), then downwards to a fourth neighboring block to the right of and below the block of video data (e.g., neighboring block 7), then left to a fifth neighboring block to the left of and below the block of video data (e.g., neighboring block 6), and so on. In a similar manner, many patterns may be determined to provide a sequence of neighboring blocks.

FIG. 24 is a flow diagram illustrating an example process 2400, arranged in accordance with at least some implementations of the present disclosure. Process 2400 may include one or more operations, functions or actions as illustrated by one or more of operations 2402, 2404, 2406, and/or 2408. Process 2400 may form at least part of a next generation video coding process. By way of non-limiting example, process 2400 may form at least part of a next generation video encoding process as undertaken by encoder system 100 of FIG. 1 and/or entropy encoder module 110 as discussed herein.

Process 2400 may begin at operation 2402, "Determine a Selected Motion Vector Prediction Technique for a Block of Video Data", where a selected motion vector prediction technique may be determined for a block of video data from a plurality of motion vector prediction techniques. For example, a selected motion vector prediction may be determined from at least one of a median motion vector prediction technique, a Graham motion vector prediction technique, a Graham last block motion vector prediction technique, or a spiral motion vector prediction technique via adaptive motion prediction analyzer module 1901.

Process 2400 may continue at operation 2404, "Generate a Prediction Motion Vector for the Block of Video Data Based on the Selected Motion Vector Prediction Technique", where a prediction motion vector may be generated for the block of video data based at least in part on the selected motion vector prediction technique. For example, adaptive motion prediction analyzer module 1901 may indicate the selected motion vector prediction technique to adaptive motion vector prediction module 1902, which may apply the selected technique to generate a prediction motion vector.

Process 2400 may continue at operation 2406, "Difference the Prediction Motion Vector with an Original Motion Vector of the Block of Video Data", where the prediction motion vector may be differenced with an original motion vector associated with the block of video data to generate a motion vector differential. For example, differencer 663 may difference the prediction motion vector and original motion vector, and transmit the resultant motion vector differential (e.g., "mvd") to adaptive VLC encoder for motion vector differences module 662.

Process 2400 may continue at operation 2408, "Entropy Encode the Motion Vector Differential to Generate Coded Motion Vector Data", where the motion vector differential may be entropy encoded to generate coded motion vector data. For example, adaptive VLC encoder for motion vector differences module 662 may entropy encode the motion vector differential via an adaptive variable length coding technique to generated compressed video data 426 including coded motion vector data (e.g., "coded mvc"). As is discussed further herein, a switching bit mask may also be encoded via adaptive VLC encoder for motion vector differences module 662.

As discussed, the coded motion vector data, via compressed video data 426, may be assembled with other compressed video data (e.g., compressed video data 421-425 and 427) to generate an output bitstream (e.g., output bitstream 111).

FIG. 25 is a flow diagram illustrating an example process 2500, arranged in accordance with at least some implementations of the present disclosure. Process 2500 may include one or more operations, functions or actions as illustrated by one or more of operations 2502, 2504, 2506, 2508, and/or 2510. Process 2500 may form at least part of a next generation video coding process. By way of non-limiting example, process 2500 may form at least part of a next generation video encoding process to determine a prediction motion vector for a current block of video data as undertaken by encoder system 100 of FIG. 1 and/or entropy encoder module 110 as discussed herein.

Process 2500 may begin at operation 2502, "Determine a Substantially Spiral Pattern to Provide a Sequence of Neighboring Blocks", where a pattern may be determined to provide a sequence of neighboring blocks of a block of video data such that the pattern comprises a substantially spiral shape. For example, any shape as discussed herein with respect to FIG. 23 may be determined. For example, the pattern may provide a spiral or a substantially spiral such that the pattern begins immediately adjacent to a video block, scans the immediately adjacent neighboring blocks, continues to scan neighboring blocks one level adjacent to the video block, and so on. Such a pattern may define a sequence of neighboring blocks, as discussed herein.

Process 2500 may continue at operation 2504, "Scan Original Motion Vectors of the Neighboring Blocks According to the Sequence", where original motion vectors associated with the neighboring blocks may be scanned according to the sequence for a first non-zero original motion vector. For example, adaptive motion prediction analyzer module 1901 may indicate the selected motion vector prediction technique to adaptive motion vector prediction module 1902, which may apply the selected technique to generate a prediction motion vector.

Process 2500 may continue at decision operation 2506, "Non-Zero Motion Vector Determined", where it may be determined whether a non-zero motion vector is determined prior to the sequence of neighboring blocks ends. If a non-zero motion vector is determined, a prediction motion vector associated with the block of video data may be generated as the first (sequentially) non-zero original motion vector, as shown at operation 2508, "Generate Motion Vector as First Non-Zero Motion Vector". If no non-zero motion vector is determined, a prediction motion vector associated with the block of video data may be generated as a zero vector, as shown at operation 2510, "Generate Motion Vector as a Zero Vector".

As discussed herein, the determined prediction motion vector for the block of video data may be differenced with an original motion vector for the block of video data and the differential may be entropy encoded.

As discussed, a motion vector prediction technique may be determined for a block of video data. In some examples, a predetermined mode or method may be established for selection of the motion vector prediction technique. For example, in a mode 0 (or method 0), the motion vector prediction technique may be set to the median motion vector prediction technique. In such examples, only the motion vector differential between the predicted motion vector and the original motion vector for a block of video data may be encoded. The designation of a mode label (e.g., mode 0 or the like) is for the sake of clarity of presentation and is not meant to be limiting. For example, one, several, or all of the modes may be available in various implementations.

In some examples, in a mode 1 (or method 1), the motion vector prediction technique may switch between the median motion vector prediction technique and either the Graham motion vector prediction technique or the spiral motion vector prediction technique as follows. For example, the median motion vector prediction technique may be computed first for a block of video data (e.g., a current block). In such examples, the median motion vector prediction technique may be deemed to be a first motion vector prediction technique and a generated motion vector may be deemed a first predicted motion vector.

If the resultant motion vector is a zero vector (e.g., zero motion determined as 0, 0), then the spiral motion vector prediction technique may then be used. In such examples, the spiral motion vector prediction technique may be deemed to be a second motion vector prediction technique and a generated motion vector may be deemed a second predicted motion vector.

If the resultant motion vector is a non-zero vector, then the Graham motion vector prediction technique may then be used. In such examples, the Graham motion vector prediction technique may be deemed to be a second motion vector prediction technique and a generated motion vector may be deemed a second predicted motion vector.

In either case, the motion vector determined using the first motion vector prediction technique (e.g., the median motion vector prediction technique) may be compared to the motion vector determined using the second motion vector prediction technique (e.g., spiral or Graham).

If the two motion vectors are equal or their difference is less than a threshold, then the motion vector prediction technique is determined as the first motion vector prediction technique (e.g., median).

If the two motion vectors are different, an estimated bit cost for the motion vectors may be determined and the technique (either the first or second) providing the lower bit cost may be used. In such examples, a bit may be added to a switching bit mask, which may track the motion vector prediction technique for blocks of video data for encoding. For example, the switching bit mask may be encoded using bitmap coding, proxy VLC coding, or symbol run coding via adaptive VLC encoder for motion vector differences module 662.

In some examples, a mode 2 (or method 2) may operate the same as mode 1 (or method 1), with the exception that in place of the Graham motion vector prediction technique, a Graham last block motion vector prediction technique may be implemented.

In some examples, a mode 3 (or method 3) may operate the same as mode 1 (or method 1), with the exception that if the two determined motion vectors are different but within a threshold, the motion vector determined using the second motion vector prediction technique (e.g., spiral or Graham) may be used (e.g., without determining bit costs). If the two motion vectors differ by more than the threshold, the bit cost techniques as described may be utilized. In some examples, the threshold may be predetermined, determined heuristically, or the like.

In some examples, a mode 4 (or method 4) may operate the same as mode 3 (or method 3), with the exception that in place of the Graham motion vector prediction technique, a Graham last block motion vector prediction technique may be implemented.

For example, as discussed, a first prediction motion vector may be determined via a first prediction motion vector prediction technique such that the first prediction motion vector prediction technique may be the median motion vector prediction technique. When the first prediction motion vector is a zero vector, a second prediction motion vector may be determined via a second prediction motion vector prediction technique such that the second prediction motion vector prediction technique may be the spiral motion vector prediction technique. When the first prediction motion vector is a non-zero vector, a second prediction motion vector may be determined via a third prediction motion vector prediction technique such that the third prediction motion vector prediction technique may be the Graham motion vector prediction technique or the Graham last block motion vector prediction technique (e.g., depending on mode). When a difference between the first prediction motion vector and the second prediction motion vector is less than a threshold, in a first mode, the selected motion vector prediction technique may be determined as the first motion vector prediction technique and, in a second mode, the selected motion vector prediction technique may be determined as the second or third motion vector prediction techniques (depending further on the mode). When a difference between the first prediction motion vector and the second prediction motion vector is greater than a threshold (in certain modes), a first estimated bit cost associated with the first motion vector prediction technique may be determined and a second estimated bit cost associated with the second or third motion vector prediction technique may be determined. When the first estimated bit cost is less than the second estimated bit cost, the selected motion vector prediction technique may be determined as the first motion vector prediction technique. when the second estimated bit cost is less than the first estimated bit cost, the selected motion vector prediction technique may be determined as the second or third motion vector prediction technique. As discussed, in some examples, a switching bit may be added to the switching bit mask for later encoding.

As will be appreciated in mode 0 (or method 0), no switching bit mask may need to be provided as only median motion vector prediction is used. In other modes, a switching bit mask may be provided on a frame basis such that the switching bit mask indicates whether a motion compensated block uses median motion vector prediction or a selected motion vector prediction technique. No bit is required to indicated which selected motion vector prediction technique (e.g., Graham or spiral in mode 1) because the choice between them is based on the result of the median motion vector prediction (e.g., if the first predicted motion vector is a zero motion vector, spiral is used in mode 1 and, if the first predicted motion vector is a non-zero motion vector, Graham is used in mode 1). Similarly, modes 1-4 may not require a bit for the selected motion vector prediction technique.

The switching cost between the discussed modes (or methods) is depicted the Table 1. In Table 1, the following abbreviations are used: Hdr (Header), MV (Motion Vector), Pred (Prediction).

TABLE 1

Overview of MV Prediction Methods

| Mode/ Method | Hdr | Hdr Size | Summary | 1st MV Prediction | 2nd MV Prediction | Set Equal/ Close Pred MVs |
|---|---|---|---|---|---|---|
| 0 | 0 | 1 | No Switching mask | Median | N/A | N/A |
| 1 | 100 | 3 | Switching mask coded | Median | Graham/ Spiral | Yes |
| 2 | 101 | 3 | Switching mask coded | Median | Graham Last/Spiral | Yes |
| 3 | 110 | 3 | Switching mask coded | Median | Graham/ Spiral | No |
| 4 | 111 | 3 | Switching mask coded | Median | Graham Last/Spiral | No |

As discussed, motion vector data including motion vectors may be obtained for a video frame. A first predicted motion vector may be determined using a median motion vector prediction technique for each motion compensated block of the video frame. For modes 1-4, a second predicted motion vector may be determined using a selected motion vector prediction technique for each motion compensated block (the selected motion vector prediction technique being based on the mode and the result of the first prediction motion vector as discussed). The first or the second predicted motion vector may be selected for each motion compensated block of the video frame and a motion vector bit mask may be defined which identifies the median or the selected motion vector prediction technique (e.g., as associated with the first and second predicted motion vectors) for each motion compensated block. As is discussed further, a selected coding method may be determined for the motion vector bit mask (e.g., the switching mask) and the motion vector bit mask may be encoded using the selected coding method into a bitstream. The process may be repeated on a frame-by-frame basis.

The bitstream may be received at a decoder and disassembled and/or decoded to determine a frame level motion vector prediction method (e.g., a mode) and a motion vector bit mask (e.g., a switching mask) for a video frame. As discussed, the motion vector bit mask may identify a median or a selected motion vector prediction technique for each motion compensated block of the video frame and the selected motion vector prediction technique may be based on the frame level motion vector prediction method and a first motion vector for each motion compensated block determined based on the median motion vector prediction technique. For example, for a motion compensated block using the median motion vector prediction technique (as indicated via the bit mask), the decoder may determine the predicted motion vector for the block using the median motion vector prediction technique (e.g., for modes 1-4). For a motion compensated block using the selected motion vector prediction technique (again, as indicated via the bit mask), the decoder may determine a first predicted motion vector (or a median based prediction motion vector) using the median motion vector prediction technique and a second predicted motion vector based on the frame level motion vector prediction method (e.g., mode) and the result of the median based prediction motion vector. For example, when the median based prediction motion vector is a zero motion vector, the second predicted motion vector may be determined using a spiral motion vector prediction technique. When the median based prediction motion vector is a non-zero motion vector, the second predicted motion vector may be determined using a Graham motion vector prediction technique (in modes 1 and 3) or a Graham last block motion vector prediction technique (in modes 2 and 4). In such a manner, the bitstream may not need an additional bit indicating which selected motion vector prediction technique is to be used for each motion compensated block. Further, as discussed herein, the predicted motion vector may be added to a motion vector difference to determine a final decoded motion vector for each motion compensated block.

Figure 26:
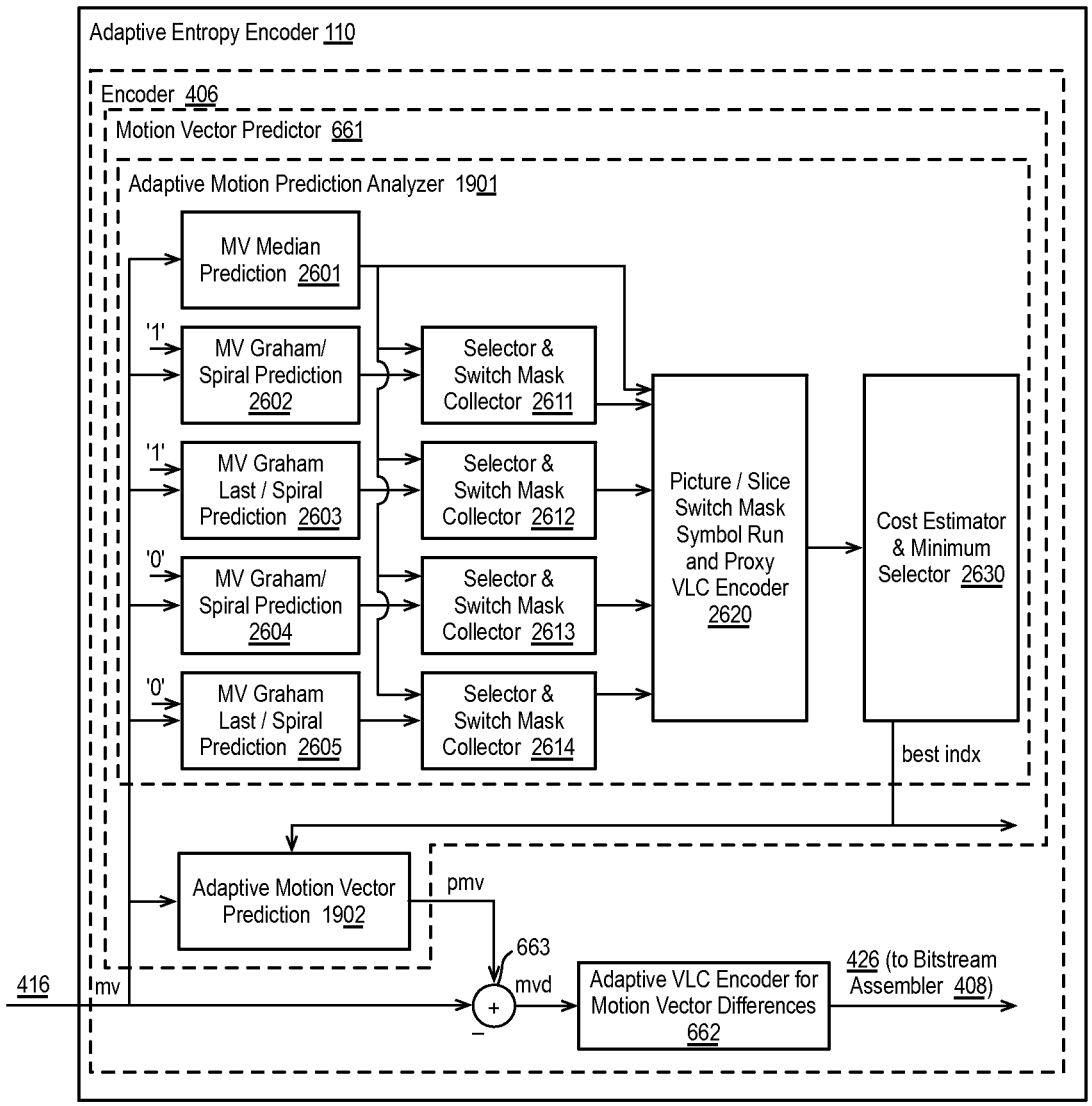
FIG. 26 is an illustrative diagram of an example adaptive motion prediction analyzer module.
Figure 27B:
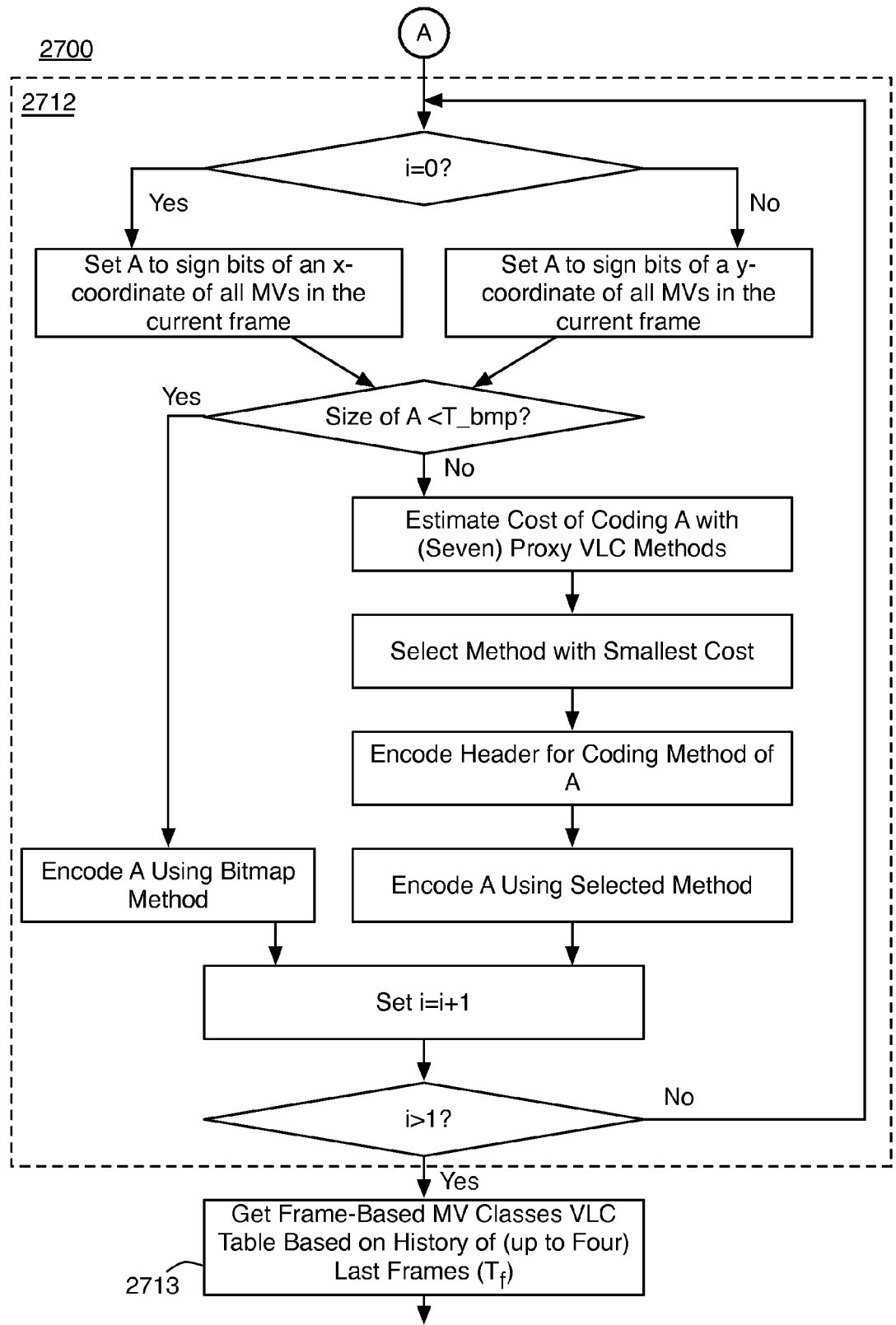
Figure 27C:
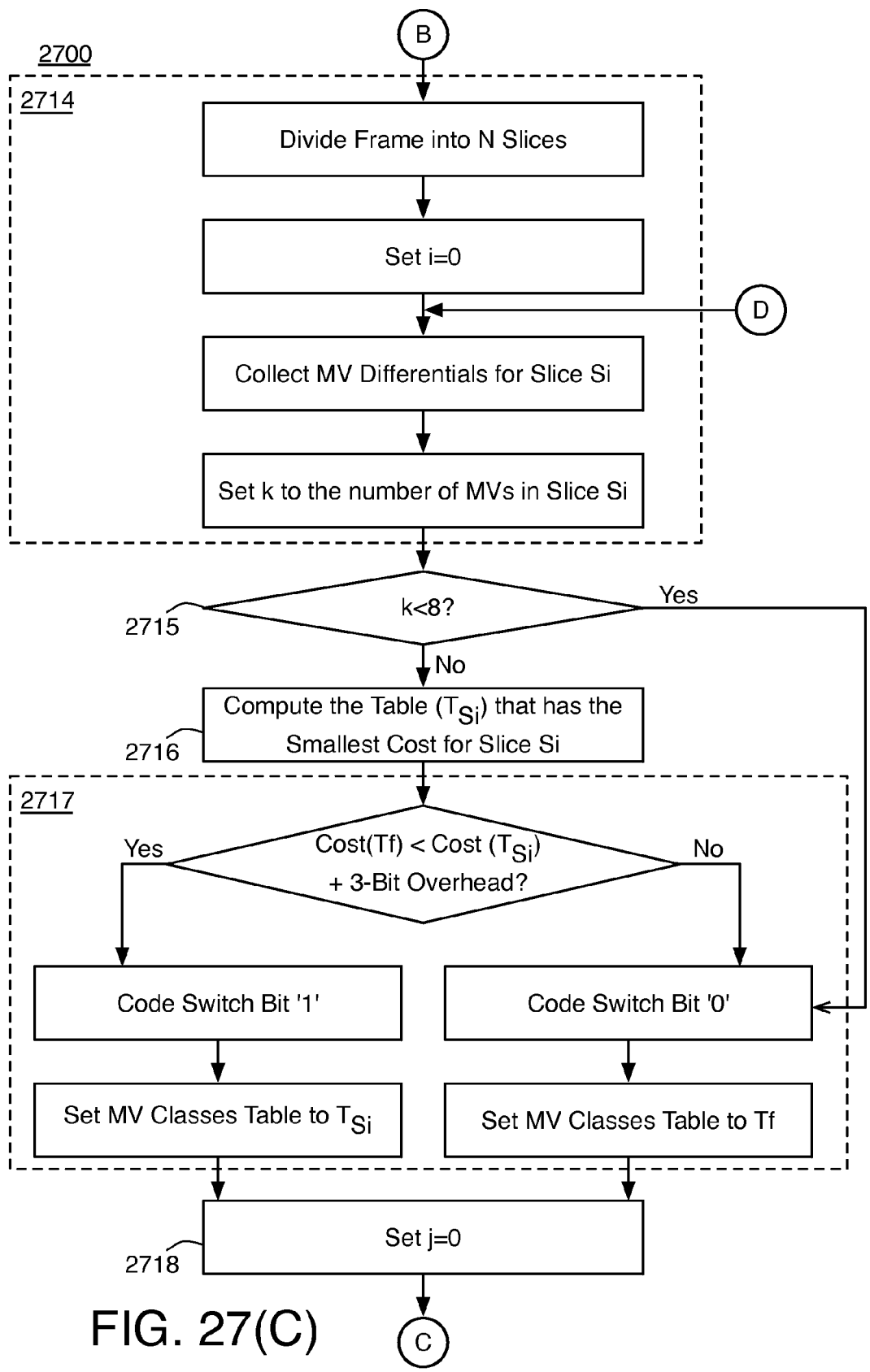
Figure 27D:
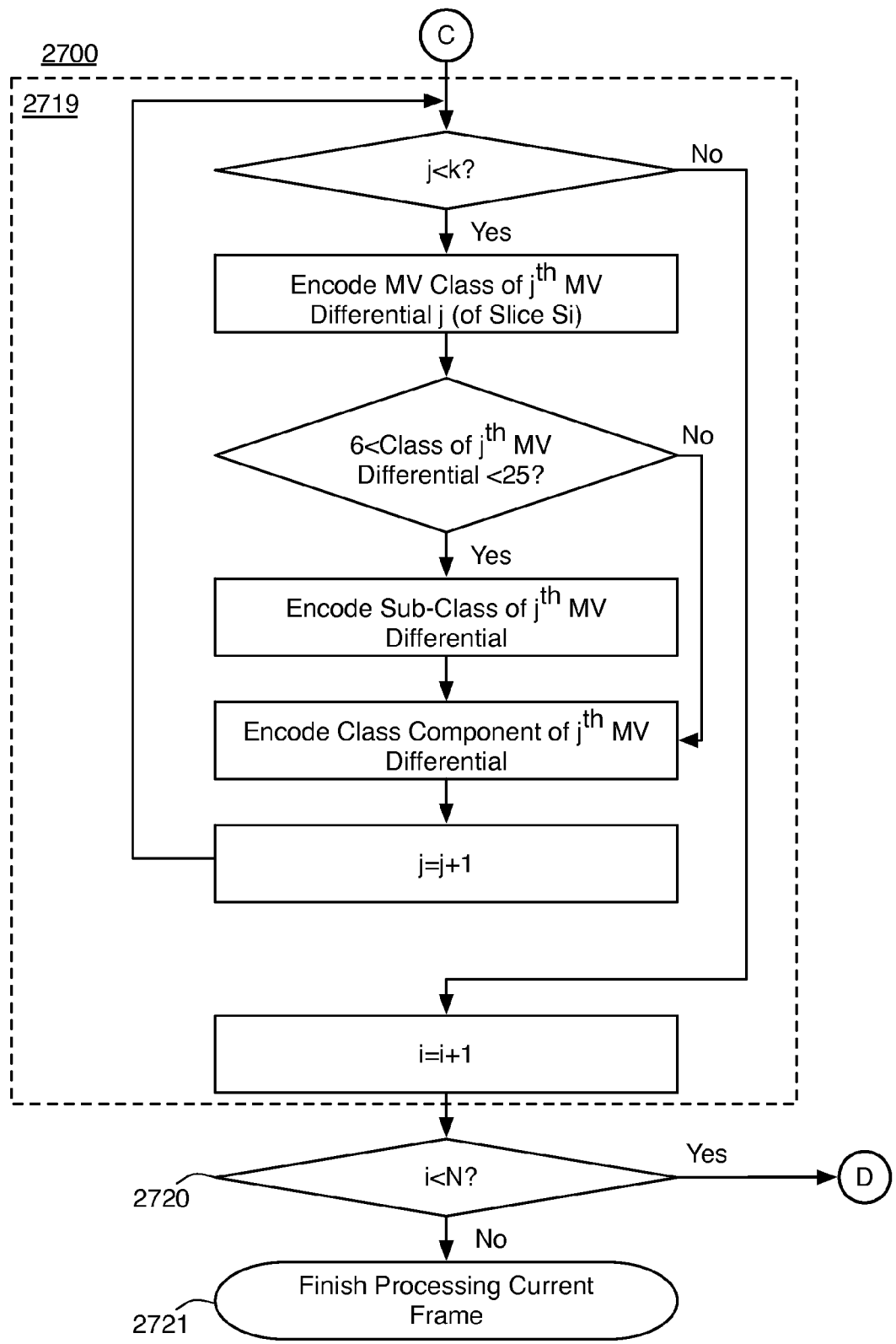

FIG. 26 is an illustrative diagram of an example adaptive motion prediction analyzer module 1901, arranged in accordance with at least some implementations of the present disclosure. As shown, adaptive motion prediction analyzer module 1901 may be implemented via motion vector predictor module 661 of entropy encoder 406, which may be implemented via adaptive entropy encoder 110 as discussed herein. As shown, adaptive motion prediction analyzer module 1901 may provide a selected motion vector prediction technique to adaptive motion vector prediction module 1902 (e.g. via "best indx"). Also as shown, adaptive motion prediction analyzer module 1901 may include a motion vector median prediction module 2601, a motion vector Graham/Spiral prediction module 2602, a motion vector Graham last (e.g., Graham last block)/Spiral prediction module 2603, a motion vector Graham/Spiral prediction module 2604, a motion vector Graham last/Spiral prediction module 2605, a selector and switch mask collector modules 2611-2614, a picture/slice switch mask symbol run and/or proxy VLC encoder module 2620, and/or a cost estimator and minimum selector module 2630.

In some examples, modules 2601-2605 may implement techniques implementing or associated with modes (or methods) 0-4 as discussed above. For example, motion vector median prediction module 2601 may predict a motion vector for a block of video data using a median motion vector prediction technique and provide the motion vector to selector and switch mask collector modules 2611-2614 and picture/slice switch mask symbol run and/or proxy VLC encoder module 2620.

Motion vector Graham/Spiral prediction module 2602 may predict a motion vector for a block of video data using a Graham motion vector prediction technique if the median motion vector is a non-zero motion vector or a spiral motion vector prediction technique if the median motion vector is a zero motion vector for implementation of mode 1. As shown in FIG. 26, an input '1' may be provided to motion vector Graham/Spiral prediction module 2602 and motion vector Graham last/Spiral prediction module 2603. Also as shown, an input '0' may be provided to motion vector Graham/ Spiral prediction module 2604 and motion vector Graham last/Spiral prediction module 2605. For example, such inputs may relate to a set equal close predicted motion vector indicator. For example, an indicator of '1' may provide to set equal close predicted motion vectors while an indicator of '0' may provide to not set equal close predicted motion vectors (please see Table 1). In some examples, such an indicator may be passed to or provided directly to the appropriate selector and switch mask collector (e.g., one of selector and switch mask collectors 2611-2614).

As shown, selector and switch mask collector 2611 may receive the first and second predicted motion vectors from motion vector median prediction module 2601 (e.g., first) and motion vector Graham/Spiral prediction module 2602 (e.g., second), which may collect the motion vectors and a switch mask for mode 1 as discussed herein. For example, if the difference between the first and second motion vectors is within a threshold, selector and switch mask collector 2611 may select the first motion vector and if the difference is greater than a threshold, selector and switch mask collector 2611 may select both the first and second motion vectors for further processing.

Motion vector Graham last/Spiral prediction module 2603 may predict a motion vector for a block of video data using a Graham last block motion vector prediction technique if the median motion vector is a non-zero motion vector or a spiral motion vector prediction technique if the median motion vector is a zero motion vector for implementation of mode 2. As shown in FIG. 26, an input '1' may be provided to motion vector Graham last/Spiral prediction module 2603 indicating to set equal close predicted motion vectors.

As shown, selector and switch mask collector 2612 may receive the first and second predicted motion vectors from motion vector median prediction module 2601 (e.g., first) and motion vector Graham last/Spiral prediction module 2603 (e.g., second), which may collect the motion vectors and a switch mask for mode 2 as discussed herein. For example, if the difference between the first and second motion vectors is within a threshold, selector and switch mask collector 2612 may select the first motion vector and if the difference is greater than a threshold, selector and switch mask collector 2612 may select both the first and second motion vectors for further processing.

Motion vector Graham/Spiral prediction module 2604 may predict a motion vector for a block of video data using a Graham motion vector prediction technique if the median motion vector is a non-zero motion vector or a spiral motion vector prediction technique if the median motion vector is a zero motion vector for implementation of mode 3. As shown in FIG. 26, an input '0' may be provided to motion vector Graham last/Spiral prediction module 2604 indicating to not set equal close predicted motion vectors.

As shown, selector and switch mask collector 2613 may receive the first and second predicted motion vectors from motion vector median prediction module 2601 (e.g., first) and motion vector Graham/Spiral prediction module 2604 (e.g., second), which may collect the motion vectors and a switch mask for mode 3 as discussed herein. For example, if the difference between the first and second motion vectors is within a threshold, selector and switch mask collector 2613 may select the second motion vector (e.g., not set equal to the first) and if the difference is greater than a threshold, selector and switch mask collector 2613 may select both the first and second motion vectors for further processing.

Motion vector Graham last/Spiral prediction module 2605 may predict a motion vector for a block of video data using a Graham last block motion vector prediction technique if the median motion vector is a non-zero motion vector or a spiral motion vector prediction technique if the median motion vector is a zero motion vector for implementation of mode 4. As shown in FIG. 26, an input '0' may be provided to motion vector Graham last/Spiral prediction module 2605 indicating to not set equal close predicted motion vectors.

As shown, selector and switch mask collector 2614 may receive the first and second predicted motion vectors from motion vector median prediction module 2601 (e.g., first) and motion vector Graham last/Spiral prediction module 2605 (e.g., second), which may collect the motion vectors and a switch mask for mode 4 as discussed herein. For example, if the difference between the first and second motion vectors is within a threshold, selector and switch mask collector 2614 may select the second motion vector (e.g., not set equal to the first) and if the difference is greater than a threshold, selector and switch mask collector 2614 may select both the first and second motion vectors for further processing.

As shown, selector and switch mask collectors 2611-2614 may transmit the selected motion vector(s) and switch masks to picture/slice switch mask symbol run and/or proxy VLC encoder module 2620. Picture/slice switch mask symbol run and/or proxy VLC encoder module 2620 may compress the received data (e.g., motion vector(s) and switch masks) for evaluation via cost estimator and minimum selector module 2130. Cost estimator and minimum selector module 2130 may determine the best (e.g., lowest bit count motion vector(s) and/or associated bit masks or the like) and provide the selection to adaptive motion vector prediction module 1902 via best indx. As shown, the selection may also be provided to other modules as needed for further processing or use by other modules in their characterizations of various video data. As shown, adaptive motion vector prediction module 1902 may generate a motion vector based on the selected technique, which may be differenced with the original motion vector via differencer 563 to generate motion vector differential (mvd). The motion vector differential may be encoded via adaptive VLC encoder for motion vector differences module 562 as is discussed further herein.

Further, the generated bit masks may be evaluated and encoded as discussed herein. For example, as discussed, compressed bit masks may be compared via cost estimator and minimum selector module 2130 to determine the best motion vector prediction technique as represented by "best indx", which may be transmitted to adaptive motion vector prediction module 1902. The following table illustrates example headers (e.g., overhead) for coding the bit masks using various techniques as discussed further herein.

TABLE 2

Overhead for Coding of the Switching Bit Mask

| Method | Header | Header Size |
|---|---|---|
| Bitmap | 0 | 1 |
| Proxy VLC Table 8 | 10 | 2 |
| Proxy VLC Table 4 | 110 | 3 |
| Proxy VLC Table 5 | 1110 | 4 |
| Symbol-run Table 8 | 1111 | 4 |

As discussed, symbol-run and/or proxy variable length coding (VLC) methods may include two entropy coders: (1) a symbol-run-based entropy coder and (2) a proxy VLC-based entropy coder. In some examples, a symbol-run coder may compress a bitstream by encoding runs of Os. In such techniques, each value of '1' along with the run of preceding '0's may be coded a single codeword. If there is more than a certain number of consecutive '0's, an escape (ESC) may be coded and after the last value of '1' is coded an end of block codeword (EOB) may be provided. In some examples, proxy VLC-based may replace a block of bits of fixed length in the bitstream with a VLC codeword. In some examples, we use fixed lengths of 2 and/or 3 may be used.

As discussed, a symbol-run coder may compress a bitstream by encoding runs of Os and a proxy VLC-based coder may replaces a block of bits of fixed length in the bitstream with a VLC codeword. Tables 3-6 provide example codes for use in symbol-run-based and/or proxy VLC-based coding. In Tables 3-6, a separate Table designation may be provided for the sake of clarity of presentation.

TABLE 3

Symbol-Run Table 8

| Code | Address | Codelength | Code | Address | Codelength |
|---|---|---|---|---|---|
| 11 | 1 | 2 | 0101 | 6 | 4 |
| 000 | 2 | 3 | 01001 | 7 | 5 |
| 001 | 3 | 3 | 010000 | 8 | 6 |
| 100 | 4 | 3 | 101 | ESC | 3 |
| 011 | 5 | 3 | 010001 | EOB | 6 |

TABLE 4

Proxy VLC Table 8

| Bits | VLC | Codelength | Bits | VLC | Codelength |
|---|---|---|---|---|---|
| 000 | 00 | 2 | 100 | 101 | 3 |
| 001 | 010 | 3 | 101 | 1110 | 4 |
| 010 | 011 | 3 | 110 | 110 | 3 |
| 011 | 100 | 3 | 111 | 1111 | 4 |

TABLE 5

Proxy VLC Table 4

| Bits | VLC | Codelength | Bits | VLC | Codelength |
|---|---|---|---|---|---|
| 000 | 0 | 1 | 011 | 11100 | 5 |
| 001 | 100 | 3 | 101 | 11101 | 5 |
| 010 | 101 | 3 | 110 | 11110 | 5 |
| 100 | 110 | 3 | 111 | 11111 | 5 |

TABLE 6

Proxy VLC Table 3

| Bits | VLC | Codelength |
|---|---|---|
| 00 | 0 | 1 |
| 01 | 110 | 3 |
| 10 | 10 | 2 |
| 11 | 111 | 3 |

In some examples there may be few motion vectors to be coded. In such examples, it may not be efficient to perform the switching based prediction as discussed above. In such examples, if the number of motion vectors within a frame is below a pre-selected or heuristically determined threshold, a median motion vector prediction technique may be used for the frame (e.g., mode or method 0 as discussed). In such examples, the overhead of 1 bit may be omitted. In some examples, the threshold may be 16 motion vectors. In some examples, the threshold may be 8, 10, 20, or 25 motion vectors.

In some examples, entropy coding techniques discussed herein may used to encode the differential motion vector data or bit mask data. In some examples, an adaptive symbol-run variable coding technique may be used. In some examples, an adaptive proxy variable length coding technique may be used. Such techniques have been described herein with respect to FIGS. 4 and 6 and will not be repeated for the sake of brevity. In some implementations, various techniques discussed with respect to adaptive symbol-run variable coding and/or adaptive proxy variable length coding as discussed elsewhere herein may be used with respect to encoder module 306, sub-modules, and the various methods and modes discussed herein.

FIGS. 27(A)-27(D) provide a flow diagram illustrating an example process 2700, arranged in accordance with at least some implementations of the present disclosure. Process 2700 may include one or more operations, functions or actions as illustrated by one or more of operations 2700-. Process 2700 may form at least part of a next generation video coding process. By way of non-limiting example, process 2700 may form at least part of a next generation video encoding process as undertaken by encoder system 100 of FIG. 1 and/or entropy encoder module 110 as discussed herein.

Process 2700 may begin at operation 2701 Read Input, where frame-level motion vector data may be read. Process 2700 may continue at operation 2702 Number of MVs<16 (e.g., check for simple case), where it may be determined whether the number of non-zero motion vectors for the frame is less than a threshold (e.g., a threshold of 16 is illustrated, the threshold may be designated as T_NO-SW_PRD). If so, process 2700 may continue at operation 2711 and a median motion vector prediction technique. If not, process 2700 may continue at operation 2703 Estimate Golomb-Based Bit Cost of Prediction Methods, where prediction methods (e.g., 5 in this example, see Table 1) may be applied to the motion vectors (e.g., neighborhood motion vectors for a block of video data) and Golomb code-based bits estimates may be determined for the methods.

Process 2700 may continue at operation 2704 Select Prediction Method, where the estimated bits for all methods (e.g., modes 1-4) may be compared to determine the one with the smallest cost, which may be the select prediction method. For example, operation 2704 may determine a frame level motion vector prediction method (based on modes 1-4). Process 2700 may continue at operation 2705 Encode Prediction Method Header, where a header-type VLC coding may be used to code the index of the selected prediction method (please see Table 2). Process 2700 may continue at operation 2706 Default (Median) Prediction?, where it may be determined whether the selected prediction method is median prediction. If so, process 2700 may continue at operation 2711 and no switching mask may need to be determined. If not, process 2700 may continue at operations 2707-2710, which may encode prediction switching bits, as discussed herein. For example, process 2700 may continue at operation 2707 Estimate Bits of (Five) Symbol Run/Proxy VLC Methods, where bits may be estimated for the Symbol Run/Proxy VLC Methods (please see Table 2). Process 2700 may continue at operation 2708 Select Method with Smallest Estimated Bit Cost, where the method with the smallest bit cost may be selected. Process 2700 may continue at operation 2709 Encode the Selected Method Header, where the selected index header may be encoded (please see Table 2). Process 2700 may continue at operation 2710 Encode Switching Mask Payload where the switching mask payload may be encoded. As shown, operations 2707-2710 may select an entropy coding method and encode the switching mask.

Process 2700 may continue at operation 2711 Set i=0, from any of 2702, 2706, or 2710 as described. Process 2700 may begin at operations grouping 2712, which may encode sign bits mask to determine (and code the headers of) the best methods for coding sign bits of motion vectors (with x and y coordinates' signs separately coded). For example, operations grouping 2712 may collect sign bits of an x-coordinate of all motion vectors in the current frame into a binary mask X and collect sign bits of an y-coordinate of all motion vectors in the current frame into a binary mask Y. If number of bits in X is less than a threshold defined as T_bmp (in some examples, for P-frames T_bmp=136, and for F-frames T_bmp=152) then code X with bitmap method. The cost may be estimated for coding X with 7 Proxy VLC methods (described in Table 8 below for P-frames, and in Table 9 below for F-frames). The estimated bits for all coding methods may be compared for X and the one with the smallest cost may be determined. The header for coding method of X (please see Tables 8 and 9 below) may be encoded. In some examples, X may be encoded using the selected method. If number of bits in Y is less than a threshold defined as T_bmp (in some examples, for P-frames T_bmp=136, and for F-frames T_bmp=152) then Y may be coded with bitmap method. The may be estimated for coding Y with 7 Proxy VLC methods (described in Table 8 below for P-frames, and in Table 9 below for F-frames). The estimated bits for all coding methods may be compared for Y and the one with the smallest cost may be determined. The header for coding method of Y (please see Tables 8 and 9 below) may be encoded. In some examples, Y may be encoded using the selected method. As discussed, process 2700 may thereby encode an x sign bit and a y sign bit of any individual motion vector difference into the bitstream with a sign bit encoding of the plurality of motion vector differences of the video frame, wherein encoding the sign bit encoding comprises a selected sign bit encoding from a plurality of sign bit encoding techniques comprising proxy variable length coding techniques using different coding tables.

Process 2700 may continue at operation 2713 Get Frame-Based MV Classes VLC Table Based on History of (up to Four) Last Frames (T$_f$), where the best frame-based VLC table for differential motion vector classes coding may be determined Please note, classes are described below with respect to FIG. 29 and Table 7. Process 2700 may continue at operations grouping 2714, where slice motion vector differentials may be determined. For example, slice motion vector differentials may be collected for a current slice. As discussed, a plurality of motion vector difference classes may be described as a motion vector class table and several motion vector class tables may be available on a slice of a video frame. For example a first slice may be associated with a first motion vector class table and a second slice of the video frame may be associated with a second motion vector class table.

Process 2700 may continue at decision operation 2715 k<8?, where it may be determined if the number of motion vectors in the current slice is less than a predetermined or heuristically determined threshold designated as T_NO-SW_VLC (and set to 8 in this example). If so, a frame based VLC table may be used for motion vector classes coding. If not, process 2700 may continue at operation 2716 Compute the Table (TO that has the Smallest Cost for Slice Si, were the table with the smallest cost may be determined Process 2700 may continue at operation grouping 2717, where a Frame-Based or a Slice-Based motion vector Classes VLC Table Selection may be made such that either a slice-based or a frame-based table for the current slice (with 1 bit flag) or a slice-based table for the current slice (with a 0 bit flag) may be selected based on estimated cost. Process 2700 may continue at operation 2718 set j=0.

Process 2700 may continue at operation grouping 2719, where slice-level motion vector differentials may be encoded and the code motion vector class index may be determined and coded. For example, slice-level motion vector differentials may be encoded for x- and y-components separately. As shown, if class index is in the range 7 through 24, a sub class index may be determined and coded. Please note, sub-classes are discussed further herein with respect to FIG. 30. In some examples, a vector components index may be encoded. Process 2700 may continue at decision operation 2720 i<N?. If so, process 2700 may continue at operation grouping 2714 as discussed. If not, the last slice has been processed, and process 2700 may terminate at operation 2721 Finish Processing Current Frame.

As discussed with respect to process 2700 and elsewhere herein, motion vector differences may be determined for a video frame. Each or individual motion vector differences may be classified into a selected class of multiple motion vector difference classes (as is discussed further below with respect to FIG. 29). Within the selected class, a number of motion vector difference may be available and one may be selected based on each or individual motion vector differences. For example, an x- and y-value for an individual motion vector difference may define the class of the individual motion vector difference (e.g., based on the magnitude of the individual motion vector difference). As discussed, in some examples, the individual motion vector difference may be further defined by a sub-class (particularly if the selected class is large). In either case, a motion vector difference within the class or sub-class may be chosen as associated with the individual motion vector difference. Via such classification and sub-classification, encoding gains may be recognized. For example, a class identifier associated with the selected class (and a sub-class identifier associated with the selected sub-class, if needed) and a class-based motion vector indicator associated with the indicated class-based motion vector may be encoded into a bitstream as described.

The bitstream may be received by a decoder which may decode the bitstream to determine a class identifier and a class-based motion vector indicator associated with an individual motion compensated block (e.g., for which the motion vector difference is being determined), determine a decoded motion vector difference for the individual motion compensated block based on a selected class of multiple motion vector difference classes such that the selected class is indicated via the class identifier (and a sub-class may be indicated based on a sub-class identifier, if needed) and based on the class-based motion vector indicator. For example, the class-based motion vector indicator may indicate the decoded motion vector difference within the selected class. As discussed elsewhere herein, a predicted motion vector associated with the individual motion compensated block may be determined. The predicted motion vector and the decoded motion vector difference may be added to determine a final decoded motion vector for the individual motion compensated block.

Figure 28:
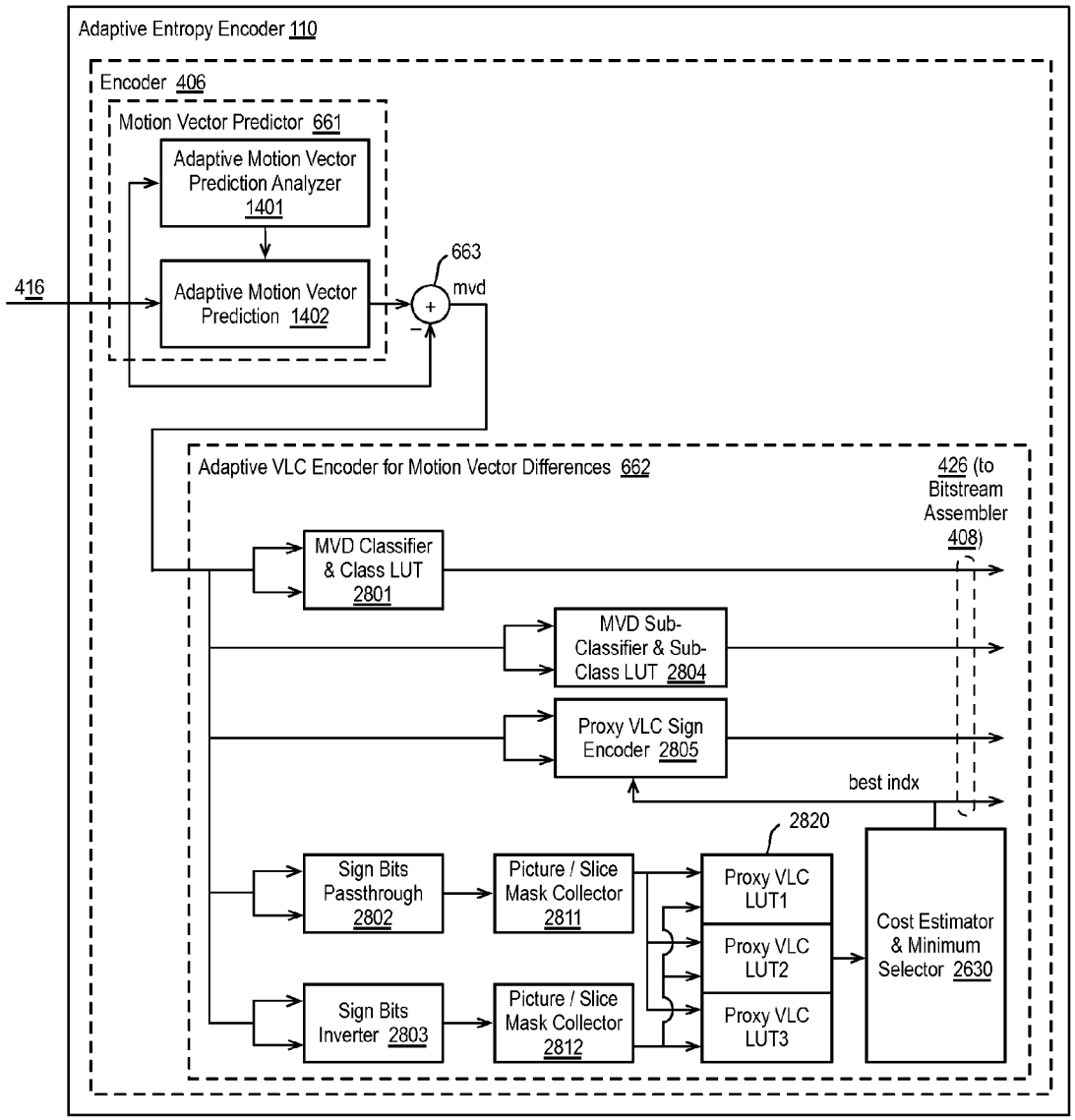
FIG. 28 is an illustrative diagram of an example adaptive VLC encoder for motion vector differences module.

FIG. 28 is an illustrative diagram of an example adaptive VLC encoder for motion vector differences module 662, arranged in accordance with at least some implementations of the present disclosure. As shown, adaptive VLC encoder for motion vector differences module 662 may be implemented encoder module 406, which may be implemented via adaptive entropy encoder 110. As shown, adaptive VLC encoder for motion vector differences module 662 may include a motion vector differential classifier and class look up table module 2801, a sign bits passthrough module 2802, a sign bits inverter module 2803, a motion vector differential sub-classifier and sub-class look up table module 2804, a proxy VLC sign encoder module 2805, a picture/slice mask collector 2311, a picture/slice mask collector 2312, proxy VLC look up tables 2820, and/or a cost estimator and minimum selector module 2630. As discussed above, in some examples, cost estimator and minimum selector module 2630 may be implemented via adaptive motion prediction analyzer module 1901. In various examples, cost estimator and minimum selector module 2630 may be implemented via one of or both of adaptive VLC encoder for motion vector differences module 662 and adaptive motion prediction analyzer module 1901.

As shown, motion vector differential data (mvd) may be received via adaptive VLC encoder for motion vector differences module 662, which may process the motion vector differential data (mvd) to provide compressed (or coded) video data 426, which may be transmitted to bitstream assembler 408 (please see FIG. 4).

For example, the techniques discussed herein may include classification of MV differentials (mvd) into one of multiple (in some examples, many) available categories (e.g., classes) via motion vector differential classifier and class look up table module 280, for example, for efficient representation and, in some examples, sub-classification via motion vector differential sub-classifier and sub-class look up table module 2804, for example, into one of several sub-classes. Class and subclass components may be encoded and sent via bits of compressed video data 426 to identify the magnitude of the motion vector differential, for example. The sign of motion vector differential may coded separately via sign bits passthrough module 2802, sign bits inverter module 2803, picture/slice mask collectors 2311, 2812 and further compressed by several available proxy VLC look up tables 2820 and then analyzed via cost estimator and minimum selector module 2630 for the most compressed representation.

For example, the encoding process of motion vector differentials may be provided as follows. Transmitted values may be the following differential vectors:

MVDx=MVx-PMVx aMVDx=abs(MVDx)

MVDy=MVy-PMVy aMVDx=abs(MVDx)

where, MVx may be actual (e.g., original) motion vector, and PMVx may be the predicted motion vector. In some examples, MVDx and MVDy may have the values from −2047 to 2047.

Further, in some examples, MVDx, MVDy (e.g., the components of motion vector differentials may be coded jointly. In some examples, the possible differential motion vector pairs (MVDx, MVDy) create a 2-dimensional plane and each pair may belong to a class. For example, 34 classes may be specified as shown in FIG. 27 and Table 7.

Figure 29:
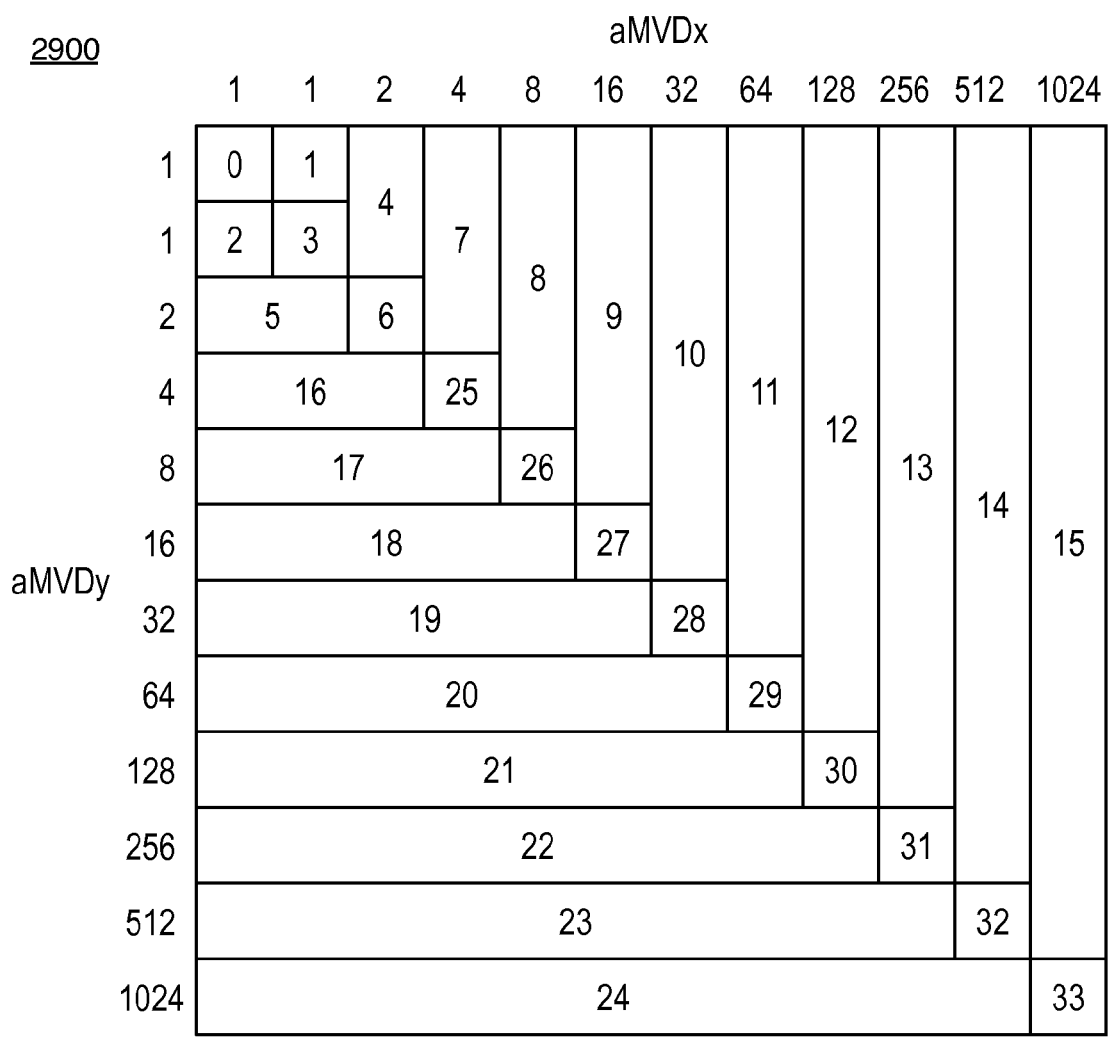
FIG. 29 is an illustrative diagram of an example differential motion vector classes.

FIG. 29 is an illustrative diagram of an example differential motion vector classes 2900, arranged in accordance with at least some implementations of the present disclosure. As shown in FIG. 29, differential motion vector classes 2900 may be established with characteristic ranges as provided in Table 7.

TABLE 7

Motion Vector Differential Ranges for MVD Classes

| MVD class | min aMVDx | max aMVDx | min aMVDy | max aMVDy | Size |
|---|---|---|---|---|---|
| 0 | 0 | 0 | 0 | 0 | 1 × 1 |
| 1 | 1 | 1 | 0 | 0 | 1 × 1 |
| 2 | 0 | 0 | 1 | 1 | 1 × 1 |
| 3 | 1 | 1 | 1 | 1 | 1 × 1 |
| 4 | 2 | 3 | 0 | 1 | 2 × 2 |
| 5 | 0 | 1 | 2 | 3 | 2 × 2 |
| 6 | 2 | 3 | 2 | 3 | 2 × 2 |
| 7 | 4 | 7 | 0 | 3 | 4 × 4 |
| 8 | 8 | 15 | 0 | 7 | 8 × 8 |

TABLE 7-continued

Motion Vector Differential Ranges for MVD Classes

| MVD class | min aMVDx | max aMVDx | min aMVDy | max aMVDy | Size |
|---|---|---|---|---|---|
| 9 | 16 | 31 | 0 | 15 | 16 × 16 |
| 10 | 32 | 63 | 0 | 31 | 32 × 32 |
| 11 | 64 | 127 | 0 | 63 | 64 × 64 |
| 12 | 128 | 255 | 0 | 127 | 128 × 128 |
| 13 | 256 | 511 | 0 | 255 | 256 × 256 |
| 14 | 512 | 1023 | 0 | 511 | 512 × 512 |
| 15 | 1024 | 2047 | 0 | 1023 | 1024 × 1024 |
| 16 | 0 | 3 | 4 | 7 | 4 × 4 |
| 17 | 0 | 7 | 8 | 15 | 8 × 8 |
| 18 | 0 | 15 | 16 | 31 | 16 × 16 |
| 19 | 0 | 31 | 32 | 63 | 32 × 32 |
| 20 | 0 | 63 | 64 | 127 | 64 × 64 |
| 21 | 0 | 127 | 128 | 255 | 128 × 128 |
| 22 | 0 | 255 | 256 | 511 | 256 × 256 |
| 23 | 0 | 511 | 512 | 1023 | 512 × 512 |
| 24 | 0 | 1023 | 1024 | 2047 | 1024 × 1024 |
| 25 | 4 | 7 | 4 | 7 | 4 × 4 |
| 26 | 8 | 15 | 8 | 15 | 8 × 8 |
| 27 | 16 | 31 | 16 | 31 | 16 × 16 |
| 28 | 32 | 63 | 32 | 63 | 32 × 32 |
| 29 | 64 | 127 | 64 | 127 | 64 × 64 |
| 30 | 128 | 255 | 128 | 255 | 128 × 128 |
| 31 | 256 | 511 | 256 | 511 | 256 × 256 |
| 32 | 512 | 1023 | 512 | 1023 | 512 × 512 |
| 33 | 1024 | 2047 | 1024 | 2047 | 1024 × 1024 |

In some examples, the motion vector differentials may be further characterized via sub-classes. For example, classes 7-15 may have a horizontal shape type sub-class such that each sub-class may divide the class as shown in FIG. 30(A) and classes 16-24 may have a vertical shape type sub-class such that each sub-class may divide the class as shown in FIG. 30(B).

FIGS. 30(A) and 30(B) are illustrative diagrams of example differential motion vector subclasses 3001 and 3002, arranged in accordance with at least some implementations of the present disclosure. As shown in FIG. 30(A), vertical sub-classes 3001 may divide a class into horizontal type sub-classes labeled sub-classes 0-1. As shown in FIG. 30(A), vertical sub-classes 3001 may divide a class into horizontal type sub-classes labeled sub-classes 0-1.

For example, as shown, classes 4-6 may have a size of 2×2 (4 motion vectors). Such classes may be divided into 4 sub-classes such that each sub-class may be given an appropriate codeword. For example, the codewords for sub-classes classes 4-6 may be selected based on corresponding statistics from previous frame(s). In some examples, a history of up to 4 frames (e.g., a history of 1-4 frames) may be used. Other classes (related by size or otherwise) may be provided codewords in a similar manner.

Each MVD pair as discussed herein may include a VLC main class, a VLC sub-class, sub-class component bit(s), and sign bits for the MVD pair. VLC tables for main classes are illustrated next. In some examples, there may be 10 tables for P and 10 tables for F frames (indexed 0 through 9). For example, the table may be selected in an adaptive way such that each slice may use a different table. At each slice, for example two table indices may be determined: a frame-based table index and slice-based table index, as discussed above with respect to FIG. 27. The frame-based table index at first frame may be set to 0. At following frames, the frame-based table index may be set to an index of the table that yields the smallest bit count computed from the gathered statistics of previous frames of the same type. In some examples, the last 4 pictures' statistics may be used.

Further to this table index, at each slice, a slice-based table may be determined as the best table (out of the best 8 frame-based tables in the illustrative example) applied to the motion vectors of the current slice. If the determined table plus the overhead needed to indicate it produce fewer bits than the frame-based table, for example, class information may be coded with the slice-based table within that slice; otherwise, a frame-based table may be used. The selection between frame-based table and slice-based table at each slice may be coded with a 1 bit overhead in some examples. Further, in some examples, 2×2 size sub-classes may be coded either with 2 bit codes or with 1-3 bit codes depending on the history (e.g., up to four last frames). However, in some examples, horizontal and vertical sub-classes may always be coded with the following VLC codes:

Sub-class 0: '0'
Sub-class 1: '10'
Sub-class 2: '110'
Sub-class 3: '111'

In some examples, to specify a motion vector differential pair in a class (or sub-class), the number of required bits may be given as:

$$N = \text{Log } 2(w \times h),$$

where w=width of a class (sub-class), h=height of a class (sub-class).

At the end of a slice, sign bits of the vectors in that slice may be coded. In some examples, the sign bits may be accumulated as follows. If the values of MVDx or MVDy are non-zero, sign bits are appended to a sign bits mask. In some examples, two sign bits masks may be created, one per x coordinate and one per y coordinate. Such separating of the masks coordinate-wise may provide increased correlation within each mask. For example, the sign bit masks may be populated as follows:

If MVD(x)=0, no sign bit added to sign bits mask x

If MVD(x)>0, '0' sign bit added to sign bits mask x

If MVD(x)<0, '1' sign bit added to sign bits mask x

If MVD(y)=0, no sign bit added to sign bits mask y

If MVD(y)>0, '0' sign bit added to sign bits mask y

If MVD(y)<0, '1' sign bit added to sign bits mask y

Once all sign bits for the current slice are accumulated, the sign bits masks may be coded using either bitmap coding or a proxy VLC approach, as described herein. For example, the following table provides overhead for coding of the sign bits masks (both x and y) in P-frames and F-frames.

TABLE 8

Overhead for coding of the sign bits masks (both x and y) in P-frames

| Method | Header | Header Size |
|---|---|---|
| Bitmap | 0 | 1 |
| Proxy VLC Table 0 | 1100 | 4 |
| Proxy VLC Table 1 | 1101 | 4 |
| Proxy VLC Table 2 | 1110 | 4 |
| Inverted Proxy VLC Table 0 | 100 | 3 |
| Inverted Proxy VLC Table 1 | 101 | 3 |
| Inverted Proxy VLC Table 2 | 1111 | 4 |

TABLE 9

Overhead for coding of the sign bits masks (both x and y) in F-frames

| Method | Header | Header Size |
|---|---|---|
| Bitmap | 0 | 1 |
| Proxy VLC Table 0 | 1100 | 4 |
| Proxy VLC Table 1 | 1101 | 4 |
| Proxy VLC Table 2 | 1110 | 4 |
| Inverted Proxy VLC Table 0 | 100 | 3 |
| Inverted Proxy VLC Table 1 | 101 | 3 |
| Inverted Proxy VLC Table 2 | 1111 | 4 |

As discussed above, if the number of motion vectors in the current frame is less than a threshold (T_bmp), the masks may be automatically coded as bitmap without any overhead included. As discussed, in some implementations, the T_bmp thresholds for P- and F-frames may be set to 136 and 152, respectively. Otherwise, overhead tables Table 8 and Table 9 may be used to indicate a coding method for masks x and y. For example, the VLC tables used for proxy VLC approach of coding the sign bits masks are shown in Tables 10-12.

TABLE 10

Proxy VLC Table 0

| Bits | VLC | Codelength | Bits | VLC | Codelength |
|---|---|---|---|---|---|
| 000 | 0 | 1 | 011 | 1100 | 4 |
| 001 | 100 | 3 | 101 | 1101 | 4 |
| 010 | 1010 | 4 | 110 | 1110 | 4 |
| 100 | 1011 | 4 | 111 | 1111 | 4 |

TABLE 11

Proxy VLC Table 1

| Bits | VLC | Codelength | Bits | VLC | Codelength |
|---|---|---|---|---|---|
| 000 | 00 | 2 | 011 | 1110 | 4 |
| 001 | 010 | 3 | 101 | 101 | 3 |
| 010 | 011 | 3 | 110 | 110 | 3 |
| 100 | 100 | 3 | 111 | 1111 | 4 |

TABLE 12

Proxy VLC Table 2

| Bits | VLC | Codelength | Bits | VLC | Codelength |
|---|---|---|---|---|---|
| 000 | 00 | 2 | 011 | 101 | 4 |
| 001 | 010 | 3 | 101 | 110 | 3 |
| 010 | 011 | 3 | 110 | 1110 | 3 |
| 100 | 100 | 3 | 111 | 1111 | 4 |

In some examples, once a slice is coded, the next slice may be processed. If the next slice is in the same frame, it may not be necessary to re-compute the frame-based best table index in some examples. If the current frame is finished processing and the next slice is part of the following frame, the statistics may be updated and a frame based index may be determined as discussed above.

As discussed above, if there are few motion vectors to be coded, it may not be efficient to perform the switching based coding as just described. For example, if the number of motion vectors within a frame is below a pre-selected threshold, an initial coding method may be used for prediction. In such examples, the method may use a frame-based VLC table selection without paying any overhead. In some examples, the selected threshold may be T_NOSW_VLC=8 such that the Initial Coding Method is used for prediction if less than 8 MVs are coded per frame.

Using the system(s) and techniques discussed herein, efficient tradeoffs between gains achievable and complexity may be achieved.

As discussed with respect to FIG. 16, example video coding system 1600 may include imaging device(s) 1601, video encoder 100 and/or a video encoder implemented via logic circuitry 1650 of processing unit(s) 1620, video decoder 200 and/or a video decoder implemented via logic circuitry 1650 of processing unit(s) 1620, an antenna 1602, one or more processor(s) 1603, one or more memory store(s) 2004, and/or a display device 2005.

In some examples, video encoder 100 implemented via logic circuitry 1650 may include an image buffer (e.g., via either processing unit(s) 1620 or memory store(s) 1604)) and a graphics processing unit (e.g., via processing unit(s) 1620). The graphics processing unit may be communicatively coupled to the image buffer. The graphics processing unit may include video encoder 100 as implemented via logic circuitry 1650 to embody the various modules as discussed herein. For example, the graphics processing unit may include entropy encoder logic circuitry, and so on. The logic circuitry may be configured to perform the various operations as discussed herein. For example, the entropy encoder logic circuitry may be configured to determine a selected motion vector prediction technique for a block of video data from a plurality of motion vector prediction techniques, generate a prediction motion vector for the block of video data based at least in part on the selected motion vector prediction technique, difference the prediction motion vector with an original motion vector associated with the block of video data to generate a motion vector differential, and entropy encode the motion vector differential to generate coded motion vector data. Video decoder 200 may be implemented in a similar manner.

In some examples, antenna 1602 of video coding system 1600 may be configured to receive an entropy encoded bitstream of video data. As discussed, the bitstream may include compressed video data of various types. Video coding system 1600 may also include video decoder 200 coupled to antenna 1602 and configured to decode the encoded bitstream. For example, video decoder 200 may be configured to disassemble the entropy encoded bitstream to determine coded video data, decode the coded video data to determine a difference motion vector associated with a block of video data, determine a selected motion vector prediction technique for the block of video data from a plurality of motion vector prediction techniques, generate a prediction motion vector for the block of video data based at least in part on the selected motion vector prediction technique, add the difference motion vector and the predicted motion vector to generate a reconstructed motion vector for the block of video data, and generate a video frame based at least in part on the reconstructed motion vector. The video frame may be configured to be presented to a user via a display device, for example.

As discussed, video data of different types may be entropy coded to generate compressed (e.g., coded) video data. The compressed video data may be assembled to generate an output bitstream. With reference to FIG. 8, example bitstream 800 may include indicator data 801, compressed video data 321, compressed video data 322, compressed video data 323, compressed video data 324, compressed video data 325, compressed video data 326, and/or compressed video data 327. For example, compressed video data 326 may include coded motion vector data, coded motion vector differentials, indicator data indicating motion vector prediction, a bit mask, indicator data indicating an entropy coding technique, motion vector differential classification or sub-classification data, x-differential data, y-differential data, x-absolute value differential data, y-absolute value differential data, jointly coded motion vector differential pair data, class component bits, sub-class component bits, or sign bits, or the like, as discussed herein.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In an example, a computer-implemented method for video coding may include receiving motion vector data including a plurality of motion vectors for a video frame, determining a first predicted motion vector using a median motion vector prediction technique for each motion compensated block of the video frame, determining a second predicted motion vector using a selected motion vector prediction technique for each motion compensated block, selecting the first or the second predicted motion vector for each motion compensated block and defining a motion vector bit mask identifying the median or the selected motion vector prediction technique for each motion compensated block, determining a selected coding method for the motion vector bit mask, and encoding the motion vector bit mask into a bitstream based on the selected coding method.

In another example, a computer-implemented method for video coding may further include determining a frame level motion vector prediction method based on a bit cost analysis of a plurality of frame level motion vector prediction methods, wherein the frame level motion vector prediction method defines the selected motion vector prediction technique, differencing the plurality of motion vectors with an associated selected predicted motion vector for each motion compensated block to generate a plurality of motion vector differences, and coding a frame level motion vector prediction method header, a selected coding method header, and an encoded payload comprising the plurality of motion vector differences into a bitstream. The selected motion vector prediction comprises at least one of a Graham motion vector prediction technique, a Graham last block motion vector prediction technique, or a spiral motion vector prediction technique. The selected motion vector prediction technique may include a spiral motion vector prediction technique when the first predicted motion vector is a zero motion vector and a Graham motion vector prediction technique when the first predicted motion vector is a non-zero motion vector. The selected motion vector prediction technique may include a spiral motion vector prediction technique when the first predicted motion vector is a zero motion vector and a Graham last block motion vector prediction technique when the first predicted motion vector is a non-zero motion vector. The selected motion vector prediction technique may include a Graham motion vector prediction technique, and wherein, if the difference between first and second prediction motion vectors for a first motion compensated block is within a threshold, the selected motion vector for the first motion compensated block is set to the first prediction motion vector. The selected motion vector prediction technique may include a Graham motion vector prediction technique, and wherein, if the difference between first and second prediction motion vectors for a first motion compensated block are within a threshold, the selected motion vector for the first motion compensated block is set to the second prediction motion vector. The selected motion vector prediction technique may include a Graham last block motion vector prediction technique, and wherein, if the difference between first and second prediction motion vectors for a first motion compensated block is within a threshold, the selected motion vector for the first motion compensated block is set to the first prediction motion vector. The selected motion vector prediction technique may include a Graham last block motion vector prediction technique, and wherein, if the difference between first and second prediction motion vectors for a first motion compensated block are within a threshold, the selected motion vector for the first motion compensated block is set to the second prediction motion vector. The selected coding method may include at least one of an adaptive symbol-run variable length coding technique or an adaptive proxy variable length coding technique. The selected motion vector prediction may include a spiral motion vector prediction technique, and wherein the spiral motion vector prediction technique comprises scanning the neighboring original motion vectors associated with neighboring blocks of video data in a spiral pattern around the block of video data to determine a first non-zero neighboring original motion vector and generating the prediction motion vector for the block of video data as the first non-zero neighboring original motion vector.

In an example, a computer-implemented method for video coding may include determining a plurality of motion vector differences for a video frame, classifying an individual motion vector difference of the plurality of motion vector differences into a selected class of a plurality of motion vector difference classes, indicating a class-based motion vector within the selected class associated with the individual motion vector difference, and encoding a class identifier associated with the selected class and a class-based motion vector indicator associated with the indicated class-based motion vector into a bitstream.

In another example, a computer-implemented method for video coding may further include determining whether the selected class comprises sub-classes, sub-classifying, when the selected class comprises sub-classes, the individual motion vector difference into a selected sub-class of a plurality of motion vector difference sub-classes within the selected class, wherein the class-based motion vector is within the selected sub-class, encoding a sub-class identifier associated with the selected sub-class into the bitstream, and encoding an x sign bit and a y sign bit of the individual motion vector difference into the bitstream with a sign bit encoding of the plurality of motion vector differences of the video frame, wherein encoding the sign bit encoding comprises a selected sign bit encoding from a plurality of sign bit encoding techniques comprising proxy variable length coding techniques using different coding tables. The plurality of motion vector difference classes may include a motion vector class table and wherein the motion vector class table is selected from a plurality of motion vector class tables, wherein the motion vector class table is associated with a slice of the video frame, and wherein a second slice of the video frame is associated with a second motion vector class table of the plurality of motion vector class tables.

In an example, a computer-implemented method for video coding may include determining a selected motion vector prediction technique for a block of video data from a plurality of motion vector prediction techniques, generating a prediction motion vector for the block of video data based at least in part on the selected motion vector prediction technique, differencing the prediction motion vector with an original motion vector associated with the block of video data to generate a motion vector differential, and entropy encoding the motion vector differential to generate coded motion vector data.

In another example, a computer-implemented method for video coding may further include receiving video data for encoding such that the video data may include the block of video data, neighboring original motion vectors associated with neighboring blocks of video data such that the neighboring blocks of video data neighbor the block of video data, and the original motion vector associated with the block of video data, classifying the motion vector differential into an entropy coding class and an entropy coding sub-class such that the motion vector differential may include at least one of an x-differential, a y-differential, an x-absolute value differential, or a y-absolute value differential, entropy encoding a switching bit mask via at least one of a bitmap encoding technique, a proxy variable length coding technique, or a symbol-run coding technique, and assembling the coded motion vector data with compressed video data to generate an output bitstream. Entropy encoding the motion vector differential may include entropy encoding the motion vector differential jointly as a motion vector differential pair and wherein the coded motion vector data comprise a variable length code of the entropy coding class, a variable length code of the entropy coding sub-class, sub-class component bits, and sign bits. Entropy encoding the motion vector differential may include at least one of an adaptive symbol-run variable length coding technique or an adaptive proxy variable length coding technique, such that the adaptive symbol-run variable length coding technique comprises encoding a run of skipped blocks, and such that the adaptive proxy variable length coding technique may include replacing original fixed length 1-dimensional blocks with variable length codes, such that the original fixed length 1-dimensional blocks may include a length of at least one of 2 bits, 3 bits, or 4 bits, such that the original fixed length 1-dimensional blocks may include a length of 2 bits and the variable length codes may include a variable length of 1 to 3 bits, and such that the original fixed length 1-dimensional blocks may include a length of 3 bits and the variable length codes may include a variable length of 1 to 5 bits. The plurality of motion vector prediction techniques may include at least one of a median motion vector prediction technique, a Graham motion vector prediction technique, a Graham last block motion vector prediction technique, or a spiral motion vector prediction technique. The median motion vector prediction technique may include determining a first neighboring original motion vector for a first neighboring block of video data above and aligned with a left edge of the block of video data, a second neighboring original motion vector for a second neighboring block of video data to the left of and above the block of video data, and a third neighboring original motion vector for a third neighboring block of video data to the left of and aligned with a top edge of the block of video data, and generating the prediction motion vector for the block of video data as the median of the first, second and third neighboring original motion vectors. The Graham motion vector prediction technique may include determining a first neighboring original motion vector for a first neighboring block of video data above and aligned with a left edge of the block of video data, a second neighboring original motion vector for a second neighboring block of video data to the left of and above the block of video data, and a third neighboring original motion vector for a third neighboring block of video data to the left of and aligned with a top edge of the block of video data, determining an absolute value difference between the second and the third neighboring original motion vectors, determining an absolute value difference between the first and the second neighboring original motion vectors, and generating the prediction motion vector for the block of video data as the first neighboring original motion vector if the absolute value difference between the second and the third neighboring original motion vectors is less than or equal to the absolute value difference between the first and the second neighboring original motion vectors and as the third neighboring original motion vector if the absolute value difference between the second and the third neighboring original motion vectors is greater than the absolute value difference between the first and the second neighboring original motion vectors. The Graham last block motion vector prediction technique may include determining a first neighboring original motion vector for a first neighboring block of video data above and aligned with a right edge of the block of video data, a second neighboring original motion vector for a second neighboring block of video data to the left of and above the block of video data, and a third neighboring original motion vector for a third neighboring block of video data to the left of and aligned with a bottom edge of the block of video data, determining an absolute value difference between the second and the third neighboring original motion vectors, determining an absolute value difference between the first and the second neighboring original motion vectors, and generating the prediction motion vector for the block of video data as the first neighboring original motion vector if the absolute value difference between the second and the third neighboring original motion vectors is less than or equal to the absolute value difference between the first and the second neighboring original motion vectors and as the third neighboring original motion vector if the absolute value difference between the second and the third neighboring original motion vectors is greater than the absolute value difference between the first and the second neighboring original motion vectors. The spiral motion vector prediction technique may include scanning the neighboring original motion vectors associated with neighboring blocks of video data in a spiral pattern around the block of video data to determine a first non-zero neighboring original motion vector and generating the prediction motion vector for the block of video data as the first non-zero neighboring original motion vector. Determining the selected motion vector prediction technique for a block of video data from a plurality of motion vector prediction techniques may include determining a first prediction motion vector via a first prediction motion vector prediction technique such that the first prediction motion vector prediction technique may include the median motion vector prediction technique, when the first prediction motion vector is a zero vector determining a second prediction motion vector via a second prediction motion vector prediction technique such that the second prediction motion vector prediction technique comprises the spiral motion vector prediction technique, when the first prediction motion vector is a non-zero vector determining a second prediction motion vector via a third prediction motion vector prediction technique such that the third prediction motion vector prediction technique may include at least one of the Graham motion vector prediction technique or the Graham last block motion vector prediction technique, when a difference between the first prediction motion vector and the second prediction motion vector is less than a threshold, in a first mode, determining the selected motion vector prediction technique as the first motion vector prediction technique, and, in a second mode, determining the selected motion vector prediction technique as at least one of the second or third motion vector prediction techniques, and when a difference between the first prediction motion vector and the second prediction motion vector is greater than a threshold determining a first estimated bit cost associated with the first motion vector prediction technique, determining a second estimated bit cost associated with the second or third motion vector prediction technique, and, when the first estimated bit cost is less than the second estimated bit cost, determining the selected motion vector prediction technique as the first motion vector prediction technique, and, when the second estimated bit cost is less than the first estimated bit cost, determining the selected motion vector prediction technique as the second or third motion vector prediction technique, and adding a switching bit to the switching bit mask In an example, a computer-implemented method for determining a prediction motion vector for a current block of video data may include determining a pattern to provide a sequence of neighboring blocks of a block of video data such that the pattern may include a substantially spiral shape, scanning original motion vectors associated with the neighboring blocks according to the sequence for a first non-zero original motion vector, and, when the first non-zero original motion vector is determined, generating a prediction motion vector associated with the block of video data as the first non-zero original motion vector, and, when no non-zero original is determined, generating the prediction motion vector associated with the block of video data as a zero vector. In further example methods, the pattern may include a shape beginning at a first neighboring block to the left of and aligned with the top of the block of video data and progressing upwards to a second block to the left of and above the block of video data, then to the right along the top of the block of video data to a third neighboring block to the right of and above the block of video data, then downwards to a fourth neighboring block to the right of and below the block of video data, then left to a fifth neighboring block to the left of and below the block of video data, the pattern may include a shape beginning at a first neighboring block to the left of and aligned with the top of the block of video data and progressing downwards to a second neighboring block to the left of and aligned with the bottom of the block of video data, then skipping to a third neighboring block above and aligned with the left of the block of video data, then progressing right to a fourth neighboring block above and aligned with the right side of the block of video data, then skipping to a fifth neighboring block to the left of above the block of video data, then skipping to a sixth neighboring block to the right of and above the block of video data, then skipping to a seventh neighboring block to the left of below the block of video data, then skipping to an eighth neighboring block to the right of and aligned with the top of the block of video data, then progressing downward to a ninth neighboring block to the right of and aligned with the bottom of the block of video data, the neighboring blocks may include a size of 4×4, or the neighboring blocks may include 20 neighboring blocks.

In other examples, a video encoder may include an image buffer and a graphics processing unit having entropy encoder logic circuitry. The graphics processing unit may be communicatively coupled to the image buffer and the entropy encoder logic circuitry may be configured to receive motion vector data comprising a plurality of motion vectors for a video frame, determine a first predicted motion vector using a median motion vector prediction technique for each motion compensated block of the video frame, determine a second predicted motion vector using a selected motion vector prediction technique for each motion compensated block, select the first or the second predicted motion vector for each motion compensated block and defining a motion vector bit mask identifying the median or the selected motion vector prediction technique for each motion compensated block, determine a selected coding method for the motion vector bit mask, and encode the motion vector bit mask into a bitstream based on the selected coding method.

In a further example video encoder, the entropy encoder logic circuitry may be further configured to determine a frame level motion vector prediction method based on a bit cost analysis of a plurality of frame level motion vector prediction methods, wherein the frame level motion vector prediction method defines the selected motion vector prediction technique, difference the plurality of motion vectors with an associated selected predicted motion vector for each motion compensated block to generate a plurality of motion vector differences, and code a frame level motion vector prediction method header, a selected coding method header, and an encoded payload comprising the plurality of motion vector differences into a bitstream. The selected motion vector prediction comprises at least one of a Graham motion vector prediction technique, a Graham last block motion vector prediction technique, or a spiral motion vector prediction technique. The selected motion vector prediction technique may include a spiral motion vector prediction technique when the first predicted motion vector is a zero motion vector and a Graham motion vector prediction technique when the first predicted motion vector is a non-zero motion vector. The selected motion vector prediction technique may include a spiral motion vector prediction technique when the first predicted motion vector is a zero motion vector and a Graham last block motion vector prediction technique when the first predicted motion vector is a non-zero motion vector. The selected motion vector prediction technique may include a Graham motion vector prediction technique, and wherein, if the difference between first and second prediction motion vectors for a first motion compensated block is within a threshold, the selected motion vector for the first motion compensated block is set to the first prediction motion vector. The selected motion vector prediction technique may include a Graham motion vector prediction technique, and wherein, if the difference between first and second prediction motion vectors for a first motion compensated block are within a threshold, the selected motion vector for the first motion compensated block is set to the second prediction motion vector. The selected motion vector prediction technique may include a Graham last block motion vector prediction technique, and wherein, if the difference between first and second prediction motion vectors for a first motion compensated block is within a threshold, the selected motion vector for the first motion compensated block is set to the first prediction motion vector. The selected motion vector prediction technique may include a Graham last block motion vector prediction technique, and wherein, if the difference between first and second prediction motion vectors for a first motion compensated block are within a threshold, the selected motion vector for the first motion compensated block is set to the second prediction motion vector. The selected coding method may include at least one of an adaptive symbol-run variable length coding technique or an adaptive proxy variable length coding technique. The selected motion vector prediction may include a spiral motion vector prediction technique, and wherein the spiral motion vector prediction technique comprises scanning the neighboring original motion vectors associated with neighboring blocks of video data in a spiral pattern around the block of video data to determine a first non-zero neighboring original motion vector and generating the prediction motion vector for the block of video data as the first non-zero neighboring original motion vector.

In other examples, a video encoder may include an image buffer and a graphics processing unit having entropy encoder logic circuitry. The graphics processing unit may be communicatively coupled to the image buffer and the entropy encoder logic circuitry may be configured to determine a plurality of motion vector differences for a video frame, classify an individual motion vector difference of the plurality of motion vector differences into a selected class of a plurality of motion vector difference classes, indicate a class-based motion vector within the selected class associated with the individual motion vector difference, and encode a class identifier associated with the selected class and a class-based motion vector indicator associated with the indicated class-based motion vector into a bitstream.

In a further example video encoder, the entropy encoder logic circuitry may be further configured to determine whether selected class comprises sub-classes, sub-classify, when the selected class comprises sub-classes, the individual motion vector difference into a selected sub-class of a plurality of motion vector difference sub-classes within the selected class, wherein the class-based motion vector is within the selected sub-class, encode a sub-class identifier associated with the selected sub-class into the bitstream, and encode an x sign bit and a y sign bit of the individual motion vector difference into the bitstream with a sign bit encoding of the plurality of motion vector differences of the video frame, wherein encoding the sign bit encoding comprises a selected sign bit encoding from a plurality of sign bit encoding techniques comprising proxy variable length coding techniques using different coding tables. The plurality of motion vector difference classes may include a motion vector class table and wherein the motion vector class table is selected from a plurality of motion vector class tables, wherein the motion vector class table is associated with a slice of the video frame, and wherein a second slice of the video frame is associated with a second motion vector class table of the plurality of motion vector class tables.

In yet another example, a system may include a video decoder communicatively coupled to the antenna and configured to decode an entropy encoded bitstream to determine a frame level motion vector prediction method and a motion vector bit mask for a video frame, wherein the motion vector bit mask identifies a median or a selected motion vector prediction technique for each motion compensated block of the video frame, and wherein the selected motion vector prediction technique is based on the frame level motion vector prediction method and a first motion vector for each motion compensated block determined based on the median motion vector prediction technique, determine based on the motion vector bit mask the individual motion compensated block is associated with the median motion vector prediction technique and the second individual motion compensated block is associated with the selected motion vector prediction technique, generate a first predicted motion vector associated with the individual motion compensated block based on the median motion vector prediction technique, generate a median based prediction motion vector associated with the second individual motion compensated block, and generate a second predicted motion vector associated with the second motion compensated block based on a spiral motion vector prediction technique when the median based prediction motion vector is a zero motion vector and based on at least one of a Graham motion vector prediction technique or a Graham last block motion vector prediction technique when the median based prediction motion vector is a non-zero motion vector.

In a further example system, the system may include an antenna configured to receive the entropy encoded bitstream of video data and a display device configured to present a video frame. The video decoder may be further configured to decode the entropy encoded bitstream to determine a first difference motion vector associated with the first individual motion compensated block and a second difference motion vector associated with the second individual motion compensated block of the video frame, add the first difference motion vector and the first predicted motion vector to determine a first final motion vector for the first individual motion compensated block, and add the second difference motion vector and the second predicted motion vector to determine a first final motion vector for the first individual motion compensated block.

In yet another example, a system may include a video decoder communicatively coupled to the antenna and configured to decode an entropy encoded bitstream to decode an entropy encoded bitstream to determine a class identifier and a class-based motion vector indicator associated with an individual motion compensated block, determine a decoded motion vector difference for the individual motion compensated block based on a selected class of a plurality of motion vector difference classes, wherein the selected class is indicated via the class identifier, and based on the class-based motion vector indicator, wherein the class-based motion vector indicator indicates the decoded motion vector difference within the selected class, determine a predicted motion vector associated with the individual motion compensated block, and add the predicted motion vector and the decoded motion vector difference to determine a final decoded motion vector for the individual motion compensated block.

In a further example system, the system may include an antenna configured to receive the entropy encoded bitstream of video data and a display device configured to present a video frame. The video decoder may be further configured to decode the entropy encoded bitstream to determine a sub-class identifier associated with the individual motion compensated block, wherein the selected class comprises sub-classes, and wherein to determine the decoded motion vector difference for the individual motion compensated block comprises the video decoder being configured to determine the decoded motion vector difference from a sub-class identified by the sub-class identifier.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for video coding, comprising:
   obtaining motion vector data comprising a plurality of motion vectors for a video frame;
   determining a first predicted motion vector using a median motion vector prediction technique for each motion compensated block of the video frame based on motion vectors of its neighboring blocks;
   determining a second predicted motion vector using a selected motion vector prediction technique for each motion compensated block based on motion vectors of its neighboring blocks, wherein the selected motion vector prediction technique is a first motion vector prediction technique when the median based motion vector is a zero motion vector and a second motion vector prediction technique different than the first motion vector prediction technique when the median based motion vector is a non-zero motion vector;
   selecting the first or the second predicted motion vector for each motion compensated block and defining a motion vector bit mask identifying the median or the selected motion vector prediction technique for each motion compensated block;
   determining a selected coding method for the motion vector bit mask; and
   encoding the motion vector bit mask into a bitstream based on the selected coding method.

2. The method of claim 1, further comprising:
   determining a frame level motion vector prediction method based on a bit cost analysis of a plurality of frame level motion vector prediction methods, wherein the frame level motion vector prediction method defines the selected motion vector prediction technique;
   differencing the plurality of motion vectors with an associated selected predicted motion vector for each motion compensated block to generate a plurality of motion vector differences; and
   coding a frame level motion vector prediction method header, a selected coding method header, and an encoded payload comprising the plurality of motion vector differences into the bitstream.

3. A video encoder comprising:
   an image buffer;
   a graphics processing unit comprising entropy encoder logic circuitry, wherein the graphics processing unit is communicatively coupled to the image buffer and wherein the entropy encoder logic circuitry is configured to:
   receive motion vector data comprising a plurality of motion vectors for a video frame;
   determine a first predicted motion vector using a median motion vector prediction technique for each motion compensated block of the video frame based on motion vectors of its neighboring blocks;
   determine a second predicted motion vector using a selected motion vector prediction technique for each motion compensated block based on motion vectors of its neighboring blocks, wherein the selected motion vector prediction technique is a first motion vector prediction technique when the median based motion vector is a zero motion vector and a second motion vector prediction technique different than the first motion vector prediction technique when the median based motion vector is a non-zero motion vector;

select the first or the second predicted motion vector for each motion compensated block and define a motion vector bit mask identifying the median or the selected motion vector prediction technique for each motion compensated block;

determine a selected coding method for the motion vector bit mask; and encode the motion vector bit mask into a bitstream based on the selected coding method.

4. The video encoder of claim 3, wherein the entropy encoder logic circuitry is further configured to:

determine a frame level motion vector prediction method based on a bit cost analysis of a plurality of frame level motion vector prediction methods, wherein the frame level motion vector prediction method defines the selected motion vector prediction technique;

difference the plurality of motion vectors with an associated selected predicted motion vector for each motion compensated block to generate a plurality of motion vector differences; and code a frame level motion vector prediction method header, a selected coding method header, and an encoded payload comprising the plurality of motion vector differences into the bitstream.

5. A system comprising:

a video decoder configured to decode an entropy encoded bitstream, wherein the video decoder is configured to:

decode the entropy encoded bitstream to determine a frame level motion vector prediction method and a motion vector bit mask for a video frame, wherein the motion vector bit mask identifies a median or a selected motion vector prediction technique for each motion compensated block of the video frame based on motion vectors of its neighboring blocks, and wherein the selected motion vector prediction technique is based on the frame level motion vector prediction method and a first motion vector for each motion compensated block determined based on the median motion vector prediction technique;

determine, based on the motion vector bit mask, a first individual motion compensated block is associated with the median motion vector prediction technique and a second individual motion compensated block is associated with the selected motion vector prediction technique;

generate a first predicted motion vector associated with the first individual motion compensated block based on the median motion vector prediction technique;

generate a median based prediction motion vector associated with the second individual motion compensated block; and generate a second predicted motion vector associated with the second motion compensated block based on a spiral motion vector prediction technique when the median based prediction motion vector is a zero motion vector and based on at least one of a Graham motion vector prediction technique or a Graham last block motion vector prediction technique when the median based prediction motion vector is a non-zero motion vector.

6. The system of claim 5, further comprising:

an antenna communicatively coupled to the video decoder and configured to receive the entropy encoded bitstream; and a display device configured to present a video frame, wherein the video decoder is further configured to:

decode the entropy encoded bitstream to determine a first difference motion vector associated with the first individual motion compensated block and a second difference motion vector associated with the second individual motion compensated block of the video frame;

add the first difference motion vector and the first predicted motion vector to determine a first final motion vector for the first individual motion compensated block; and add the second difference motion vector and the second predicted motion vector to determine a first final motion vector for the first individual motion compensated block.

* * * * *